United States Patent
Chiba et al.

(10) Patent No.: US 10,403,890 B2
(45) Date of Patent: Sep. 3, 2019

(54) NEGATIVE ELECTRODE ACTIVE MATERIAL FOR ELECTRIC DEVICE AND ELECTRIC DEVICE USING THE SAME

(71) Applicant: Nissan Motor Co., Ltd., Yokohama-shi, Kanagawa (JP)

(72) Inventors: Nobutaka Chiba, Kanagawa (JP); Youichi Yoshioka, Kanagawa (JP); Tomohiro Kaburagi, Kanagawa (JP); Manabu Watanabe, Kanagawa (JP); Masaya Arai, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/774,920

(22) PCT Filed: Nov. 10, 2015

(86) PCT No.: PCT/JP2015/081662
§ 371 (c)(1),
(2) Date: May 9, 2018

(87) PCT Pub. No.: WO2017/081758
PCT Pub. Date: May 18, 2017

(65) Prior Publication Data
US 2018/0351170 A1  Dec. 6, 2018

(51) Int. Cl.
*H01M 4/38* (2006.01)
*C01B 33/06* (2006.01)
(Continued)

(52) U.S. Cl.
CPC ............ *H01M 4/386* (2013.01); *B22F 9/04* (2013.01); *C01B 33/06* (2013.01); *C22C 30/04* (2013.01);
(Continued)

(58) Field of Classification Search
CPC ........ H01M 4/387; H01M 3/134; C22C 13/00
(Continued)

(56) References Cited

U.S. PATENT DOCUMENTS

2006/0040182 A1  2/2006  Kawakami et al.
2008/0113271 A1  5/2008  Ueda et al.
(Continued)

FOREIGN PATENT DOCUMENTS

JP   2001297757 A   10/2001
JP   2010135336 A   6/2010
(Continued)

OTHER PUBLICATIONS

Database WPI Week 201501 Thomson Scientific, London, GB; AN 2014-W36047 XP002783193 & WO 2014/199781 A1 (Nissan Motor Co Ltd) Dec. 18, 2014 (Dec. 18, 2014).
(Continued)

*Primary Examiner* — Khanh T Nguyen
(74) *Attorney, Agent, or Firm* — Young Basile Hanlon & MacFarlane, P.C.

(57) ABSTRACT

A negative electrode active material which has a ternary alloy composition represented by Si—Sn-M (M is one or two or more transition metal elements) and has a microstructure which has a first phase (silicide phase) having a silicide of a transition metal as a main component and a second phase partially containing Sn and having amorphous or low crystalline silicon as a main component, and further has partially a plurality of independent first phases and partially a eutectic structure of the first phase and the second phase is used for an electric device. The negative electrode active material improves cycle durability of an electric device such as a lithium ion secondary battery.

14 Claims, 19 Drawing Sheets

(51) Int. Cl.
*H01M 4/36* (2006.01)
*B22F 9/04* (2006.01)
*C22C 30/04* (2006.01)
*C22F 1/00* (2006.01)
*H01M 4/02* (2006.01)

(52) U.S. Cl.
CPC ............. *C22F 1/002* (2013.01); *H01M 4/362* (2013.01); *H01M 4/364* (2013.01); *B22F 2009/048* (2013.01); *B22F 2998/10* (2013.01); *H01M 2004/027* (2013.01)

(58) Field of Classification Search
USPC ........................................ 252/182.1; 429/217
See application file for complete search history.

(56) References Cited

U.S. PATENT DOCUMENTS

| | | | |
|---|---|---|---|
| 2009/0061322 | A1 | 3/2009 | Kawakami et al. |
| 2011/0117449 | A1 | 5/2011 | Le |
| 2013/0084498 | A1 | 4/2013 | Kimura et al. |
| 2013/0316238 | A1 | 11/2013 | Nishimura et al. |
| 2014/0319414 | A1* | 10/2014 | Watanabe ............... C22C 13/00 252/182.1 |
| 2014/0353546 | A1 | 12/2014 | Watanabe et al. |
| 2014/0370386 | A1 | 12/2014 | Hirono et al. |
| 2015/0303465 | A1* | 10/2015 | Watanabe ............. H01M 4/134 429/217 |

FOREIGN PATENT DOCUMENTS

| | | |
|---|---|---|
| JP | 2012102354 A | 5/2012 |
| JP | 2013084549 A | 5/2013 |
| JP | 2013134905 A | 7/2013 |
| KR | 20080081283 A | 9/2008 |
| WO | 2006129415 A1 | 12/2006 |
| WO | 2013115223 A1 | 8/2013 |

OTHER PUBLICATIONS

Database WPI Week 201804 Thomson Scientific, London, GB; AN 2017-87210Y XP002783195 & JP 2017 224537 A (Nissan Motor Co Ltd) Dec. 21, 2017 (Dec. 21, 2017).

* cited by examiner (EXAMPLE 2) TEM IMAGE (LOW MAGNIFICATION)

BF-STEM Image

HAADF-STEM Image

PRIMARY TiSi2 CRYSTAL
EUTECTIC (TiSi2-Si)

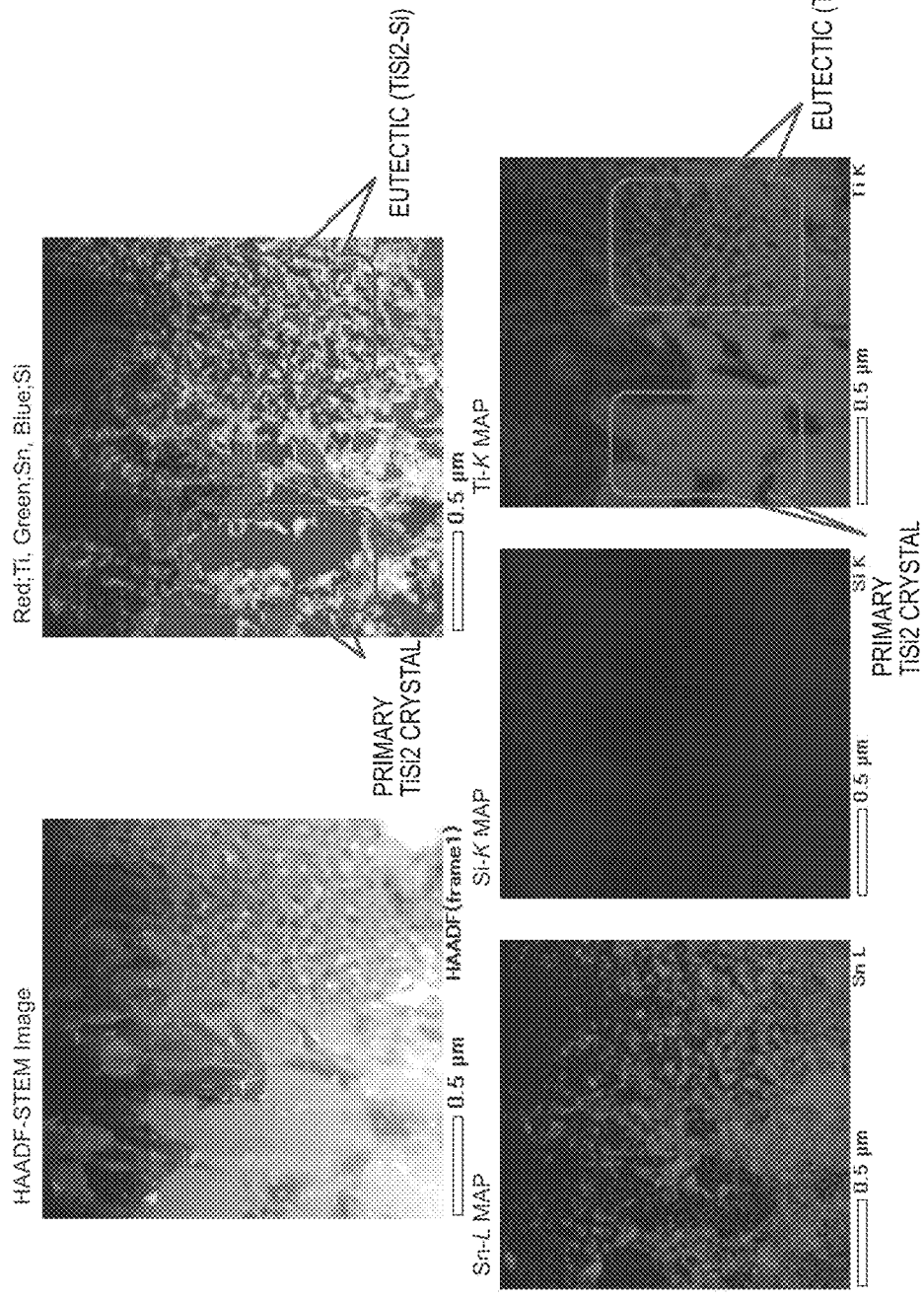

(EXAMPLE 2) TEM IMAGE (EUTECTIC PART, INTERMEDIATE MAGNIFICATION)

(EXAMPLE 2) TEM IMAGE (EUTECTIC PART, HIGH MAGNIFICATION)

(EXAMPLE 2) TEM-EDX MAPPING (EUTECTIC PART, HIGH MAGNIFICATION)
FIG. 7A
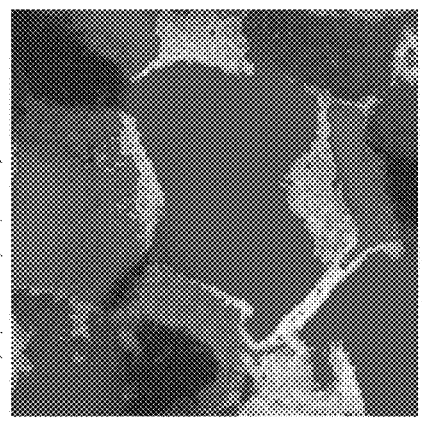
FIG. 7E
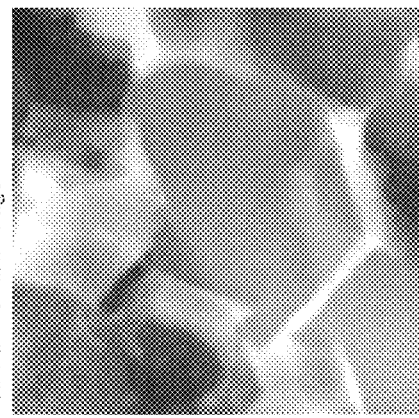
FIG. 7B
FIG. 7C
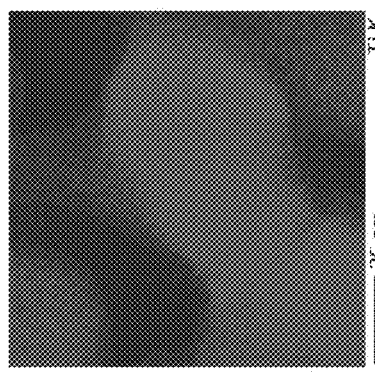
FIG. 7D

(EXAMPLE 2) EDX (SILICIDE PHASE PART IN EUTECTIC)

(EXAMPLE 2) EDX (AMORPHOUS Si PHASE PART IN EUTECTIC)
FIG. 9A
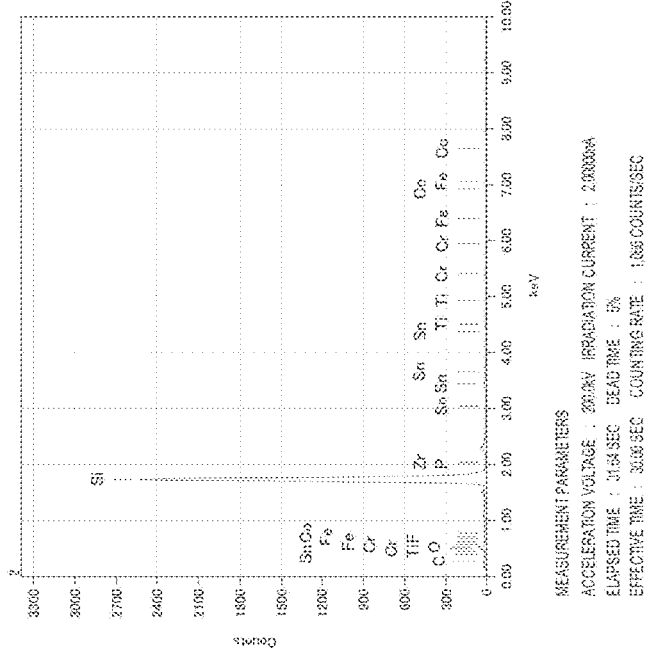
FIG. 9B
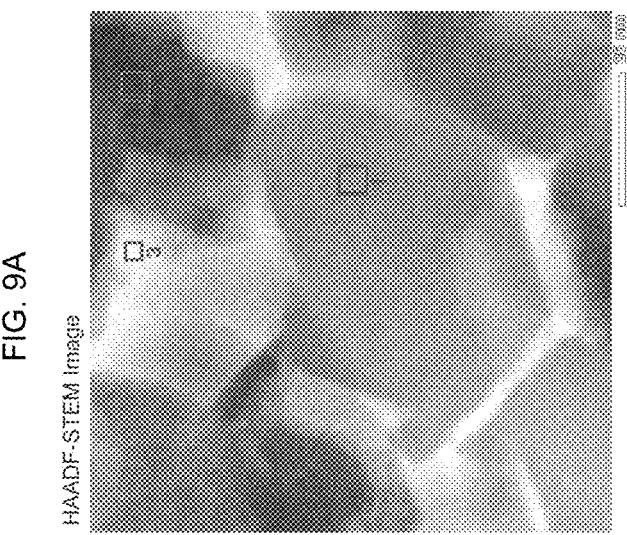
FIG. 9C

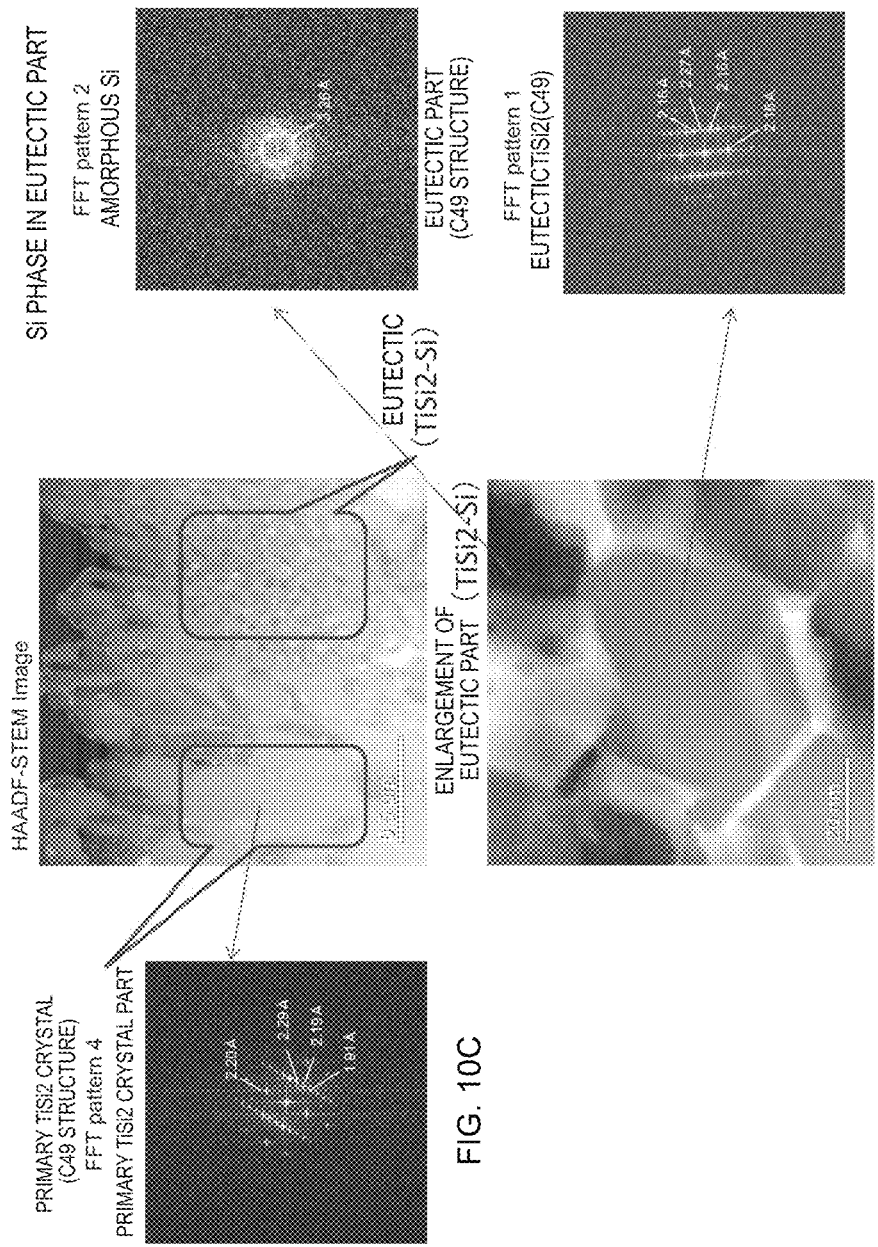

(EXAMPLE 2) XRD CHART

Si-Sn-Ti STATE DIAGRAM CALCULATION RESULT BY Thermo-Calc (ISOTHERMAL CROSS-SECTION)

Si-Sn-Ti STATE DIAGRAM CALCULATION RESULT BY Thermo-Calc (ISOTHERMAL CROSS-SECTION)

Si-Sn-Ti 1350°C

Si-Sn-Ti STATE DIAGRAM CALCULATION RESULT BY Thermo-Calc (ISOTHERMAL CROSS-SECTION)

Si-Sn-Ti 1300°C

Si-Sn-Ti STATE DIAGRAM CALCULATION RESULT BY Thermo-Calc (ISOTHERMAL CROSS-SECTION)

Si-Sn-Ti 1200°C

Si-Sn-Ti 1410 degC

Si-Sn-Ti 1310 deg C

TEMPERATURE PROFILE USED IN PRECIPITATION CALCULATION (EXAMPLE 1) Si65Sn5Ti30, 6.2×10⁶°C/sec, 15μm PRECIPITATE: TiSi2+Si(dia)

TiSi2 PRECIPITATE OF Si65-Sn5-Ti30 IS BIMODAL (EXAMPLE 1) Si65Sn5Ti30, 6.2×10$^6$°C/sec, 15μm BLACK PART: EUTECTIC OF FIRST PHASE TiSi2 + SECOND PHASE Si
GRAY PART: FIRST PHASE TiSi2
WHITE PART: Sn (EXAMPLE 2) Si60Sn10Ti30, 4.6×10$^6$°C/sec, 20μm PRECIPITATE: TiSi2+Si(dia)

FIG.25
(EXAMPLE 2)Si60Sn10Ti30 , 4.6×10⁶°C/sec , 20μm
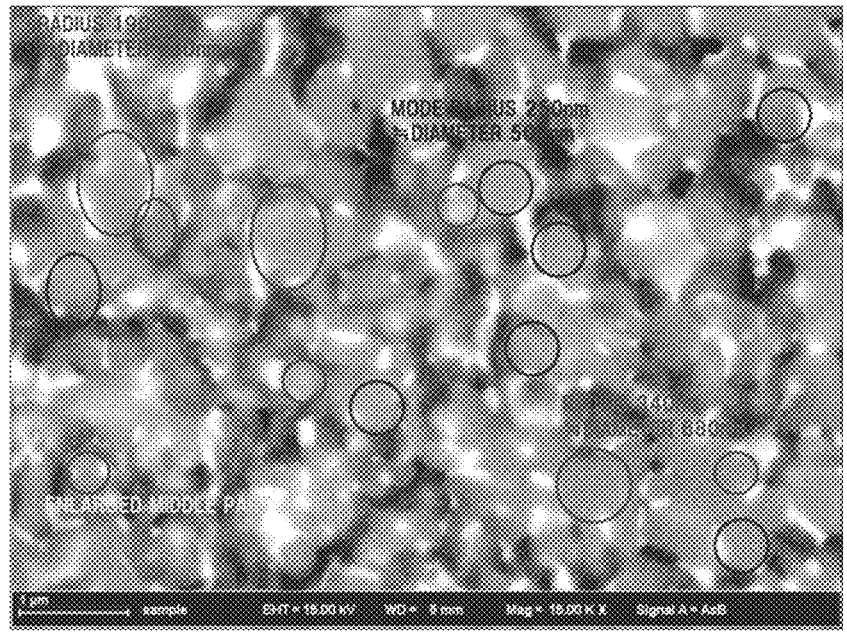
BLACK PART: EUTECTIC OF FIRST PHASE TiSi2 + SECOND PHASE Si
GRAY PART: FIRST PHASE TiSi2
WHITE PART: Sn
(EXAMPLE 3)Si60Sn10Ti30 , 2.2×10⁶°C/sec , 27μm
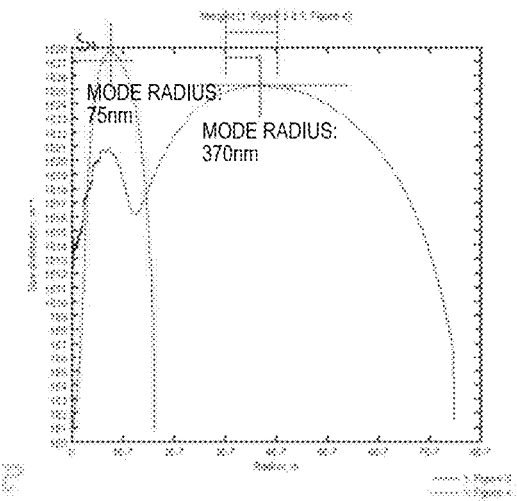
FIG. 26A
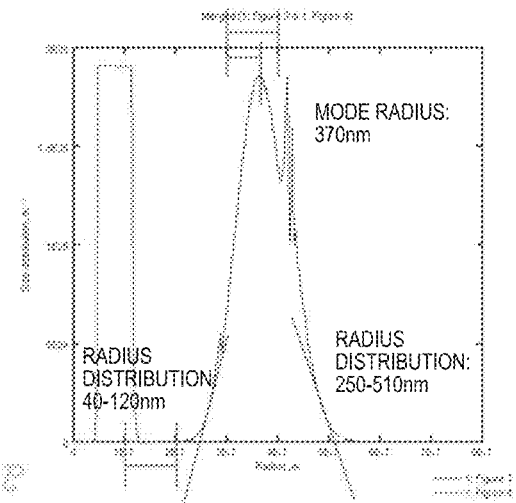
FIG. 26B
PRECIPITATE:TiSi2+Si(dia)

(EXAMPLE 3)Si60Sn10Ti30 , 2.2×10$^6$°C/sec , 27μm

BLACK PART: EUTECTIC OF FIRST PHASE TiSi2 + SECOND PHASE Si
GRAY PART: FIRST PHASE TiSi2
WHITE PART: Sn (EXAMPLE 4)Si60Sn10Ti30 , 1.6×10$^6$°C/sec , 35μm PRECIPITATE:TiSi2+Si(dia)

(EXAMPLE 4)Si60Sn10Ti30, 1.6×10⁶°C/sec, 35μm

BLACK PART: EUTECTIC OF FIRST PHASE TiSi2 + SECOND PHASE Si
GRAY PART: FIRST PHASE TiSi2
WHITE PART: Sn (COMPARATIVE EXAMPLE 1)Si60Sn20Ti20, 4.6×10⁶°C/sec, 20μm PRECIPITATE:TiSi2+Si(dia)

NEGATIVE ELECTRODE ACTIVE MATERIAL FOR ELECTRIC DEVICE AND ELECTRIC DEVICE USING THE SAME

TECHNICAL FIELD

The present invention relates to a negative electrode active material for an electric device, and an electric device using the same. The negative electrode active material for an electric device and the electric device using the same according to the present invention are used in a driving power source and an auxiliary power source for motors of vehicles such as electric vehicles, fuel cell vehicles, and hybrid electric vehicles as secondary batteries, capacitors, and the like.

BACKGROUND

In recent years, cut down of the amount of carbon dioxide has been ardently desired in order to cope with air pollution and global warming. In the motor vehicle industry, cut down of carbon dioxide emissions due to introduction of electric vehicles (EV) and hybrid electric vehicles (HEV) has been highly expected, and development of electric devices such as secondary batteries for driving motors, which holds the key to practical use thereof has been actively carried out.

The secondary batteries for driving motors are required to exhibit extremely high-output characteristics and high energy as compared to consumer lithium ion secondary batteries to be used in mobile phones, notebook computers, and the like. Hence, lithium ion secondary batteries having the highest theoretical energy among all the batteries have attracted attention, and development thereof has been rapidly advanced at present.

A lithium ion secondary battery generally has a configuration in which a positive electrode having a positive electrode active material and the like coated on both sides of a positive electrode current collector by using a binder and a negative electrode having a negative electrode active material and the like coated on both sides of a negative electrode current collector by using a binder are connected to each other via an electrolyte layer to be housed in a battery case.

Hitherto, a carbon and graphite-based material, which is advantageous from the viewpoint of lifespan of charge and discharge cycles and cost, has been used in the negative electrode of a lithium ion secondary battery. However, in the case of a carbon and graphite-based negative electrode material, since charge and discharge proceed by occlusion and release of lithium ions into and from the graphite crystals, there is a disadvantage that a charge and discharge capacity that is equal to or higher than the theoretical capacity, 372 mAh/g, to be obtained from $LiC_6$, the maximum lithium-introduced compound, cannot be obtained. For this reason, it is difficult to obtain a capacity and an energy density which satisfy the practical use level of a vehicle application by using a carbon and graphite-based negative electrode material.

In contrast, a battery using a material to be alloyed with Li in the negative electrode is expected as a negative electrode material in a vehicle application since the energy density is improved as compared to a conventional carbon and graphite-based negative electrode material. For example, an Si material occludes and releases 3.75 mol of lithium ions per 1 mol as in the following Reaction Formula (A) in charge and discharge, and the theoretical capacity is 3600 mAh/g in $Li_{15}Si_4$ (=$Li_{3.75}Si$).

[Chemical Formula 1]

$$Si + 3.75Li^+ + e^- \leftrightarrows Li_{3.75}Si \quad (A)$$

However, in a lithium ion secondary battery using a material to be alloyed with Li in a negative electrode, expansion and contraction of the negative electrode during the charge and discharge is great. For example, a volume expansion in the case of occluding a Li ion is about 1.2 times for a graphite material, while a great volume change (about 4 times) occurs for a Si material since the amorphous state is converted to a crystalline state when Si and Li are alloyed, and there is thus a problem that the cycle lifespan of the electrode decreases. In addition, in the case of an Si negative electrode active material, the capacity and the cycle durability have a trade-off relationship, and there is thus a problem that it is difficult to improve the cycle durability while having a high capacity.

Here, WO 2006/129415 A discloses an invention aimed to provide a nonaqueous electrolyte secondary battery including a negative electrode pellet having a high capacity and an excellent cycle lifespan. Specifically, it is disclosed that a silicon-containing alloy which is obtained by mixing a silicon powder and a titanium powder by a mechanical alloying method and wet pulverizing the mixture, and has a first phase containing silicon as a main body and a second phase containing a silicide of titanium ($TiSi_2$ or the like) is used as a negative electrode active material. It is also disclosed that at least either of these two phases is amorphous or low crystalline.

SUMMARY

According to the investigations of the present inventors, in an electric device such as a lithium ion secondary battery using the negative electrode pellet described in WO 2006/129415 A, it has been revealed that the cycle durability is not sufficient in some cases even though it is described that favorable cycle durability can be exhibited.

In this regard, an object of the present invention is to provide a means capable of improving cycle durability of an electric device such as a lithium ion secondary battery.

In order to solve the above problem, the present inventors have carried out intensive researches. As a result, it has been found that the above problem can be solved by using as a negative electrode active material for an electric device a silicon-containing alloy which has a ternary alloy composition represented by Si—Sn-M (M is one or two or more transition metal elements) and having a microstructure which has a first phase (silicide phase) having a silicide of a transition metal (also referred to as silicide) as a main component and a second phase (amorphous Si phase (a-Si phase)) partially containing Sn and having amorphous or low crystalline silicon (also referred to as a-Si) as a main component, wherein the microstructure has partially a plurality of independent first phases and partially a eutectic structure of the first phase and the second phase, such that the present invention has been completed.

That is, the present invention relates to a negative electrode active material for an electric device which includes a silicon-containing alloy. Further, the silicon-containing alloy has a composition represented by the following Chemical Formula (1):

$$Si_xSn_yM_zA_a \quad (I)$$

(wherein in the Chemical Formula (1),
A represents an unavoidable impurity,
M represents one or two or more transition metal elements,
x, y, z, and a represent a percent by mass, and 0<x<100, 0<y<100, 0<z<100, and 0≤a<0.5 and x+y+z+a=100).

Furthermore, the silicon-containing alloy has the feature in having a microstructure which has a first phase having a silicide of a transition metal (silicide) as a main component and a second phase partially containing Sn and having amorphous or low crystalline Si as a main component, wherein the microstructure has partially a plurality of independent first phases and partially a eutectic structure of the first phase and the second phase.

The silicon-containing alloy constituting the negative electrode active material according to the present invention has a configuration in which the second phase forms a eutectic with the first phase in the microstructure thereof and further enters a gap between a plurality of independent first phases. Further, the first phase (silicide phase) is excellent in hardness and electron conductivity as compared to the second phase (a-Si phase).

By this, the expansion of the second phase (a-Si phase) in the eutectic structure in the course of charge and discharge is suppressed by the eutectic first phase and further suppressed by a plurality of independent first phases. That is, the expansion of the second phase can be suppressed by two-step suppression. Therefore, the phase transition between an amorphous state and a crystalline state (crystallization to $Li_{15}Si_4$) during the alloying of Si with Li in the charging can be suppressed.

As a result, expansion and contraction of the silicon-containing alloy constituting the negative electrode active material in the course of charge and discharge of the electric device can be reduced, and when the second phase (a-Si phase) forms a eutectic with the first phase (silicide phase) formed of silicide having electric conductivity, the second phase can be allowed to uniformly react. As a result, the electric device using the negative electrode active material can attain improved cycle durability while showing a high capacity.

BRIEF DESCRIPTION OF THE DRAWINGS

FIG. 4 is a view which illustrates quantitative mapping data by scanning transmission electron microscope-energy dispersive X-ray spectroscopy (STEM-EDX). FIG. 4(a) illustrates the same HAADF-STEM image as FIG. 3(b). FIG. 4(b) is a view which illustrates mapping data of Sn (on the lower left) measured in the same field as HAADF-STEM (the upper left in FIG. 4(a)). FIG. 4(c) is a view which illustrates mapping data of Si (on the lower middle) measured in the same field as HAADF-STEM (the upper left in FIG. 4(a)). FIG. 4(d) is a view which illustrates mapping data of Ti (on the lower right) measured in the same field as HAADF-STEM (the upper left in FIG. 4(a)). FIG. 4(e) is a view in which mapping data items of Sn, Si, and Ti measured in the same field as HAADF-STEM (the upper left in FIG. 4(a)) are superimposed (on the upper right).

FIG. 7 is a view which illustrates quantitative mapping data by scanning transmission electron microscope-energy dispersive X-ray spectroscopy (STEM-EDX). FIG. 7(a) illustrates the same HAADF-STEM image as FIG. 6(b). FIG. 7(b) is a view which illustrates mapping data of Sn (on the lower left) measured in the same field as HAADF-STEM (the upper left in FIG. 7(a)). FIG. 7(c) is a view which illustrates mapping data of Si (on the lower middle) measured in the same field as HAADF-STEM (the upper left in FIG. 7(a)). FIG. 7(d) is a view which illustrates mapping data of Ti (on the lower right) measured in the same field as HAADF-STEM (the upper left in FIG. 7(a)). FIG. 7(e) is a view in which mapping data items of Sn, Si, and Ti measured in the same field as HAADF-STEM (the upper left on) are superimposed (on the upper right).

FIG. 8 illustrates the same HAADF-STEM image as FIGS. 6(b) and 7(a), and is a view in which areas (two parts enclosed by rectangular frames) in which presence of elements in the silicide phase (first phase) and elements in the Si phase (second phase) is observed by elemental analysis are divided by the numbers 1 and 2 in the image.

FIG. 9 illustrates the same HAADF-STEM image as FIGS. 6(b) and 7(a), and is a view in which areas (two parts enclosed by rectangular frames) in which presence of elements in the silicide phase (first phase) and elements in the Si phase (second phase) is observed by elemental analysis are divided by the numbers 1 and 2 in the image. FIG. 9(a) illustrates the same HAADF-STEM image as FIGS. 6(b) and 7(a), and is a view in which the rectangular frame of a part to be observed in elemental distribution (part of the circled number 2 in the image) is illustrated by a bold line. FIG. 9(b) is a view obtained by elemental analysis of the part to be observed in elemental distribution in FIG. 9(a). FIG. 9(c) is an elemental analysis table collectively showing elemental analysis results of FIG. 9(b).

FIG. 10(a) is a view which illustrates the same high-angle scattering dark field-scanning transmission electron microscope image (HAADF-STEM Image) as FIG. 3(b). FIG. 10(b) is a view obtained by further enlarging a part of a eutectic structure of the enclosed part on the right side in FIG. 10(a), and is a view which illustrates the same high-angle scattering dark field-scanning transmission electron microscope image (HAADF-STEM Image) as FIG. 6(b). FIG. 10(c) illustrates a diffraction pattern obtained by performing a fast Fourier transformation treatment to an area of an independent silicide phase of the enclosed part on the left side in FIG. 10(a) by electron diffraction measurement. FIG. 10(d) illustrates a diffraction pattern obtained by performing a fast Fourier transformation treatment to an area of an a-Si phase in the eutectic structure in FIG. 10(b) by electron diffraction measurement. FIG. 10(e) illustrates a diffraction pattern obtained by performing a fast Fourier transformation treatment to an area of a silicide phase in the eutectic structure in FIG. 10(b) by electron diffraction measurement.

FIG. 25 is a view which illustrates a cross-sectional scanning electron microscope (SEM) image of a quenched thin strip alloy of $Si_{60}Sn_{10}Ti_{30}$ of Example 2.

FIG. 26(a) is a graph showing a mode radius of a size of the independent first phase and a size of the Si phase (second phase) in the eutectic structure, obtained by the precipitation calculation under the calculation conditions of Example 3 described above, for the alloy composition of $Si_{60}Sn_{10}Ti_{30}$ of Example 3. FIG. 26(b) is a graph in which radius distribution of the size of the independent first phase and the size of the Si phase (second phase) in the eutectic structure is obtained by magnifying the graph of FIG. 26(a).

DETAILED DESCRIPTION

Figure 1:
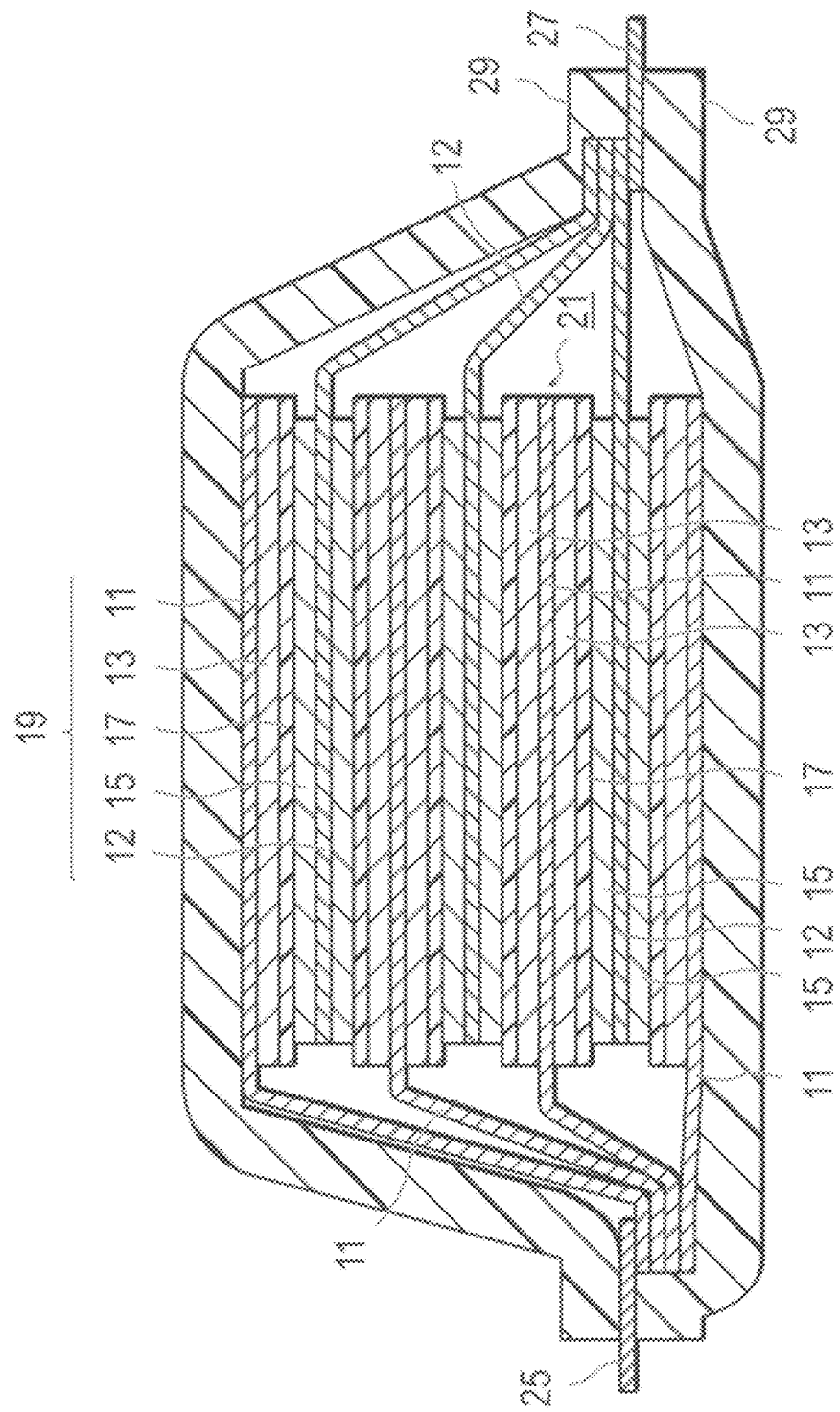
FIG. 1 is a cross-sectional schematic view which schematically illustrates an outline of a stacked type flat non-bipolar lithium ion secondary battery as a representative embodiment of an electric device according to the present invention.

Hereinafter, embodiments of a negative electrode active material for an electric device, and a negative electrode for an electric device and an electric device using the same of the present invention will be described with reference to the drawings. However, the technical scope of the present invention should be determined based on the description of claims but not limited to only the following embodiments. Incidentally, in the description of the drawings, the same elements are denoted by the same reference numerals, and duplicate descriptions are omitted. In addition, the dimensional ratios of the drawings are exaggerated for convenience of description and may differ from actual ratios.

Hereinafter, a basic configuration of an electric device to which the negative electrode active material for an electric device of the present invention can be applied will be described with reference to the drawings. In the present embodiment, a lithium ion secondary battery will be described as an example of the electric device.

First, in a negative electrode for lithium ion secondary battery of a representative embodiment of a negative electrode containing the negative electrode active material for an electric device according to the present invention, and a lithium ion secondary battery using the same, the voltage of the cell (single battery layer) is great and a high-energy density and a high-output density can be achieved. Accordingly, a lithium ion secondary battery using the negative electrode active material for lithium ion secondary battery of the present embodiment is excellent for driving power source and auxiliary power source of a vehicle. As a result, it can be suitably used as a lithium ion secondary battery for driving power and the like of a vehicle. In addition to this, it can also be sufficiently applied to a lithium ion secondary battery for mobile devices such as mobile phones.

That is, the lithium ion secondary battery to be a target of the present embodiment may be one that is formed by using the negative electrode active material for lithium ion secondary battery of the present embodiment which will be described below, and other constituent requirements thereof are not particularly limited.

For example, in the case of distinguishing a lithium ion secondary battery by its form and structure, it can be applied to any conventionally known form and structure such as a stacked type (flat type) battery and a wound type (cylindrical type) battery. It is advantageous to employ a stacked type (flat type) battery structure from the viewpoint of cost and workability since long-term reliability can be secured by a simple sealing technique such as thermocompression bonding.

In addition, in the case of considering an electrical connection form (electrode structure) in a lithium ion secondary battery, the lithium ion secondary battery can be applied to both a non-bipolar (internal parallel connection type) battery and a bipolar (internal series connection type) battery.

In the case of distinguishing a lithium ion secondary battery by a type of electrolyte layer therein, the lithium ion secondary battery can also be applied to batteries having any conventionally known type of electrolyte layer such as a solution electrolyte type battery using a solution electrolyte such as a nonaqueous electrolytic solution in an electrolyte layer and a polymer battery using a polymer electrolyte in an electrolyte layer. The polymer battery is classified into a gel electrolyte type battery using a polymer gel electrolyte (also simply referred to as a gel electrolyte) and a solid polymer (all-solid) type battery using a polymer solid electrolyte (also simply referred to as a polymer electrolyte).

Accordingly, in the following description, a non-bipolar (internal parallel connection type) lithium ion secondary battery using the negative electrode active material for lithium ion secondary battery of the present embodiment will be significantly briefly described with reference to the drawings. However, the technical scope of the lithium ion secondary battery of the present embodiment is not limited thereto.

<Overall Structure of Battery>

FIG. 1 is a cross-sectional schematic view which schematically illustrates an overall structure of a flat type (stacked type) lithium ion secondary battery (hereinafter, also simply referred to as the "stacked type battery") as a representative embodiment of the electric device according to the present invention.

As illustrated in FIG. 1, a stacked type battery 10 of the present embodiment has a structure in which a substantially rectangular power generating element 21 in which a charge and discharge reaction actually proceeds is sealed in the interior of a laminate sheet 29 of an outer package. Here, the power generating element 21 is configured to stack a positive electrode having a positive electrode active material layer 15 disposed on both sides of a positive electrode current collector 12, an electrolyte layer 17, and a negative electrode having a negative electrode active material layer 13 disposed on both sides of a negative electrode current collector 11. Specifically, the negative electrode, the electrolyte layer, and the positive electrode are stacked in this order such that one positive electrode active material layer 15 and the adjacent negative electrode active material layer 13 face each other via the electrolyte layer 17.

By this, the adjacent positive electrode, electrolyte layer, and negative electrode constitute one single battery layer 19. Hence, it can also be said that the stacked type battery 10 illustrated in FIG. 1 has a configuration in which a plurality of single battery layers 19 are stacked to be electrically connected in parallel. Incidentally, the positive electrode active material layer 15 is disposed only on one side of each of the outermost positive electrode current collectors to be positioned at both outermost layers of the power generating element 21, but the active material layer may be provided on both sides thereof. That is, a current collector which has an active material layer only on one side and is thus dedicated to the outermost layer is not prepared but a current collector having an active material layer on both sides may be used as it is as the outermost current collector. In addition, the positive electrode and the negative electrode may be reversely disposed from FIG. 1 so that an outermost negative electrode current collector is positioned at both outermost layers of the power generating element 21, and the negative electrode active material layer may be disposed on one side or both sides of the outermost negative electrode current collector.

A positive electrode current collecting plate 27 and a negative electrode current collecting plate 25 which are electrically connected to the respective electrodes (the positive electrode and the negative electrode) have a structure in which they are respectively attached to the positive electrode current collector 12 and the negative electrode current collector 11 and led to the outside of the laminate sheet 29 so as to be sandwiched between the end portions of the laminate sheet 29. The positive electrode current collecting plate 27 and the negative electrode current collecting plate 25 may be respectively attached to the positive electrode current collector 12 and the negative electrode current collector 11 of the respective electrodes via a positive electrode lead and a negative electrode lead (not illustrated) by ultrasonic welding, resistance welding, or the like, if necessary.

The lithium ion secondary battery described above is characterized by a negative electrode. The main constituent members of the battery including the negative electrode will be described below.

<Active Material Layer>

The active material layer 13 or 15 contains an active material, and may further contain another additive if necessary.

[Positive Electrode Active Material Layer]

The positive electrode active material layer 15 contains a positive electrode active material.

(Positive Electrode Active Material)

Examples of the positive electrode active material may include lithium-transition metal composite oxides such as $LiMn_2O_4$, $LiCoO_2$, $LiNiO_2$, $Li(Ni-Mn-Co)O_2$, and those having a part of the transition metal(s) substituted with another element, lithium-transition metal phosphate compounds, and lithium-transition metal sulfate compounds.

Depending on the cases, two or more kinds of positive electrode active materials may be used in combination. A lithium-transition metal composite oxide is preferably used as the positive electrode active material from the viewpoint of capacity and output characteristics. A composite oxide containing lithium and nickel is more preferably used, and Li(Ni—Mn—Co)$O_2$ and those having a part of these transition metal(s) substituted with another element (hereinafter, also simply referred to as the "NMC composite oxide") are still more preferably used. The NMC composite oxide has a layered crystal structure in which a lithium atom layer and a transition metal (Mn, Ni, and Co are orderly arranged) atom layer are alternately stacked via an oxygen atom layer, one Li atom is contained per one atom of the transition metal M, the amount of Li to be taken out is twofold that of spinel type lithium manganese oxide, that is, supply ability increases by twofold, and the NMC composite oxide can thus have a high capacity.

As described above, the NMC composite oxide also includes a composite oxide in which a part of the transition metal element(s) is substituted with another metal element(s). Examples of the another element may include Ti, Zr, Nb, W, P, Al, Mg, V, Ca, Sr, Cr, Fe, B, Ga, In, Si, Mo, Y, Sn, V, Cu, Ag, and Zn, the another element(s) is preferably Ti, Zr, Nb, W, P, Al, Mg, V, Ca, Sr, and Cr, more preferably Ti, Zr, P, Al, Mg, and Cr, and from the viewpoint of improving cycle characteristics, the another element(s) is still more preferably Ti, Zr, Al, Mg and Cr.

The NMC composite oxide preferably has a composition represented by General Formula (1): $Li_aNi_bMn_cCo_dM_xO_2$ (wherein a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M is at least one element selected among Ti, Zr, Nb, W, P, Al, Mg, V, Ca, Sr, and Cr), in view of high theoretical discharge capacity. Here, a represents an atomic ratio of Li, b represents an atomic ratio of Ni, c represents an atomic ratio of Mn, d represents an atomic ratio of Co, and x represents an atomic ratio of M. From the viewpoint of cycle characteristics, it is preferable that $0.4 \leq b \leq 0.6$ be satisfied in General Formula (1). Incidentally, the composition of the respective elements can be measured by, for example, inductively coupled plasma (ICP) emission spectrometry.

In general, it has been known that nickel (Ni), cobalt (Co), and manganese (Mn) contribute to capacity and output characteristics from the viewpoint of improving purity of the material and improving electron conductivity. Ti or the like is partially substituted for the transition metal in the crystal lattice. From the viewpoint of cycle characteristics, it is preferable that a part of the transition element be substituted with another metal element, and it is particularly preferable that $0 < x \leq 0.3$ in General Formula (1). It is considered that a crystal structure is stabilized by a solid solution formed by at least one member selected from the group consisting of Ti, Zr, Nb, W, P, Al, Mg, V, Ca, Sr, and Cr, and as a result, a decrease in capacity of the battery can be prevented even when charge and discharge are repeated and excellent cycle characteristics can be realized.

As a more preferred embodiment, it is preferable that b, c, and d satisfy $0.44 \leq b \leq 0.51$, $0.27 \leq c \leq 0.31$, and $0.19 \leq d \leq 0.26$ in General Formula (1) from the viewpoint of improving balance between capacity and lifespan characteristics. For example, $LiNi_{0.5}Mn_{0.3}Co_{0.2}O_2$ has a greater capacity per unit weight as compared to $LiCoO_2$, $LiMn_2O_4$, $LiNi_{1/3}Mn_{1/3}Co_{1/3}O_2$, and the like that have been proven in general consumer batteries, can improve an energy density, and thus has an advantage of being able to be used in fabrication of a compact and high capacity battery, and it is also preferable from the viewpoint of the cruising distance. Incidentally, $LiNi_{0.8}Co_{0.1}Al_{0.1}O_2$ is more advantageous from the viewpoint of a greater capacity, but it has a disadvantage from the viewpoint of lifespan characteristics. In contrast, $LiNi_{0.5}Mn_{0.3}Co_{0.2}O_2$ exhibits excellent lifespan characteristics comparable to $LiNi_{1/3}Mn_{1/3}Co_{1/3}O_2$.

Depending on the cases, two or more kinds of positive electrode active materials may be used in combination. A lithium-transition metal composite oxide is preferably used as the positive electrode active material from the viewpoint of capacity and output characteristics. Incidentally, it is needless to say that a positive electrode active material other than those described above may be used.

An average particle diameter of the positive electrode active material contained in the positive electrode active material layer 15 is not particularly limited, but it is preferably from 1 to 30 µm and more preferably from 5 to 20 µm from the viewpoint of increasing the output. As used in the present specification, the term "particle diameter" means the longest distance among distances between arbitrary two points on the contour line of the active material particle (observation plane) to be observed by using an observation means such as a scanning electron microscope (SEM) or a transmission electron microscope (TEM). In addition, in the present specification, as the value of "average particle diameter", a value calculated as an average value of particle diameters of particles to be observed in several to several tens of visual fields by using an observation means such as a scanning electron microscope (SEM) or a transmission electron microscope (TEM) is adopted. A particle diameter and average particle diameter of other constituent components can also be defined in the same manner.

The positive electrode active material layer 15 can contain a binder.

(Binder)

A binder is added for the purpose of binding active materials with each other or an active material with a current collector to maintain an electrode structure. The binder to be used in the positive electrode active material layer is not particularly limited, but examples thereof may include the following materials. Thermoplastic polymers such as polyethylene, polypropylene, polyethylene terephthalate (PET), polyether nitrile (PEN), polyacrylonitrile, polyimide, polyamide, polyamide-imide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and any hydrogenated product thereof, and a styrene-isoprene-styrene block copolymer and any hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), and an epoxy resin. Among them, polyvinylidene fluoride, polyimide, styrene-butadiene rubber, carboxymethyl cellulose, polypropylene, polytetrafluoroethylene, polyacrylonitrile, polyamide, and polyamide-imide are more preferable. These suitable binders exhibit excellent heat resistance, further have a significantly wide potential window, are stable to both the positive electrode potential and the negative electrode potential, and can be thus used in the active material layer. These binders may be used singly or two or more kinds thereof may be used in combination.

An amount of binder contained in the positive electrode active material layer is not particularly limited as long as the active material can be bound, but it is preferably from 0.5 to 15% by mass and more preferably from 1 to 10% by mass with respect to the active material layer.

The positive electrode (positive electrode active material layer) can be formed by any method of a kneading method, a sputtering method, a vapor deposition method, a CVD method, a PVD method, an ion plating method, or a thermal spraying method, in addition to an ordinary method to coat a slurry.

[Negative Electrode Active Material Layer]

The negative electrode active material layer 13 contains a negative electrode active material.

(Negative Electrode Active Material)

In the present embodiment, the negative electrode active material is formed of a silicon-containing alloy having a ternary alloy composition represented by Si—Sn-M (M is one or two or more transition metal elements) and having a microstructure which has a first phase (silicide phase) having a silicide of a transition metal (silicide) as a main component and a second phase (amorphous Si phase (a-Si phase)) partially containing tin (Sn) and having amorphous or low crystalline Si as a main component, wherein the microstructure has partially a plurality of independent first phases and partially a eutectic structure of the first phase and the second phase. In the present embodiment, since the first phase (silicide phase) has a silicide of a transition metal (silicide) as a main component, M has one or more transition metals forming silicide (referred to as a silicide-forming element) with Si. That is, if M is one transition metal element, M is a silicide-forming element constituting the first phase (silicide phase). In addition, if M is two or more transition metal elements, at least one transition metal element is a silicide-forming element constituting the first phase (silicide phase). The remaining transition metal element may be a transition metal element contained in the second phase (a-Si phase) or a silicide-forming element constituting the first phase (silicide phase). Alternatively, the remaining transition metal element may be a transition metal element constituting a phase (transition metal phase) in which a transition metal crystallizes out other than the first phase and the second phase (a-Si phase).

As described above, the silicon-containing alloy constituting the negative electrode active material in the present embodiment first has a ternary alloy composition represented by Si—Sn-M (M is one or two or more transition metal elements). More specifically, the silicon-containing alloy constituting the negative electrode active material in the present embodiment has a composition represented by the following Chemical Formula (1).

$$Si_xSn_yM_zA_a \quad (I)$$

In Chemical Formula (1) above, A is an unavoidable impurity, M is one or two or more transition metal elements, x, y, z, and a represent a percent by mass, and $0<x<100$, $0<y<100$, $0<z<100$, and $0 \le a<0.5$ and $x+y+z+a=100$.

As it is apparent from Chemical Formula (1) above, the silicon-containing alloy (having a composition of $Si_xSn_yM_zA_a$) according to the present embodiment is a ternary system of Si, Sn, and M (transition metal). With such a composition, it is possible to realize high cycle durability.

As used in the present specification, the term "unavoidable impurity(ies)" means one that is present in the raw material or have been unavoidably mixed into the Si-containing alloy during the production process. The unavoidable impurity is not originally required, but it is in a trace amount and does not affect the characteristics of the Si alloy, and it is thus an allowable impurity(ies).

Particularly preferably in the present embodiment, by selecting Ti that is one of silicide-forming elements as an additive element (M; transition metal) to the negative electrode active material (silicon-containing alloy), it is possible to suppress phase transition between an amorphous state and a crystalline state during the alloying of Si with Li, and thus to improve cycle lifespan. By this, a negative electrode active material can be formed to have a higher capacity than a conventional negative electrode active material (for example, carbon-based negative electrode active material). Hence, according to a preferred embodiment of the present invention, it is preferable that M be titanium (Ti) in the composition represented by Chemical Formula (1) above. In particular, by selecting Ti as an additive element to the negative electrode active material (silicon-containing alloy) and adding Sn as a second additive element, it is possible to even further suppress phase transition between an amorphous state and a crystalline state during the alloying of Si with Li and thus to improve cycle lifespan. By this, a negative electrode active material can be formed to have a higher capacity than a conventional negative electrode active material (for example, carbon-based negative electrode active material). Hence, according to a preferred embodiment of the present invention, it is preferable that M be titanium (Ti) in the composition represented by Chemical Formula (1) above.

Here, in the Si-based negative electrode active material, at the time of alloying Si with Li during the charging, the Si phase transitions from an amorphous state to a crystalline state to cause a great change in volume (about fourfold). As a result, a problem arises in that the active material particles themselves are broken to lose the function as an active material. Hence, by suppressing the phase transition of the Si phase between an amorphous state and a crystalline state during the charging, it is possible to suppress collapse of the particles themselves, to maintain the function (high capacity) as an active material, and also to improve the cycle lifespan.

As described above, the silicon-containing alloy (having a composition of $Si_xSn_yM_zA_a$) according to the present embodiment is a ternary system of Si, Sn, and M (transition metal). Here, a total constituent ratio (mass ratio of x, y, and z) of respective constituent elements is 100% by mass, but each value of x, y, and z is not particularly limited. However, from the viewpoint of maintaining durability with respect to charging and discharging (intercalation and deintercalation of Li ions) and achieving balance in initial capacity, x satisfies preferably $60 \le x \le 73$, more preferably $60 \le x \le 70$, and still more preferably $60 \le x \le 65$. In addition, from the viewpoint of enabling reversible intercalation and deintercalation of Li ions during the charging and discharging by forming a solid-solution of Li ions in the Si phase and increasing a distance between Si regular tetrahedrons in the Si phase, y satisfies preferably $2 \leq y \leq 15$, more preferably $2 \leq y \leq 10$, and still more preferably $5 \leq y \leq 10$. Further, similarly to x, from the viewpoint of maintaining durability with respect to charging and discharging (intercalation and deintercalation of Li ions) and achieving balance in initial capacity, z satisfies preferably $25 \leq z \leq 35$, more preferably $27 \leq z \leq 33$, and still more preferably $28 \leq z \leq 30$. As describe above, when Ti is incorporated in a relatively large amount and Sn is also incorporated in a certain amount while Si is incorporated as a main component, it is easy to achieve the microstructure of the silicon-containing alloy according to the present embodiment. That is, when Ti is contained in a relatively large amount and Sn is also contained in a certain amount while Si is contained as a main component, it is possible to achieve the configuration in which M described above is one or two or more transition metal elements including Ti, a content of Ti in the first phase is larger than a content of the transition metal (including Sn) excluding Ti in the second phase. By this, it is easy to achieve the microstructure of the silicon-containing alloy according to the present embodiment. In addition, by selecting Ti as an additive element to the negative electrode active material (Si-containing alloy) and by adding Sn as a second additive element in the above range, it is possible to sufficiently disperse and solid-solving Sn in a part of the Si phase, to increase a degree that Si is amorphous and to attain sufficient cycle durability. In addition, since Sn that is not dispersed and solid-solved in a part of the Si phase is not segregated as crystalline Sn in the Si phase but crystallizes out (functions as a Sn active material) at a boundary portion between the silicide phase and the Si phase of the eutectic structure and further at a boundary portion between the independent silicide phase and the eutectic structure, it is possible to obtain sufficient cycle durability while a high capacity is maintained. However, the aforementioned numerical range of the constituent ratio of each constituent element is merely illustrative of a preferred embodiment and a constituent ratio of each constituent element out of the range is in the technical scope of the present invention as long as it is included in claims.

As described above, A is an impurity derived from a raw material and a production method (unavoidable impurity) other than the three components described above. a is $0 \leq a < 0.5$ and preferably $0 \leq a < 0.1$.

Herein, as described above, the silicon-containing alloy constituting the negative electrode active material in the present embodiment also has a feature in having a microstructure which has (1) a silicide phase (first phase) having a silicide of a transition metal (silicide) as a main component and (2) an a-Si phase (second phase) partially containing Sn (specifically, Sn is dispersed (solid-solved) inside the crystal structure of Si) and having amorphous or low crystalline Si as a main component, (3) partially a plurality of independent first phases, and (4) partially a eutectic structure of the first phase and the second phase. As described above, the silicon-containing alloy of the present embodiment has a configuration in which the second phase forms a eutectic with the first phase and further enters a gap between a plurality of independent first phases. Further, the silicide phase (first phase) is excellent in hardness and electron conductivity as compared to the a-Si phase (second phase). For this reason, it can be considered that the effects of the present invention can be exerted by a mechanism as described below (see the view of the microstructure of Example 2). That is, when the microstructure of the alloy has the above-described configuration, the expansion of the a-Si phase (particularly, the Si active material) in the eutectic structure in the course of charge and discharge can be suppressed by the eutectic first phase and further suppressed by a plurality of independent first phases. That is, the expansion can be suppressed by two-step suppression. Therefore, the phase transition between an amorphous state and a crystalline state (crystallization to $Li_{15}Si_4$) during the alloying of Si with Li when charging is conducted can be suppressed. As a result, expansion and contraction of the silicon-containing alloy in the course of charge and discharge can be reduced, and when the a-Si phase (second phase) forms a eutectic with the silicide phase (first phase) formed of silicide having electric conductivity, the a-Si phase (particularly, the Si active material) can be allowed to uniformly react. As a result, it is possible to improve cycle durability while an electric device using the negative electrode active material has a high capacity.

Regarding the (1) Silicide Phase (First Phase)

The silicon-containing alloy constituting the negative electrode active material in the present embodiment includes the silicide phase (first phase) having a silicide of a transition metal (silicide) as a main component in the microstructure. The silicide phase (first phase) is excellent in hardness and electron conductivity as compared to the a-Si phase (second phase). By this, the silicide phase (first phase) takes a role of maintaining a form of the Si active material in the a-Si phase (second phase) against the stress at the time of expansion, and can improve low electron conductivity of the a-Si phase (particularly, the Si active material) (see the mechanism as mentioned above). Further, since the silicide phase (first phase) includes a silicide of a transition metal (for example, $TiSi_2$), the silicide phase (first phase) has excellent affinity with the a-Si phase (second phase), and particularly, it is possible to suppress breaking thereof at the (crystal) boundary in the case of volume expansion during the charging. In addition, as described above, in the composition represented by Chemical Formula (1) above, M is preferably titanium (Ti). In particular, by selecting Ti as an additive element to the negative electrode active material (silicon-containing alloy) and adding Sn as a second additive element, it is possible to even further suppress the phase transition between an amorphous state and a crystalline state at the time of alloying Si with Li and thus to improve the cycle lifespan. In addition, by this, a negative electrode active material is formed to have a higher capacity than a conventional negative electrode active material (for example, carbon-based negative electrode active material). Hence, the silicide phase (first phase) having a silicide of a transition metal (silicide) as a main component in the microstructure is preferably titanium silicide ($TiSi_2$).

In the silicide phase (first phase), the expression of having silicide "as a main component" means that the silicide makes up 50% by mass or more of the silicide phase, preferably 80% by mass or more, still more preferably 90% by mass or more, particularly preferably 95% by mass or more, and most preferably 98% by mass or more. Ideally, silicide makes up 100% by mass, but as shown in the elemental analysis table shown below the graph of FIG. 8(b), since trace amounts of P, Sn, and O are unavoidably mixed in addition to Si and Ti, it is practically difficult to achieve that the silicide makes up 100% by mass.

Regarding the (2) a-Si Phase (Second Phase)

The silicon-containing alloy has an a-Si phase (second phase) which partially contains Sn (specifically, Sn is dispersed or solid-solved inside the crystal structure of Si) and has amorphous or low crystalline Si (referred to as a-Si) as a main component in the microstructure. The a-Si phase (second phase) is a phase containing amorphous or low crystalline Si as a main component. The a-Si phase (second phase; a phase having a-Si as a main component) is a phase involved in occlusion and release of lithium ions at the time of operation of the electric device (lithium ion secondary battery) of the present embodiment, and it is a phase capable of electrochemically reacting with Li. Since the a-Si phase (second phase) has Si as a main component, it is possible to occlude and release a large amount of Li per unit weight and unit volume. In addition, Sn in the a-Si phase (second phase) (Sn is dispersed or solid-solved inside the crystal structure of Si) can also occlude and release a large amount of Li per unit weight and unit volume as compared to a carbon negative electrode material. However, since Si exhibits poor electron conductivity, the a-Si phase (second phase) may thus contain a trace amount of an additive element such as phosphorus and boron and a transition metal. Incidentally, it is preferable that the a-Si phase (second phase; a phase having Si as a main component) be amorphized more than the silicide phase (first phase). By employing such a configuration, the negative electrode active material (silicon-containing alloy) can be formed to have a higher capacity. Incidentally, it is possible to confirm whether or not the a-Si phase (second phase) is more amorphized than the silicide phase (first phase) by electron diffraction analysis. Specifically, according to the electron diffraction analysis, a net pattern (lattice-shaped spot) of a two-dimensional point array is obtained for a single crystal phase, a Debye-Scherrer ring (diffraction ring) is obtained for a polycrystalline phase, and a halo pattern is obtained for an amorphous phase. The above confirmation can be attained by utilizing the analysis as above. Further, as described above, in the composition represented by Chemical Formula (1) above, M is preferably is titanium (Ti). In particular, by selecting Ti as an additive element to the negative electrode active material (silicon-containing alloy) and adding Sn as a second additive element, it is possible to even further suppress the phase transition between an amorphous state and a crystalline state at the time of alloying Si with Li and thus to improve the cycle lifespan. In addition, by this, a negative electrode active material is formed to have a higher capacity than a conventional negative electrode active material (for example, carbon-based negative electrode active material). Hence, the Si phase (second phase) having amorphous or low crystalline Si as a main component in the microstructure preferably has amorphous Si as a main component. From the above description, the silicide of the transition metal in the first phase of the microstructure is preferably titanium silicide ($TiSi_2$) and the Si phase (second phase) is preferably a Si phase having amorphous Si as a main component. By employing such a configuration, the electric device has improved cycle durability while the electric device shows a high capacity.

In the Si phase (second phase), the expression of having amorphous or low crystalline Si "as a main component" means that Si makes up 50% by mass or more of the Si phase, preferably 80% by mass or more, still more preferably 90% by mass or more, particularly preferably 95% by mass or more, and most preferably 98% by mass or more. Ideally, Si makes up 100% by mass, but as shown in the elemental analysis table shown below the graph of FIG. 8($b$), since a trace amount of P, Ti, Sn, and O is unavoidably mixed in addition to Si, it is practically difficult to achieve that Si makes up 100% by mass.

In the Si phase (second phase), the reason why the Si phase (second phase) "partially contains Sn" is that as noted from the comparison of FIGS. 7($b$) and 7($c$), the Si phase mostly contains almost no Sn (Si part functions as an active material), but the Si phase partially contains Sn. In the part of the Si phase containing Sn, Sn is dispersed and solid-solved inside the crystal structure of Si (a Sn—Si solid solution functions as an active material). Further, the remaining part of Sn in the eutectic structure does not crystalize out to the Si phase but crystalizes out to the boundary portion or the like of the silicide phase or the Si phase in the eutectic structure to form the Sn phase (functioning as an active material) having Sn as a main component. This is similar to the whole microstructure, and the remaining part of Sn also crystalizes out to a boundary portion or the like of the independent silicide phase as well as to the boundary portion of the silicide phase or the Si phase in the eutectic structure to form the Sn phase (functioning as an active material). The expression of having Sn "as a main component" means that Sn makes up 50% by mass or more of the Sn phase, preferably 80% by mass or more, still preferably 90% by mass or more, particularly preferably 95% by mass or more, and most preferably 98% by mass or more. Ideally, although Sn makes up 100% by mass, it is practically difficult to achieve that Sn makes up 100% by mass, since a small amount of Si, Ti, and O is mixed in addition to Sn.

Regarding the (3) Configuration Wherein Microstructure has Partially a Plurality of Independent First Phases The silicon-containing alloy has a feature in that a part of the microstructure includes a plurality of independent first phases. When a part of the microstructure includes a plurality of independent silicide phases (first phases), as shown in the mechanism, it is possible to suppress the expansion of the second phase (a-Si phase) in the eutectic structure in the course of charge and discharge by a plurality of independent first phases. In addition, it is possible to improve a low electron conductivity of the a-Si phase (particularly, the Si active material).

Regarding the (4) Configuration Wherein Microstructure has Partially Eutectic Structure of First Phase and Second Phase The silicon-containing alloy has a feature in that a part of the microstructure includes a eutectic structure of the first phase and the second phase. When a part of the microstructure includes the eutectic structure of the first phase and the second phase, as shown in the mechanism, it is possible to suppress the expansion of the second phase (a-Si phase) in the eutectic structure in the course of charge and discharge by the eutectic first phase. In addition, it is possible to improve a low electron conductivity of the a-Si phase (particularly, the Si active material).

The silicon-containing alloy is obtained by melting a predetermined alloy raw material by a liquid quenching roll solidification method and forming an alloy by quenching at a predetermined cooling rate so that a plurality of independent first phases crystallize out as a primary crystal in a liquid phase and the eutectic structure of the first phase and the second phase crystallizes out in a gap in the liquid phase between the independent first phases.

In each of the silicide phases (first phases) in which a plurality of silicide phases are independently present and the silicide phases (first phases) in the eutectic structure, a plurality of phases may exist, and for example, two or more phases having a different composition ratio of the transition metal element M and Si (for example, $MSi_2$ and MSi) may exist. In addition, when silicides with different transition metal elements are contained, two or more phases may exist. Herein, the kind of the transition metal contained in the silicide phase (first phase) is not particularly limited, and the transition metal is preferably at least one selected from the group consisting of Ti, Zr, Ni, Cu, and Fe, more preferably Ti or Zr, and particularly preferably Ti. These elements have higher electron conductivity than silicides of other elements and a high strength when the elements form a silicide. In particular, a silicide, $TiSi_2$, wherein the transition metal element is Ti, is preferably since it exhibits significantly excellent electron conductivity.

In particular, if the transition metal element M is Ti and two or more phases having a different composition ratio (for example, $TiSi_2$ and TiSi) exist in the silicide phase, the $TiSi_2$ phase makes up 50% by mass or more of the silicide phase, preferably 80% by mass or more, still more preferably 90% by mass or more, particularly preferably 95% by mass or more, and most preferably 100% by mass.

Regarding the microstructure of the silicon-containing alloy with the above-described configuration (structure), the structure of the microstructure of the silicon-containing alloy (particle) that is a negative electrode active material particle can be demonstrated, for example, by high resolution scanning transmission electron microscope (STEM) observation, elemental analysis with energy dispersive X-ray spectroscopy (EDX), electron diffraction measurement and electron energy-loss spectroscopy (EELS) measurement. As an analysis apparatus (analysis method), an X-ray photoelectron spectroscopy (XPS), a transmission electron microscope-energy dispersive X-ray spectroscopy (TEM-EDX), a scanning transmission electron microscope-energy dispersive X-ray spectroscopy/electron energy loss spectroscopic analyzer (STEM-EDX/EELS), a high-angle scattering dark field-scanning transmission electron microscope image (HAADF-STEM), and the like can be used. However, in the present embodiment, there is no limitation on the analysis apparatus (analysis method), and various observation apparatuses (apparatus conditions and measurement conditions) that have been conventionally used for the microstructure of the alloy may be used.

Hereinafter, description will be given using, as an example, a silicon-containing alloy (particle) that is a negative electrode active material particle fabricated in Example 2 as a sample. However, as for another silicon-containing alloy (particle) that is a negative electrode active material particle obtained in the present embodiment, the structure of the microstructure of the alloy (particle) can be similarly demonstrated.

1: Analysis Method 1-1: Sample Preparation

Focused ion beam (FIB) method; Micro sampling system (manufactured by Hitachi, Ltd., FB-2000A)

Al grid is used.

1-2: Apparatuses and conditions for measurement of STEM image, EDX, and EELS (electron energy loss spectroscopy) are as follows.

1) Apparatus; Atomic resolution analysis electron microscope manufactured by JEOL Ltd., JEM-ARM 200F Energy dispersive X-ray spectroscopy (EDX)

; JED-2300 manufactured by JEOL Ltd.

(100 $mm^2$ silicon drift (SDD) model)

; System: Analysis Station

Electron energy loss spectroscopy (EELS)

; GATAN GIF Quantum

Image acquisition; Digital Micrograph

2) Measurement conditions; acceleration voltage: 200 kV

Beam diameter: about 0.2 nm φ (diameter)

Energy resolution: about 0.5 eV FWHM 1-3: An apparatus and conditions for electron diffraction measurement are as follows.

1) Apparatus; Field emission type electron microscope manufactured by JEOL Ltd., JEM 2100F Image acquisition; Digital Micrograph 2) Measurement conditions; acceleration voltage: 200 kV Beam diameter: about 1.0 nm φ (diameter)

2: (Quantitative Mapping) Analysis by Scanning Transmission Electron Microscope-Energy Dispersive X-Ray Spectroscopy (STEM-EDX)

Figure 3A:
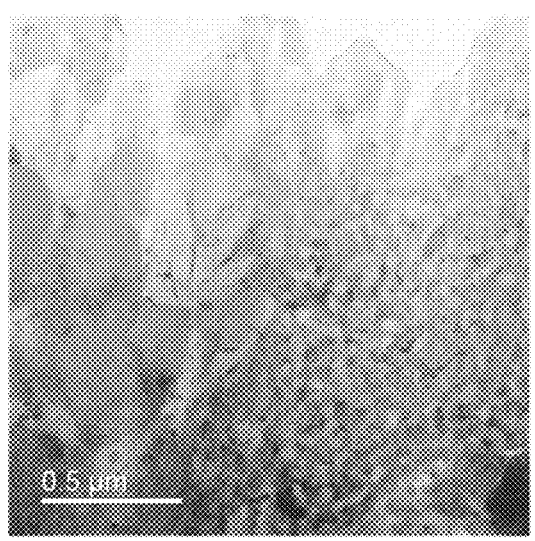
FIG. 3(a) is a view which illustrates a bright field-scanning transmission electron microscope image (BF-STEM Image) of a sample obtained when a silicon-containing alloy (particle) according to present embodiment is prepared by an FIB method (low magnification).
Figure 3B:
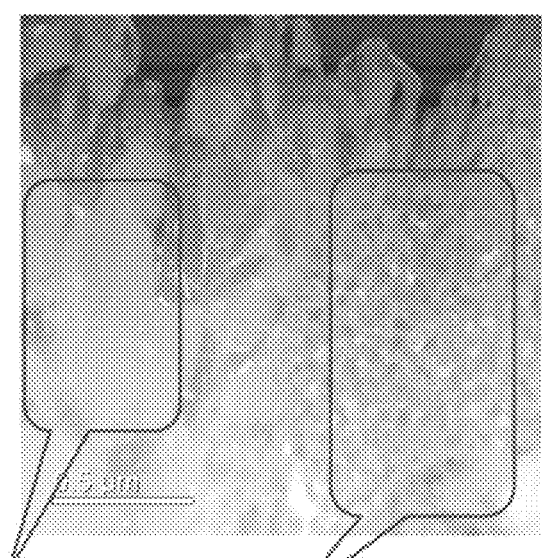
FIG. 3(b) is a view which illustrates a high-angle scattering dark field-scanning transmission electron microscope image (HAADF-STEM Image) of active material particles in the same field as FIG. 3(a).

FIG. 3(a) is a view which illustrates a bright field-scanning transmission electron microscope image (BF-STEM Image) of a sample obtained when a silicon-containing alloy (particle) according to present embodiment is prepared by an FIB method (low magnification). FIG. 3(b) is a view which illustrates a high-angle scattering dark field-scanning transmission electron microscope image (HAADF-STEM Image) of active material particles in the same field as FIG. 3(a). As for a measurement target, a cross-section of a negative electrode active material particle, which is fabricated by coating 2% by mass of alumina on a surface of a silicon-containing alloy (particle) having an average particle diameter of D50=7 μm (D90=20 μm), as a size of the negative electrode active material particle obtained by pulverizing a quenched thin strip alloy having an alloy composition of the present embodiment, was used as an observation target. An alloy represented by an alloy composition $Si_{60}Sn_{10}Ti_{30}$ of Example 2 was used as a quenched thin strip alloy. FIG. 4 is a view which illustrates quantitative mapping data by scanning transmission electron microscope-energy dispersive X-ray spectroscopy (STEM-EDX). FIG. 4(a) illustrates the same HAADF-STEM image as FIG. 3(b). FIG. 4(b) is a view which illustrates mapping data of Sn (on the lower left) measured in the same field as HAADF-STEM (the upper left in FIG. 4(a)). FIG. 4(c) is a view which illustrates mapping data of Si (on the lower middle) measured in the same field as HAADF-STEM (the upper left in FIG. 4(a)). FIG. 4(d) is a view which illustrates mapping data of Ti (on the lower right) measured in the same field as HAADF-STEM (the upper left in FIG. 4(a)). FIG. 4(e) is a view in which mapping data items of Sn, Si, and Ti measured in the same field as HAADF-STEM (the upper left in FIG. 4(a)) are superimposed (on the upper right). Incidentally, in practice, since the mapping of FIGS. 4(b) to 4(e) can be described with coloring (be colored), for example, when Sn is colored with green, Si is colored with blue, and Ti is colored with red, the silicide ($TiSi_2$) becomes pink obtained by mixing blue of Si and red of Ti so that the silicide can be determined at a glance. However, since the drawings of the application are required to be submitted with black-and-white images, analysis information apparently understood by such coloring is incorporated in FIGS. 3(b) and 4(e). The reason for this is that a person skilled in the art can easily obtain the same analysis information by the same image analysis as in the present application from quantitative mapping data in the same manner as in FIG. 4 by scanning transmission electron microscope-energy dispersive X-ray spectroscopy (STEM-EDX). Incidentally, in FIGS. 4(b) to 4(d), a part in which Sn, Si, and Ti do not exist is described with black, and a part in which these elements exist is described with gray or white. According to this, the presence and distribution state of Si, Sn, and Ti that are elements constituting an active material alloy $Si_{60}Sn_{10}Ti_{30}$ serving as a measurement target (the negative electrode active material of Example 2) can also be confirmed.

In the above-described analysis, observation of the STEM image includes two types of observation methods of a bright-field (BF) STEM image formed by using an electron beam passing through a sample and a dark-field (DF) STEM image formed by using an electron beam scattered from a sample. In the BF-STEM image shown in FIG. 3(a), a transmission image showing an inner structure of the sample can be observed as in a normal TEM image. In the (HAA)DF-STEM image shown in FIG. 3(b), a composition image from which a contrast reflecting the composition of the sample can be obtained can be observed. In particular, in the high-angle scattering annular dark field (HAADF), a contrast of elastically scattered electrons due to atomic number (Z) is superior. Therefore, the HAADF is an imaging method also referred to as a Z-contrast image. A material having a large atomic number is seen brightly (see FIGS. 3(b), 4(a), 5(b), 6(b), 7(a), 8(a), and 9(a)). In the high-angle scattering annular dark field scanning transmission electron microscopy (HAADF-STEM), an image is obtained by irradiating a sample with a narrow electron beam during an operation and detecting transmission electrons scattered at a high angle with an annular detector. A material having a higher $Z^2\rho$ is scattered at a higher angle. Therefore, a heavy element is dark in the STEM image, and bright in the HAADF-STEM image. A contrast proportional to an atomic weight (Z) is obtained. Therefore, the image is also referred to as the Z contrast image. Further, in the STEM-EDX quantitative mapping, information of composition distribution of a sample can be obtained by taking a characteristic X-ray generated at each point into an energy-dispersive-spectroscopy (EDS) detector while the sample is scanned with a narrow electron beam. In the transmission electron microscope (TEM) measurement, diffusion of an electron beam as in the scanning electron microscope (SEM) measurement hardly occurs, and the measurement can be performed with nanometric spatial resolution.

From the mapping data in which Sn, Si, and Ti are superimposed of FIG. 4(e) on the upper right, it is possible to confirm that a plurality of (relatively large) gray parts corresponding to silicide ($TiSi_2$) independently exist in the enclosed part on the left side in the microstructure of the sample and in the vicinity of the periphery thereof. The reason why this part is silicide is that it is possible to confirm that the (relatively large) gray parts in enclosed part on the left side and in the vicinity of the periphery thereof are colored by pink obtained by mixing blue of Si and red of Ti in the case of coloring. In addition, also in the observation of the black-and-white image, from the mapping data of Ti of FIG. 4(d), it is possible to confirm that a plurality of (relatively large) gray parts representing the presence of Ti independently exist in the enclosed part on the left side in the microstructure of the sample and in the vicinity of the periphery thereof. Further, from the mapping data of Si of FIG. 4(c), the gray part representing the presence of Si can be confirmed in the enclosed part on the left side of FIG. 4(d) in the microstructure of the sample and a part corresponding to the vicinity of the periphery thereof. Further, from the mapping data of Sn of FIG. 4(b), it is possible to confirm that the gray part representing the presence of Sn does almost not exist in the enclosed part on the left side of FIG. 4(d) in the microstructure of the sample and a part corresponding to the vicinity of the periphery thereof. Also from the black-and-white images of FIGS. 4(b), 4(c), and 4(d), it is possible to a plurality of (relatively large) gray parts in which both Si and Ti exist independently exist in the enclosed part on the left side in the microstructure of FIG. 4(e) and in the vicinity of the periphery thereof. From these descriptions, it is possible to confirm that the microstructure of the silicon-containing alloy (particle) of the present embodiment includes a silicide phase (first phase) having a silicide of a transition metal (silicide) as a main component in the above (1) and partially includes a plurality of independent silicide phases (first phases) in the above (3).

Then, from the mapping data in which Sn, Si, and Ti are superimposed of FIG. 4(e) on the upper right, it is possible to confirm that the silicide phase (first phase) and the Si phase (second phase) containing Sn form a eutectic structure (a structure comprising a the first phase and the second phase in a mixed state, each of which is (solid solution) crystalline or amorphous or low crystalline with a different component ratio) in the enclosed part on the right side in the microstructure of the sample and in the vicinity of the periphery thereof.

Specifically, it is possible to confirm that the (relatively small) dark gray part (Si+Sn part) corresponding to the Si phase (second phase) partially containing Sn and the (relatively small) gray part corresponding to the silicide phase (first phase) are mixed in the enclosed part on the right side and in the vicinity of the periphery thereof. From this, it is noted that both the fine Si phase and the fine silicide phase form a eutectic (a eutectic structure). The eutectic structure can be confirmed as follows in the case of coloring. That is, dark gray parts (second phases) in the enclosed part on the right side and in the vicinity of the periphery thereof become mainly blue of Si (including a small amount of Sn) or blue-green obtained by mixing blue of Si and green of Sn. Meanwhile, gray parts (first phases) become pink obtained by mixing blue of Si and red of Ti. Further, since the (relatively small) blue or blue-green part corresponding to the Si phase (second phase) containing Sn and the pink part corresponding to the silicide phase (first phase) are mixed, these can be confirmed to be a eutectic structure.

Further, also in the observation of the black-and-white image, from the mapping data of Ti of FIG. 4(d), it is possible to confirm that a large number of (relatively small) gray parts representing the presence of Ti are scattered in the enclosed part on the right side in the microstructure of the sample and in the vicinity of the periphery thereof. Furthermore, from the mapping data of Si of FIG. 4(c), the gray part representing the presence of Si can be confirmed in the enclosed part on the right side of FIG. 4(d) in the microstructure of the sample and a part corresponding to the vicinity of the periphery thereof. Further, from comparison between the mapping data of Sn of FIG. 4(b) and the mapping data of Ti of FIG. 4(d), it is possible to confirm that the gray part representing the presence of Sn of FIG. 4(b) does almost not exist in the enclosed part on the right side in the microstructure of FIG. 4(d) and in the vicinity of the periphery thereof in which Ti is scattered. That is, from FIGS. 4(b), 4(c), and 4(d), it is possible to confirm that a large number of (relatively small) gray parts in which both Si and Ti exist are scattered in the enclosed part on the right side in the microstructure of FIG. 4(d) and in the vicinity of the periphery thereof. Further, from FIGS. 4(b) and 4(c), it is possible to confirm that a large number of Si (including a small amount of Sn) and Sn+Si parts are mainly scattered in the enclosed part on the right side in the microstructure of FIG. 4(d) and in the vicinity of the periphery thereof in which the gray part (silicide) is not scattered (a large number of relatively small black parts are scattered). Also from these, it is possible to confirm that the silicide phase (first phase) and the Si phase (second phase) partially containing Sn form a eutectic structure in the enclosed part on the right side of FIG. 4(d) and in the vicinity of the periphery thereof.

From these descriptions, it is possible to confirm that the microstructure of the silicon-containing alloy (particle) of the present embodiment includes (1) a silicide phase (first phase) having a silicide of a transition metal (silicide) as a main component and (2) an a-Si phase (second phase) partially containing Sn (specifically, Sn is dispersed or solid-solved inside the crystal structure of Si) and having amorphous or low crystalline Si as a main component, and (4) partially a eutectic structure of the first phase and the second phase.

Incidentally, the white part in FIG. 3(b)=FIG. 4(a) is a Sn phase (which may contain a trace amount of Si and Ti) having Sn which is not completely dispersed or solid-solved in the amorphous or low crystalline Si of the second phase crystalizes out. Such a Sn phase may crystalize out to a part other than the independent first phase and the eutectic structure (a part other than enclosed part on the right and left sides of FIG. 3(b)) or may crystalize out to a part other than the first phase and the second phase in the eutectic structure (the enclosed part on the right side of FIG. 3(b)). These can also function as a Sn active material, are less expanded and contracted in the course of charge and discharge than Si, and the expansion and contraction of the Sn phase in the eutectic structure can be prevented similarly to the suppression mechanism of expansion and contraction of the Si phase in the eutectic structure. In addition, also regarding Sn in the part other than the independent first phase and the eutectic structure, since the independent first phase exists in the vicinity thereof, expansion and contraction can be prevented similarly to expansion and contraction suppression mechanism by the independent first phase. Therefore, even when the white part (Sn phase) seen in FIG. 3(b) exists, it is possible to sufficiently suppress degradation of the negative electrode active material alloy.

Figure 5A:
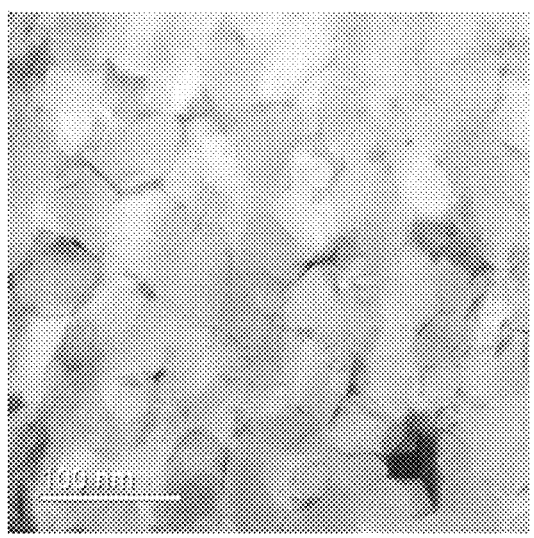
FIG. 5(a) is a view which illustrates a bright field-scanning transmission electron microscope image (BF-STEM Image) obtained by enlarging a eutectic structure of the silicon-containing alloy (particle) of the present embodiment (intermediate magnification).
Figure 5B:
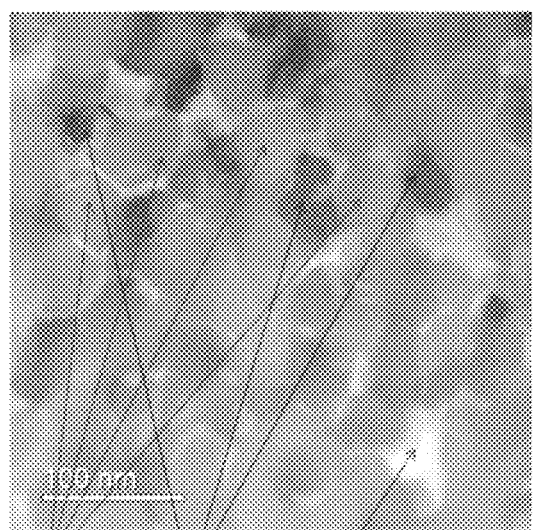
FIG. 5(b) is a view which illustrates a high-angle scattering dark field-scanning transmission electron microscope image (HAADF-STEM Image) of active material particles in the same field as FIG. 5(a).

Next, FIG. 5(a) is a view which illustrates a bright field-scanning transmission electron microscope image (BF-STEM Image) obtained by enlarging a eutectic structure of the silicon-containing alloy (particle) of the present embodiment (intermediate magnification). FIG. 5(b) is a view which illustrates a high-angle scattering dark field-scanning transmission electron microscope image (HAADF-STEM Image) of active material particles in the same field as FIG. 5(a). As for a measurement target, a cross-section of a negative electrode active material particle, which is fabricated by coating 2% by mass of alumina on a surface of a silicon-containing alloy (particle) having an average particle diameter of D50=7 µm (D90=20 µm), as a size of the negative electrode active material particle obtained by pulverizing a quenched thin strip alloy having an alloy composition of the present embodiment, was used as an observation target. Specifically, a part obtained by further enlarging a part of the eutectic structure in the enclosed part on the right side of FIGS. 3(b) and 4(e) was designated as an observation target. An alloy represented by an alloy composition $Si_{60}Sn_{10}Ti_{30}$ of Example 2 was used as a quenched thin strip alloy. The gray part of FIG. 5(b) is a silicide ($TiSi_2$) phase (first phase) in a eutectic structure, the dark gray (or black) part is an a-Si phase (second phase) partially containing Sn in a eutectic structure, and the whitish part is a Sn phase having Sn (which crystalizes out without completely being dispersed or solid-solved in a second phase) as a main component. Some of these parts are indicated by arrows in FIG. 5(b) such that the parts correspond to $TiSi_2$ (silicide phase), Si (a-Si phase containing Sn), and Sn (Sn phase), respectively.

Figure 6A:
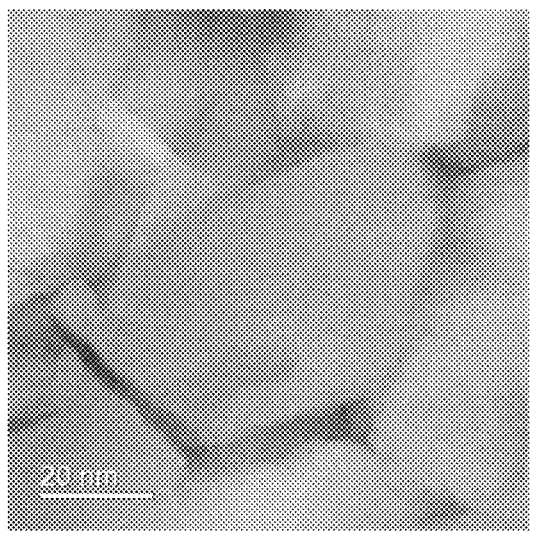
FIG. 6(a) is a view which illustrates a bright field-scanning transmission electron microscope image (BF-STEM Image) obtained by further enlarging a part of the eutectic structure of the silicon-containing alloy (particle) of the present embodiment (high magnification).
Figure 6B:
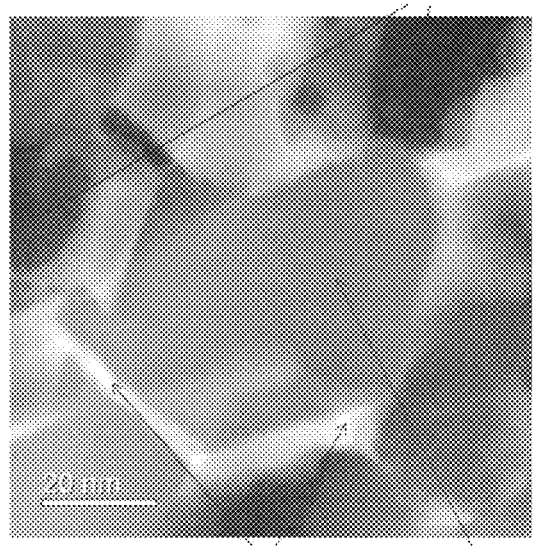
FIG. 6(b) is a view which illustrates a high-angle scattering dark field-scanning transmission electron microscope image (HAADF-STEM Image) of active material particles in the same field as FIG. 6(a).

FIG. 6(a) is a view which illustrates a bright field-scanning transmission electron microscope image (BF-STEM Image) obtained by further enlarging a part of the eutectic structure of the silicon-containing alloy (particle) of the present embodiment (high magnification). FIG. 6(b) is a view which illustrates a high-angle scattering dark field-scanning transmission electron microscope image (HAADF-STEM Image) of active material particles in the same field as FIG. 6(a). As for a measurement target, a cross-section of a negative electrode active material particle, which is fabricated by coating 2% by mass of alumina on a surface of a silicon-containing alloy (particle) having an average particle diameter of D50=7 µm (D90=20 µm), as a size of the negative electrode active material particle obtained by pulverizing a quenched thin strip alloy having an alloy composition of the present embodiment, was used as an observation target. Specifically, a part obtained by further enlarging a second silicide phase from the left and a peripheral part thereof among parts of $TiSi_2$ (silicide phase) in the eutectic structure indicated by arrows in FIG. 5(b) that is an enlarged view was used as an observation target. An alloy represented by an alloy composition $Si_{60}Sn_{10}Ti_{30}$ of Example 2 was used as a quenched thin strip alloy. The gray part in FIG. 6(b) is a silicide ($TiSi_2$) phase (first phase) in a eutectic structure, the dark gray (or black) part is an a-Si phase (second phase) partially containing Sn in a eutectic structure, and the whitish part is a Sn phase having Sn (which crystallizes out without completely being dispersed or solid-solved in a second phase) as a main component (which may contain Si and Ti in a small amount).

FIG. 7 is a view which illustrates quantitative mapping data by scanning transmission electron microscope-energy dispersive X-ray spectroscopy (STEM-EDX). FIG. 7(a) illustrates the same HAADF-STEM image as FIG. 6(b). FIG. 7(b) is a view which illustrates mapping data of Sn (on the lower left) measured in the same field as HAADF-STEM (the upper left in FIG. 7(a)). FIG. 7(c) is a view which illustrates mapping data of Si (on the lower middle) measured in the same field as HAADF-STEM (the upper left in FIG. 7(a)). FIG. 7(d) is a view which illustrates mapping data of Ti (on the lower right) measured in the same field as HAADF-STEM (the upper left in FIG. 7(a)). FIG. 7(e) is a view in which mapping data items of Sn, Si, and Ti measured in the same field as HAADF-STEM (the upper left on) are superimposed (on the upper right).

Incidentally, in practice, since the mapping of FIGS. 7(b) to 7(e) can be described with coloring (be colored), for example, when Sn is colored with green, Si is colored with blue, and Ti is colored with red, the silicide ($TiSi_2$) becomes pink obtained by mixing blue of Si and red of Ti so that the silicide can be determined at a glance. However, since the drawings of the application are required to be submitted with black-and-white images, analysis information apparently understood by such coloring is incorporated in FIGS. 6(b) and 7(e). The reason for this is that a person skilled in the art can easily obtain the same analysis information by the same image analysis as in the present application from quantitative mapping data in the same manner as in FIG. 7 by scanning transmission electron microscope-energy dispersive X-ray spectroscopy (STEM-EDX).

Incidentally, in FIGS. 7(b) to 7(d), a part in which Sn, Si, and Ti do not exist is described with black, and a part in which these elements exist is described with gray or white. According to this, the presence and distribution state of Si, Sn, and Ti that are elements constituting an active material alloy $Si_{60}Sn_{10}Ti_{30}$ serving as a measurement target (the negative electrode active material of Example 2) can also be confirmed.

By comparing the mapping data in which Sn, Si, and Ti are superimposed of FIG. 7(a) on the upper left side and FIG. 7(e) on the upper right side, it is possible to confirm that the silicide phase (first phase) and the Si phase (second phase) partially containing Sn form a eutectic structure (a structure comprising a the first phase and the second phase in a mixed state, each of which is (solid solution) crystalline or amorphous or low crystalline with a different component ratio)).

Specifically, in FIGS. 7(a) and 7(e), it is possible to confirm that the black part in FIG. 7(a) and dark gray part in FIG. 7(e) (Si+Sn part) corresponding to a Si phase (second phase) partially containing Sn and the gray part corresponding to a silicide phase (first phase) are mixed. From this, it is noted that both the fine Si phase and the fine silicide phase form a eutectic (a eutectic structure). The eutectic structure can be confirmed as follows in the case of coloring. That is, dark gray parts (second phases) in parts of left oblique upper, upper right, lower middle, and the like of FIG. 7(e) become mainly blue of Si (including a small amount of Sn) or blue-green obtained by mixing blue of Si and green of Sn. Meanwhile, gray parts (first phases) in parts of middle, lower left, upper right, lower left, and the like of FIG. 7(e) become pink obtained by mixing blue of Si and red of Ti. Further, since the blue or blue-green part corresponding to the Si phase (second phase) partially containing Sn and the pink part corresponding to the silicide phase (first phase) are mixed, these can be confirmed to be a eutectic structure.

Further, also in the observation of the black-and-white image, from the mapping data of Ti of FIG. 7(d), the gray part representing the presence of Ti can be confirmed in parts of middle, lower left, upper right, lower left, and the like. Furthermore, from the mapping data of Si of FIG. 7(c), the gray part representing the presence of Si can be confirmed in a wide range including parts of middle, lower left, upper right, lower left, and the like. In addition, from the mapping data of Sn of FIG. 7(b), it is possible to confirm that the gray part representing the presence of Sn does almost not exist in parts (silicide part) of middle, lower left, upper right, lower left, and the like. Also from these black-and-white images of FIGS. 7(b), 7(c), and 7(d), it is possible to confirm that both Si and Ti are scattered in parts of middle, lower left, upper right, lower left, and the like of FIGS. 7(a) and 7(e). From these descriptions, it is possible to confirm that the silicide phase is scattered in the eutectic structure in the above (4). Further, it is possible to confirm that in parts of left oblique upper, upper right, lower middle, and the like of FIG. 7(e), the part corresponding to the Si phase (second phase) partially containing Sn is scattered as the black part in FIG. 7(a) and as the dark gray part in FIG. 7 (e). Meanwhile, it is possible to confirm that in parts of left oblique upper, upper right, lower middle, and the like of FIG. 7(d), the Si (including a small amount of Sn) or the Sn+Si part is mainly scattered in a part (black part) in which the gray part (silicide) does not exist (is not scattered), as compared to FIGS. 7(b) and 7(c). Also from the these black-and-white images of FIGS. 7(b), 7(c), and 7(d), it is possible to confirm that both Si and Sn are scattered in parts of left oblique upper, upper right, lower middle, and the like of FIGS. 7(a) and 7(e).

From the above description, it is possible to confirm that the microstructure of FIGS. 7(a) to 7(e) includes a eutectic structure of a silicide phase (first phase) and a Si phase (second phase) partially containing Sn. From these points of view, it is possible to confirm that the eutectic structure of the silicon-containing alloy (particle) of the present embodiment contains (1) a silicide phase (first phase) having a silicide of a transition metal (silicide) as a main component, (2) an a-Si phase (second phase) partially containing Sn (specifically, Sn is dispersed or solid-solved inside the crystal structure of Si) and having amorphous or low crystalline Si as a main component, and (4) partially a eutectic structure of the first phase and the second phase.

Figures 8A, 8B, 8C:
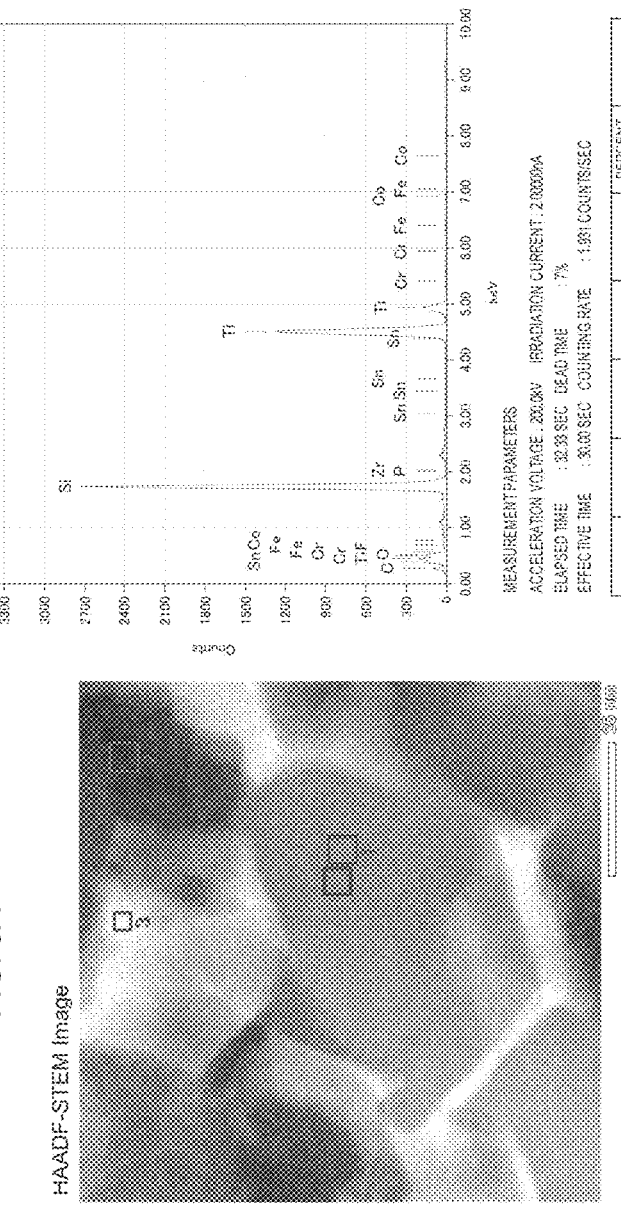
FIG. 8(a) illustrates the same HAADF-STEM image as FIGS. 6(b) and 7(a), and is a view in which the rectangular frame of a part to be observed in elemental distribution (part of the circled number 1 in the image) is illustrated by a bold line.
FIG. 8(b) is a view obtained by elemental analysis of the part to be observed in elemental distribution in FIG. 8(a).
FIG. 8(c) is an elemental analysis table collectively showing elemental analysis results of FIG. 8(b).

3: Analysis by High-Angle Scattering Dark Field-Scanning Transmission Electron Microscope Image (HAADF-STEM Image) and Elemental Analysis Method FIGS. 8 and 9 illustrate the same HAADF-STEM image as FIGS. 6(b) and 7(a), and are views in which areas (two parts enclosed by rectangular frames) in which presence of elements in the silicide phase (first phase) and elements in the Si phase (second phase) is observed by elemental analysis are divided by the numbers 1 and 2 in the image. FIG. 8(a) illustrates the same HAADF-STEM image as FIGS. 6(b) and 7(a), and is a view in which the rectangular frame of a part to be observed in elemental distribution (part of the circled number 1 in the image) is illustrated by a bold line. FIG. 8(b) is a view obtained by elemental analysis of the part to be observed in elemental distribution in FIG. 8(a). FIG. 8(c) is an elemental analysis table collectively showing elemental analysis results of FIG. 8(b).

From FIG. 8(b), in the circled number 1 part (a part of a silicide phase) of FIG. 8(a) that is a part as an observation target of the elemental distribution, a peak of Si element and a peak of Ti element are observed but almost no peaks of Sn element are observed. In addition, from FIGS. 8(b) and 8(c), Si and Ti are confirmed to exist at an atomic ratio of about 2:1. Also from this, the gray part including the circled number 1 part can be confirmed to be a silicide (TiSi$_2$ phase). Incidentally, from FIG. 8(b), in the circled number 1 part (a part of a silicide phase) of FIG. 8(a), trace amounts of Sn element and P element are unavoidably contained.

FIG. 9(a) illustrates the same HAADF-STEM image as FIGS. 6(b) and 7(a), and is a view in which the rectangular frame of a part to be observed in elemental distribution (part of the circled number 2 in the image) is illustrated by a bold line. FIG. 9(b) is a view obtained by elemental analysis of the part to be observed in elemental distribution in FIG. 9(a). FIG. 9(c) is an elemental analysis table collectively showing elemental analysis results of FIG. 9(b).

From FIG. 9(b), in the circled number 2 part (a Si phase (second phase) partially containing Sn) of FIG. 9(a) that is a part as an observation target of the elemental distribution, a peak of Si element is observed but almost no peaks of Sn element and Ti element are observed. However, from the elemental analysis table of the circled number 2 part of FIG. 9(a), it is found that a small amount of Sn is contained. From this, the black part including the circled number 2 part can be confirmed to be a Si phase (second phase) partially containing Sn. Incidentally, from FIG. 9(b), in the circled number 2 part (a part of a Si phase) of FIG. 9(a), trace amounts of P element and Ti element are unavoidably contained.

Figure 11:
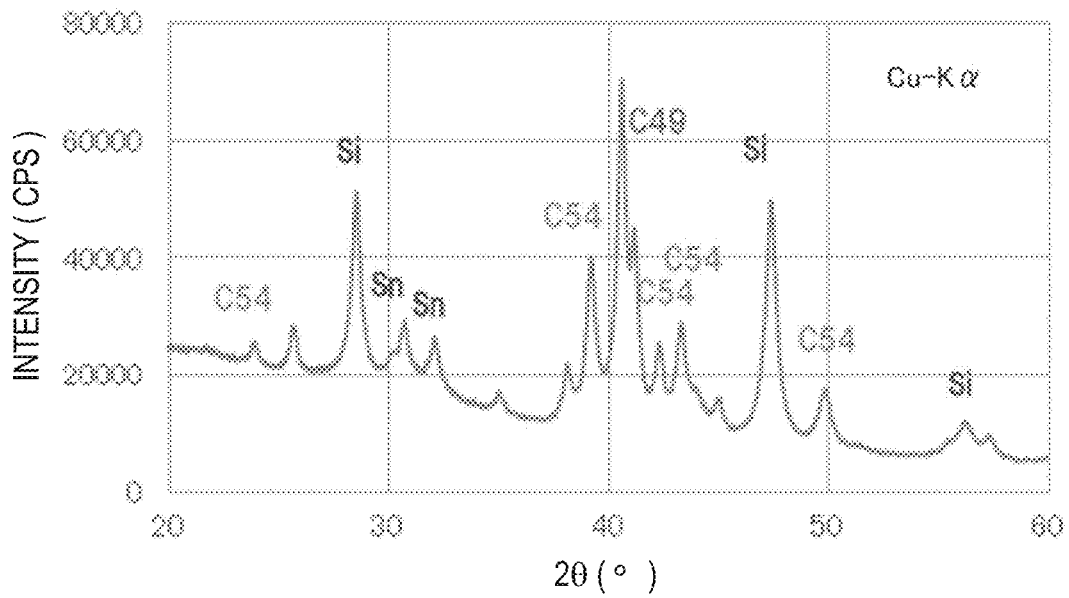
FIG. 11 is a chart obtained by (powder) X-ray diffraction (XRD) measurement of the same alloy of Example 2 as FIG. 10.

3: Analysis by Electron Diffraction and (Powder) X-Ray Diffraction (XRD) Measurement FIG. 10(a) is a view which illustrates the same high-angle scattering dark field-scanning transmission electron microscope image (HAADF-STEM Image) as FIG. 3(b). As described above, a relatively large gray part in the enclosed part on the left side in the drawing and the vicinity of the periphery thereof indicate an independent silicide phase. In addition, in the enclosed part on the right side in the drawing and the vicinity of the periphery thereof, a eutectic structure, in which a relatively small dark gray part (Si+Sn part) corresponding to a Si phase (second phase) partially containing Sn and a relatively small gray part corresponding to a silicide phase (first phase) are mixed, is shown. FIG. 10(b) is a view obtained by further enlarging a part of a eutectic structure of the enclosed part on the right side in FIG. 10(a), and is a view which illustrates the same high-angle scattering dark field-scanning transmission electron microscope image (HAADF-STEM Image) as FIG. 6(b). FIG. 10(c) illustrates a diffraction pattern obtained by performing a fast Fourier transformation treatment to an area of an independent silicide phase of the enclosed part on the left side in FIG. 10(a) by electron diffraction measurement. FIG. 10(d) illustrates a diffraction pattern obtained by performing a fast Fourier transformation treatment to an area of an a-Si phase in the eutectic structure in FIG. 10(b) by electron diffraction measurement. FIG. 10(e) illustrates a diffraction pattern obtained by performing a fast Fourier transformation treatment to an area of a silicide phase in the eutectic structure in FIG. 10(b) by electron diffraction measurement. FIG. 11 is a chart obtained by (powder) X-ray diffraction (XRD) measurement of the same alloy of Example 2 as FIG. 10. Incidentally, regarding FIGS. 10(a) and 10(b), the description thereof will be omitted since it is as described in FIGS. 3(b) and 6(b). The observation target of FIGS. 10 and 11 is, as described above, an alloy represented by an alloy composition $Si_{60}Sn_{10}Ti_{30}$ of Example 2.

In the diffraction pattern obtained by performing the fast Fourier transformation treatment by the electron diffraction measurement, a net pattern (lattice-shaped spot) of a two-dimensional point array is obtained for a single crystal phase, a Debye-Scherrer ring (diffraction ring) is obtained for a polycrystalline phase, and a halo pattern is obtained for an amorphous phase. Further, regarding the net pattern (silicide phase) of the two-dimensional point array, a crystal structure thereof can also be specified. That is, in both of the diffraction patterns shown in FIGS. 10(c) and 10(e), the net pattern of the two-dimensional point array is obtained, which can be confirmed to be a single crystal phase. Further, from the diffraction patterns shown in FIGS. 10(c) and 10(e), it was confirmed that a (silicide) crystal structure of an independent silicide phase and a silicide phase in a eutectic structure, which are a single crystal phase, are a C49 structure. In addition, from the X-ray diffraction (XRD) chart of FIG. 11, as a crystal structure of the alloy composition of Example 2, a C49 structure confirmed in FIGS. 10(c) and 10(e) has the maximum peak as silicide other than the peaks of Si and Sn, and the peak of the C54 structure is further observed. From this, it was found from the peak intensities that the silicide phase has a structure as to contain silicide of C49 structure as a main component and partially (as a subcomponent) silicide of C54 structure. Herein, a silicide ($TiSi_2$) of C49 structure has a lower hardness than a silicide of C54 structure. On the other hand, a silicide ($TiSi_2$) having C54 structure has a higher hardness and a higher toughness than a silicide of C49 structure. Accordingly, expansion of a second phase (particularly, a Si phase) in a eutectic structure in the course of charge and discharge is suppressed by a silicide phase having a different eutectic structure (C49 and C54 structures) and can be further suppressed by a plurality of independent different structures (C49 and C54 structures). A silicide of C49 structure as a main component has a lower hardness than a silicide of C54 structure. Accordingly, while expansion of a second phase (particularly, a Si phase) in a eutectic structure is allowed to some extent (i.e., increased capacity is allowed), the expansion is suppressed by so-called two-step suppression described above so that the strengths thereof are complemented with each other, and thus excellent cycle durability can be effectively exerted. That is, while expansion of Si is allowed to some extent by the low hardness silicide of C49 structure as a main component, the high strength silicide of C54 structure as a subcomponent blocks further expansion of Si, and thus a complex structure in which high capacity and durability are complemented with each other can be formed. As a result, excellent cycle durability can be effectively exerted while high capacity is maintained. Further, from the diffraction pattern shown in FIG. 10(d) that for a Si phase (second phase) in a eutectic structure, a Debye-Scherrer ring (diffraction ring) is obtained, it is possible to confirm that the Si phase (second phase) is a polycrystalline phase. Further, from the fact that a diffraction ring of halo pattern is obtained, it is possible to confirm that the Si phase (second phase) is an amorphous phase having amorphous or low crystalline Si (a-Si). That is, when the Si phase (second phase) in the eutectic structure is amorphized, it is possible to confirm from the electron diffraction analysis of FIG. 10(d) that the Si phase (second phase) has amorphous or low crystalline Si (a-Si). Further, from the diffraction patterns of FIGS. 10(d), 10(c), and 10(e), it is also possible to confirm that the a-Si phase (second phase) is amorphized more than the silicide phase (first phase). Incidentally, also regarding other Examples, the same results as in FIG. 10 are obtained. That is, a (silicide) crystal structure of an independent silicide phase and a silicide phase in the eutectic structure, which are a single crystal phase, is a C49 structure, and a Si phase (second phase) in a eutectic structure is an amorphous phase having amorphous or low crystalline Si (a-Si). That is, when the Si phase (second phase) in the eutectic structure is amorphized, the Si phase (second phase) has amorphous or low crystalline Si (a-Si).

(Size of Each Phase in Microstructure of Silicon-Containing Alloy)

1. Regarding Relation Between Size of Independent First Phase and Size of Eutectic Structure Next, in the silicon-containing alloy (particle) of the present embodiment, a size of an independent first phase in a microstructure of the silicon-containing alloy is preferably larger than a size of a eutectic structure of a first phase and a second phase. The reason for this is that by having such a configuration, the effects of the present invention can be effectively exerted by the above-described mechanism. That is, a eutectic structure (in which a second phase forms a eutectic with a first phase) having a relatively small size enters a gap between a plurality of relatively large-sized independent first phases in a microstructure. By this, expansion of a second phase (a-Si phase) in a eutectic structure having a relatively small size in the course of charge and discharge (is suppressed by the eutectic first phase) is easily suppressed by a plurality of relatively large-sized independent first phases.

Herein, a size of the independent first phase is a number-based average value of equivalent circular diameters of 100 independent first phases as measured as an equivalent circular diameter from a transmission electron microscope photograph (for example, by setting a lower magnification than that in FIG. 3(b), a transmission electron microscope photograph containing more than the number basis of independent first phases observed in a plurality of places may be used). The size of eutectic structure, as used herein, indicates a total size of one first phase and one second phase which are adjacent in a eutectic structure (size of one unit). Such a size of the eutectic structure is also a number-based average value of equivalent circular diameters of 100 first phases as measured as an equivalent circular diameter from a transmission electron microscope photograph. Herein, as the transmission electron microscope photograph, for example, by setting a lower magnification than that in FIG. 3(b), a transmission electron microscope photograph containing more than the number basis of independent first phases observed in a plurality of places may be used. Alternatively, by setting a higher magnification than that in FIG. 3(b) (for example, see FIG. 5(b) or FIG. 6(b)), a transmission electron microscope photograph containing more than the number basis of independent first phases observed in a plurality of places may be used. However, as illustrated in FIG. 3(B), particularly when a size of an independent first phase can be clearly determined by visual inspection to be larger than a size (of one unit) of a eutectic structure of first phase and second phase, the above-described measurement can be omitted. Incidentally, a size of first phase and second phase in the eutectic structure also indicate a total size (size of one unit). Similarly, a size (average particle diameter) of first phase and the phase in the eutectic structure are also a number-based average value of particle diameters of 100 particles as measured as an equivalent circular diameter from a transmission electron microscope photograph.

2. Regarding Relation Between Size of Independent First Phase and Size of Si Phase (Second Phase) in Eutectic Structure Next, in the silicon-containing alloy (particle) of the present embodiment, there is no limitation on a size of the independent first phase (silicide phase) and a size of the Si phase (second phase) in the eutectic structure of the first phase and the second phase in the microstructure of the alloy, but in a preferred embodiment, a size of first phase (silicide phase) is preferably a mode radius of 500 nm or less and a size of the Si phase (second phase) in the eutectic structure of the first phase and the second phase is preferably a mode radius of less than 110 nm. The reason for this is that by having such a configuration, the effects of the present invention can be effectively exerted by the above-described mechanism. That is, an eutectic structure in which the second phase having a relatively small size forms a eutectic with the first phase having a relatively large size enters a gap between a plurality of relatively large-sized independent first phases in the microstructure. Further, the first phase (silicide phase) is excellent in hardness and electron conductivity as compared to the second phase (Si phase). For this reason, it is possible to more effectively suppress expansion of the Si phase (active material) having a relatively small size in the eutectic structure in the course of charge and discharge. The reason for this is that expansion of the Si phase is suppressed by the relatively small eutectic first phase (see FIGS. 4 to 7, and the like), and is further suppressed by a plurality of relatively large independent first phases, and so-called two-step suppression can be effectively performed. According to this, phase transition between an amorphous state and a crystalline state (crystallization to $Li_{15}Si_4$) at the time of alloying Si with Li during the charging can be suppressed. As a result, expansion and contraction of a silicon-containing alloy constituting a negative electrode active material in the course of charge and discharge of an electric device can be reduced, and when a second phase forms a eutectic with a first phase (silicide phase) formed of silicide having electric conductivity, the second phase (a-Si phase) can be allowed to uniformly react. As a result, an electric device using the negative electrode active material can show improved cycle durability with a high capacity.

A mode radius of the independent first phase (silicide phase) in the microstructure of the alloy is preferably 450 nm or less, more preferably 400 nm or less, still more preferably 350 nm or less, and particularly preferably 240 nm or less. Incidentally, the lower limit of the mode radius of the independent first phase (silicide phase) is not particularly limited, but is preferably 160 nm or more, more preferably 170 nm or more, still more preferably 180 nm or more, and particularly preferably 190 nm or more. In addition, a mode radius of the Si phase (second phase) in the eutectic structure is preferably 100 nm or less, more preferably 85 nm or less, still more preferably 70 nm or less, and particularly preferably less than 50 nm, in particular, preferably 48 nm or less. Incidentally, the lower limit of the mode radius of the size of the Si phase (second phase) in the eutectic structure is not particularly limited, but is preferably 25 nm or more, more preferably 30 nm or more, still more preferably 35 nm or more, and particularly preferably 40 nm or more.

Further, in a preferred embodiment, for the size of the independent first phase (silicide phase) in the microstructure of the silicon-containing alloy (particle) of the present embodiment, a radius distribution is in the range of preferably 80 to 1,000 nm, still more preferably 85 to 900 nm, still more preferably 90 to 800 nm, and particularly preferably 95 to 700 nm, in particular, preferably 100 to 480 nm. In addition, a radius distribution of the size of the Si phase (second phase) in the eutectic structure is in the range of preferably 5 to 200 nm, more preferably 8 to 190 nm, still more preferably 10 to 180 nm, and particularly preferably 12 to less than 170 nm, in particular, preferably 15 to 160 nm.

The mode radius and the radius distribution of the size of the independent first phase and the size of the Si phase (second phase) in the eutectic structure can be calculated according to the following procedures. Hereinafter, Si—Sn—Ti ternary alloys having compositions of Examples 1 to 4 and a Si—Sn—Ti ternary alloy having a composition of Comparative Example 1 will be described as the Si—Sn—M alloy, but the mode radius and the radius distribution of alloys other than those alloys can also be calculated similarly according to the following procedures.

(1) Calculation of Ternary Equilibrium State Diagram

A Si—Sn—Ti ternary equilibrium state diagram was calculated by using an integrated thermodynamic computation system: Thermo-Calc Ver 2015a manufactured by Thermo-Calc software AB, Sweden (distributor in Japan: ITOCHU Techno-Solutions Corporation) and using solid solution versatile database: SSOL5 (SGTE* Solution Database, ver. 5.0) as thermodynamic database [2]. In the compositions of Examples 1 to 4, calculation result was obtained in which a precipitated phase is a primary $TiSi_2$ silicide crystal and a eutectic ($TiSi_2$+Si (diamond_A4)), while in the composition of Comparative Example 1, calculation result was obtained in which a precipitated phase is a eutectic ($TiSi_2$+Si).

SGTE: Scientific Group Thermodata Europe

[2] J-O Andersson, T. Helander, L. Hoglund, P. Shi, B. Sundman, Calphad, Vol. 26, No. 2, pp. 273-312, 2002.

Figure 12:
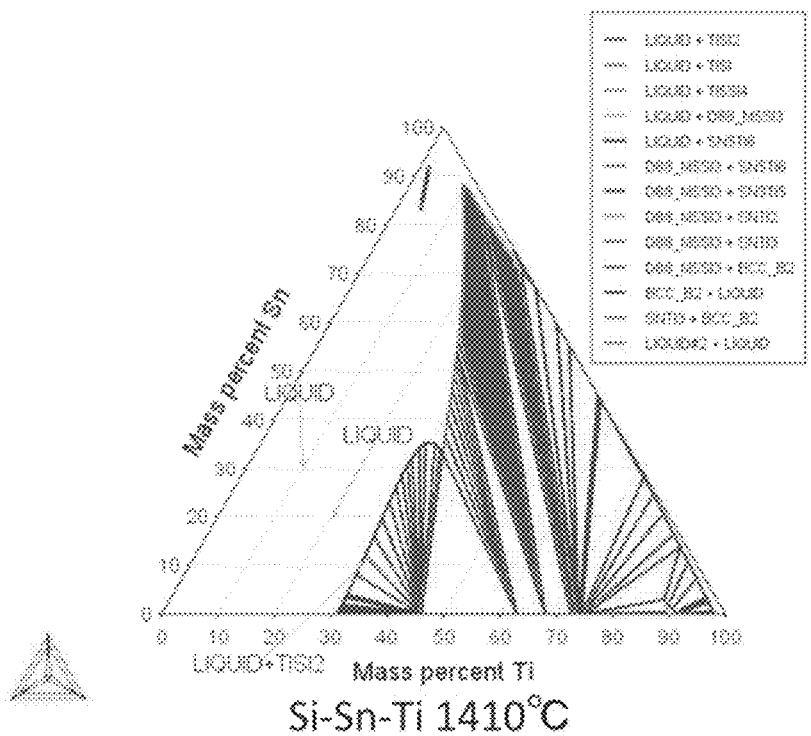
FIG. 12 illustrates a Si—Sn—Ti ternary equilibrium state diagram when a temperature of a Si—Sn—Ti ternary alloy is 1,400° C.
Figure 13:
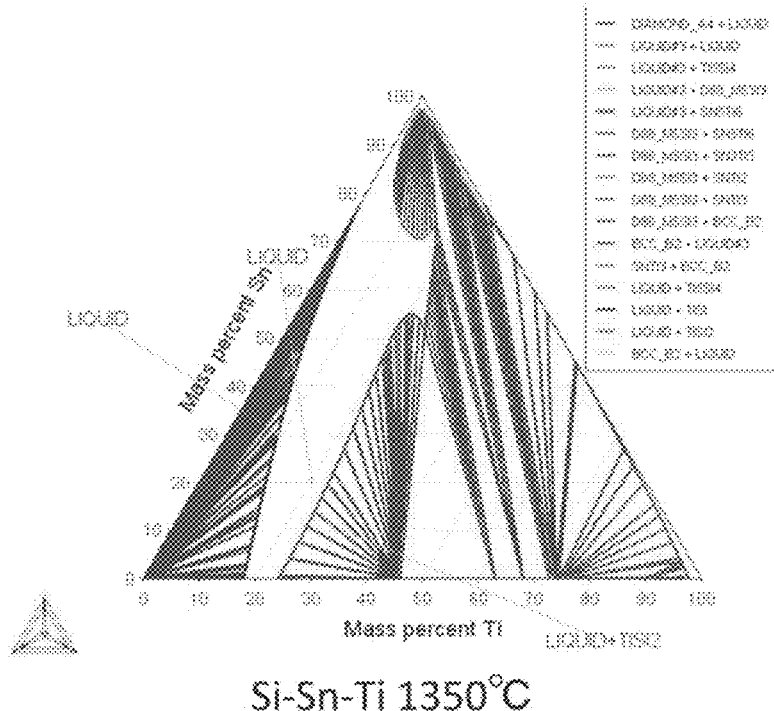
FIG. 13 illustrates a Si—Sn—Ti ternary equilibrium state diagram when a temperature of a Si—Sn—Ti ternary alloy is 1,450° C.
Figure 14:
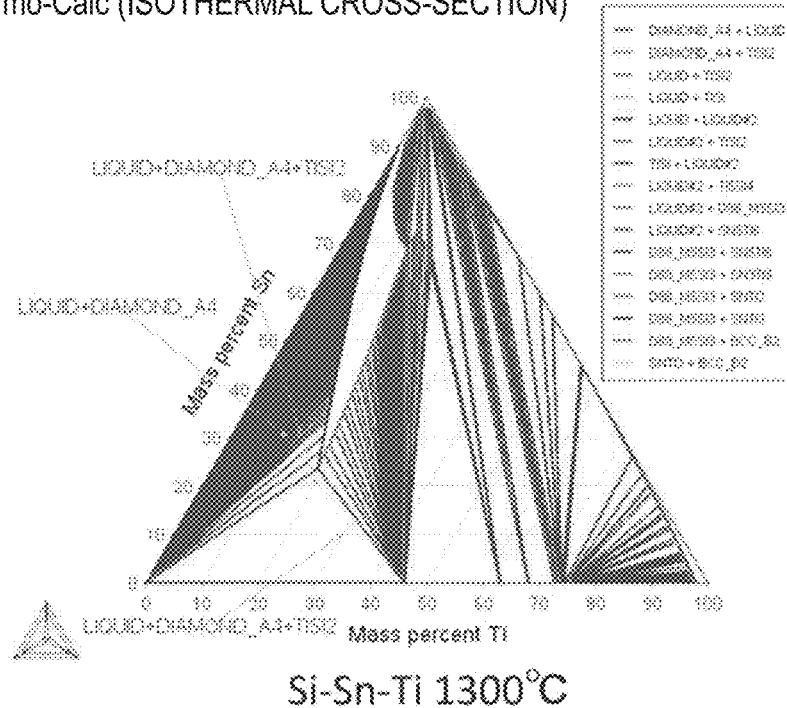
FIG. 14 illustrates a Si—Sn—Ti ternary equilibrium state diagram when a temperature of a Si—Sn—Ti ternary alloy is 1,300° C.
Figure 15:
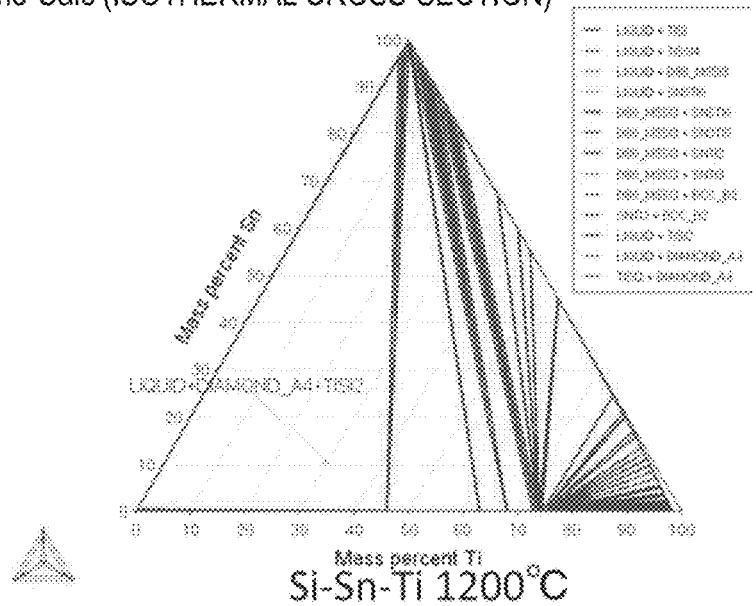
FIG. 15 illustrates a Si—Sn—Ti ternary equilibrium state diagram when a temperature of a Si—Sn—Ti ternary alloy is 1,200° C.
Figure 16:
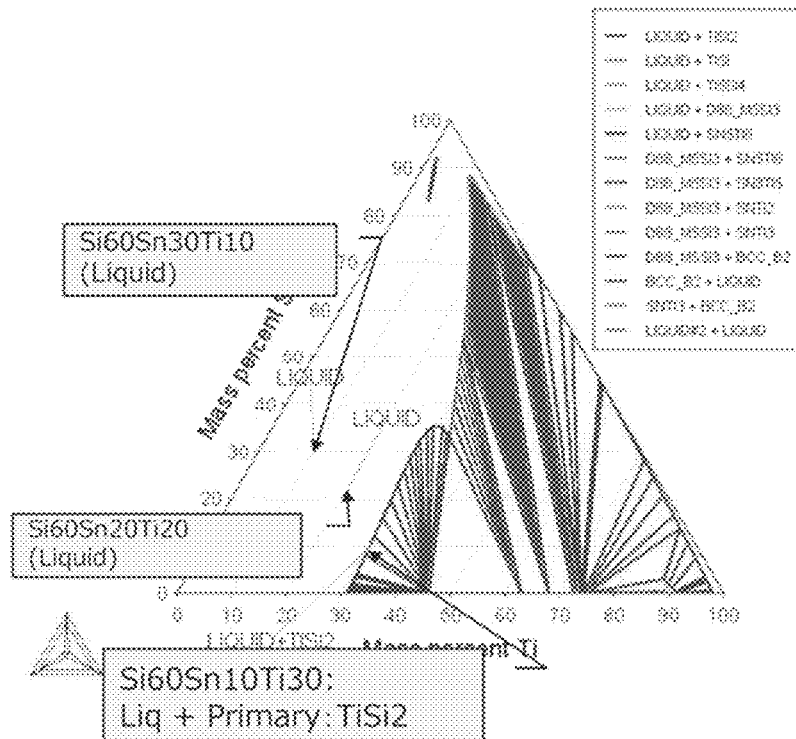
FIG. 16 is a view obtained by incorporating analysis information to the state diagram of FIG. 12.
Figure 17:
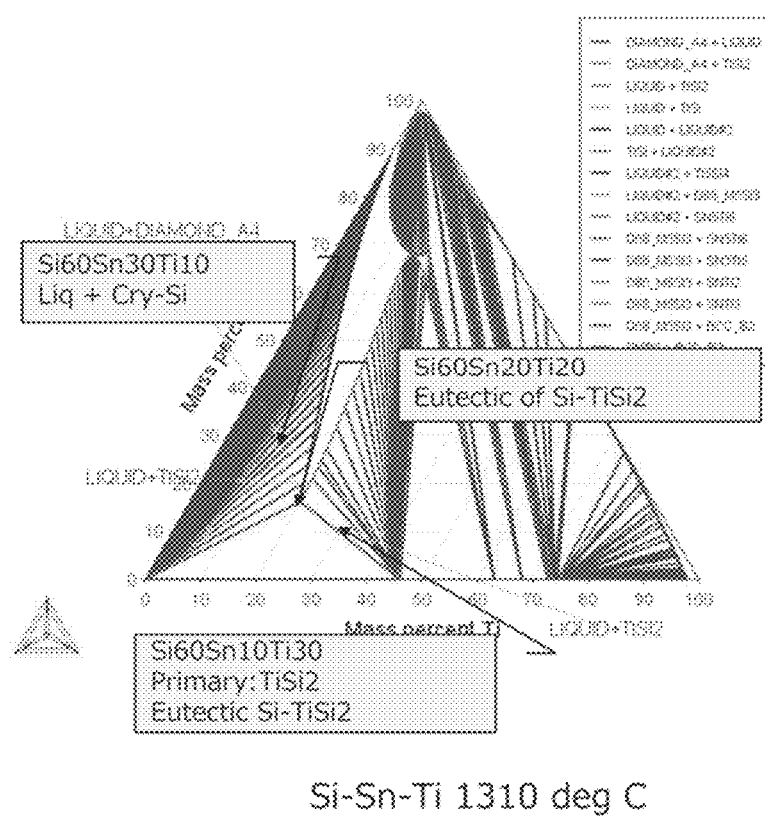
FIG. 17 is a view obtained by incorporating analysis information to a Si—Sn—Ti ternary equilibrium state diagram when a temperature of a Si—Sn—Ti ternary alloy is 1,310° C.
Figure 18:
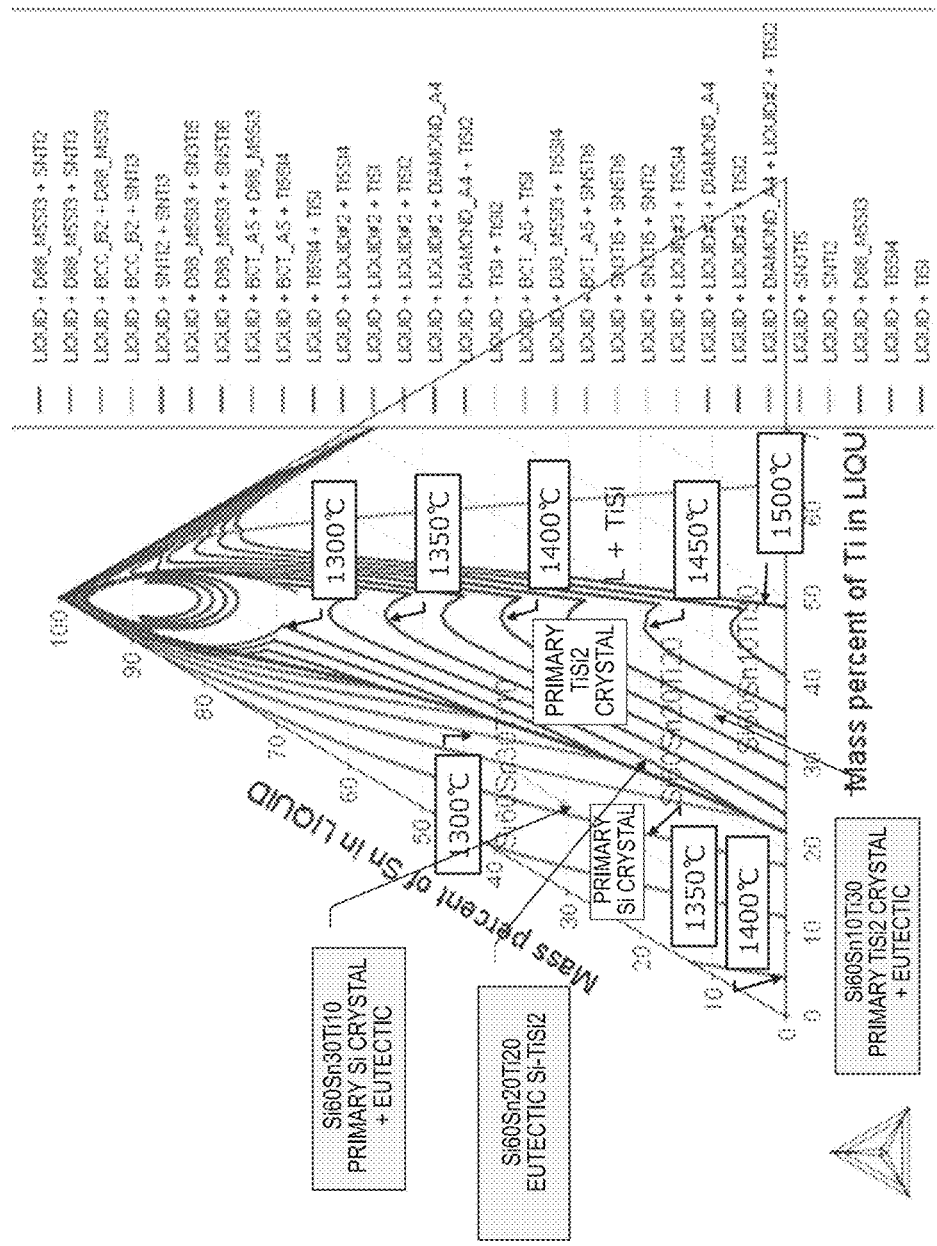
FIG. 18 illustrates a liquidus surface projection view of a Si—Sn—Ti ternary system by Thermo-Calc (an integrated thermodynamic computation system).

FIGS. 12 to 17 illustrate Si—Sn—Ti ternary equilibrium state diagrams obtained by the above-described calculation. Of them, FIG. 12 illustrates a Si—Sn—Ti ternary equilibrium state diagram when a temperature of a Si—Sn—Ti ternary alloy is 1,400° C. FIG. 13 illustrates a Si—Sn—Ti ternary equilibrium state diagram when a temperature of a Si—Sn—Ti ternary alloy is 1,450° C. FIG. 14 illustrates a Si—Sn—Ti ternary equilibrium state diagram when a temperature of a Si—Sn—Ti ternary alloy is 1,300° C. FIG. 15 illustrates a Si—Sn—Ti ternary equilibrium state diagram when a temperature of a Si—Sn—Ti ternary alloy is 1,200° C. FIG. 16 is a view obtained by incorporating analysis information to the state diagram of FIG. 12. FIG. 17 is a view obtained by incorporating analysis information to a Si—Sn—Ti ternary equilibrium state diagram when a temperature of a Si—Sn—Ti ternary alloy is 1,310° C. In addition, FIG. 18 illustrates a liquidus surface projection view of a Si—Sn—Ti ternary system by Thermo-Calc (an integrated thermodynamic computation system).

Incidentally, also in FIGS. 12 to 18, an area for each crystallized component or a solidus is described with coloring (is colored) so that a difference therebetween can be determined at a glance. However, since the drawings of the application are required to be submitted with black-and-white images, analysis information apparently understood by such coloring is incorporated in FIGS. 16 to 18.

Specifically, in FIG. 16, when (a molten alloy at 1,450° C. is cooled and then) the temperature thereof is 1,400° C., a place of alloy composition of $Si_{60}Sn_{10}Ti_{30}$ of Examples 2 to 4 is indicated by an arrow. The place, which is present in an area or a solidus in which crystallization of $TiSi_2$ as a primary crystal in a liquid phase is recognized, is described as "Si60Sn10Ti30:liq+Primary: TiSi2." In addition, a place of an alloy composition of $Si_{60}Sn_{20}Ti_{20}$ of Comparative Example 1 is indicated by an arrow. The place, which is present in a liquid phase area, is described as "Si60Sn20Ti20 (liquid)." Further, a place of an alloy composition of $Si_{60}Sn_{30}Ti_{10}$ having a larger composition ratio of Sn than Comparative Example 1 is indicated by an arrow. The place, which is present in a liquid phase area, is described as "Si60Sn10Ti30 (liquid)."

Similarly, in FIG. 17, when (a molten alloy at 1,450° C. is cooled and then) the temperature thereof is 1,310° C., a place of an alloy composition of $Si_{60}Sn_{10}Ti_{30}$ of Examples 2 to 4 is indicated by an arrow. The place, which is present in an area or on a solidus in which crystallization of $TiSi_2$ as a primary crystal and a eutectic of Si and $TiSi_2$ is recognized, is described as "Si60Sn10Ti30 Primary: TiSi2 Eutectic Si—TiSi2." In addition, a place of an alloy composition of $Si_{60}Sn_{20}Ti_{20}$ of Comparative Example 1 is indicated by an arrow. The place, which is present in an area or on a solidus in which crystallization of a eutectic of Si and $TiSi_2$ is recognized, is described as "Si60Sn20Ti20 Eutectic Si—TiSi2." Further, a place of an alloy composition of $Si_{60}Sn_{30}Ti_{10}$ having a larger composition ratio of Sn than Comparative Example 1 is indicated by an arrow. The place, which is present in an area or on a solidus in which crystallization of crystalline Si as a primary crystal in a liquid phase is recognized, is described as "Si60Sn10Ti30 liq+Cry-Si)."

FIG. 18 is a liquidus surface projection view when a molten alloy at 1,500° C. is cooled to 1,300° C. at an isothermal interval of 25° C. From FIG. 18, a place of an alloy compositions of $Si_{60}Sn_{10}Ti_{30}$ of Examples 2 to 4 is indicated by an arrow. The place, which is present in an area in which crystallization of $TiSi_2$ as a primary crystal and a eutectic of Si and $TiSi_2$ is recognized, is described as "Si60Sn10Ti30 Primary TiSi2 Crystal+Eutectic." In addition, a place of an alloy composition of $Si_{60}Sn_{20}Ti_{20}$ of Comparative Example 1 is indicated by an arrow. The place, which is present in an area in which crystallization of a eutectic of Si and $TiSi_2$ is recognized, is described as "Si60Sn20Ti20 Eutectic Si—TiSi2." Further, a place of an alloy composition of $Si_{60}Sn_{30}Ti_{10}$ having a larger composition ratio of Sn than Comparative Example 1 is indicated by an arrow. The place, which is present in an area in which crystallization of Si as a primary crystal and a eutectic of Si and $TiSi_2$ is recognized, is described as "Si60Sn10Ti30 Primary Si Crystal+Eutectic."

(2) Precipitation Calculation

Precipitation calculation was performed using precipitation growth prediction software: TC-PRISMA Ver 2015a (and Thermo-Calc ver. 2015a) manufactured by Thermo-Calc software AB, Sweden (distributor in Japan: ITOCHU Techno-Solutions Corporation), using the same SSOL5 as in the equilibrium state diagram calculation as a thermodynamic database, and using MOB2 (TCS Alloy Mobility Database Ver. 2.5) manufacture by Thermo-Calc software AB, Sweden, under the conditions of Examples 1 to 4 and Comparative Example 1. This precipitation growth prediction software TC-PRISMA is to perform a precipitation calculation on the basis of theories of Langer-Schwartz and Kampmann-Wagner [3][4].

In the precipitation calculation, calculation was performed under the conditions of Examples 1 to 4 and Comparative Example 1. The calculation was performed under the following calculation conditions and temperature profiles (Examples 1 to 4). The temperature profile of Comparative Example 1 is the same as that of Example 2.

[3]: Q. Chen, H. J. Jou, G. Sterner. TC-PRISMA User's Guide, http://www.thermocalc.com/, 2011

[4]: Q. Chen, J. Jeppsson, and J. Agren., Acta Materialia, Vol. 56, pp, 1890-1896, 2008.

(2.1) Calculation Conditions

Figure 20:
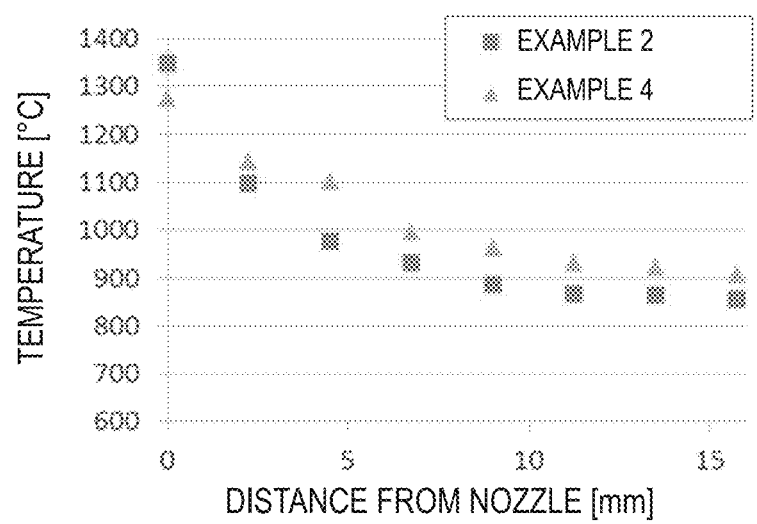
FIG. 20 is a graph obtained by plotting temperatures of a quenched thin strip alloy at each position (distance) from a nozzle with an interval of 2.25 mm in Examples 2 and 4.
Figure 21:
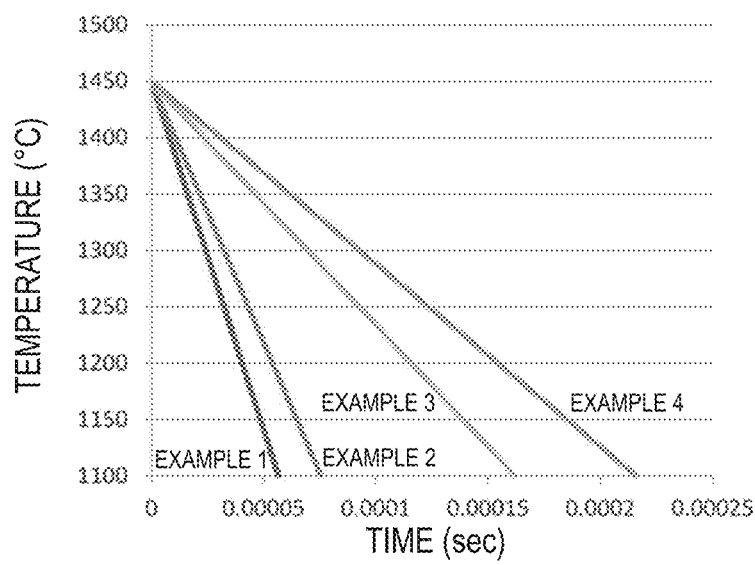
FIG. 21 is a graph showing a relation between a cooling time (elapsed time immediately after spraying) of the quenched thin strip alloy and a (cooling) temperature from the number of revolutions of a roll and the (cooling) temperature (from 1,450° C. to 1,100° C.) of the quenched thin strip alloy of FIG. 20.

Temperature profile: FIG. 21 (Examples 1 to 4) (even under other execution conditions, the same temperature profile as in FIG. 21 can be obtained with reference to FIGS. 19 and 20.)

Alloy composition (% by mass): $Si_{65}Sn_5Ti_{30}$ (Example 1)
$Si_{60}Sn_{10}Ti_{30}$ (Examples 2 to 4)
$Si_{60}Sn_{20}Ti_{20}$ (Comparative Example 1)

Matrix/precipitated phase: Liquid/$TiSi_2$, Si (diamond_A4) (crystalize out in a liquid phase)

Nucleus growth model: Simplified

Nucleation site: Bulk (both $TiSi_2$ and Si(dia))

Interface energy: Using an estimate value from thermodynamic DB

Phase boundary•mobility: Using data of dynamic DB

Parent phase/precipitated phase volume: Both are 1E-4 $(1\times10^{-4})$ m$^3$.

Figure 19:
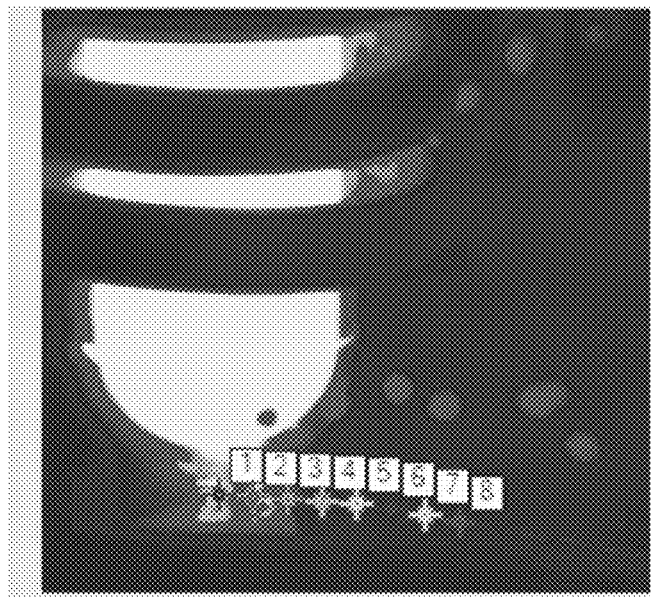
FIG. 19 is a view which illustrates a state where a temperature of a quenched thin strip alloy obtained by an apparatus used in a liquid quenching roll solidification method is observed using an infrared thermograph.

Herein, the temperature profile of FIG. 21 is obtained as follows. FIG. 19 is a view which illustrates a state where a temperature of a quenched thin strip alloy obtained by an apparatus used in a liquid quenching roll solidification method is observed using an infrared thermograph. Specifically, a parent alloy (parent alloy of each of Examples 1 to 4) to be melted at 1,450° C. is sprayed on a Cu roll at the number of revolutions of 4,000 rpm (circumferential velocity: 41.9 m/sec) from a quartz nozzle into which the parent alloy is put, and a temperature of a thin strip alloy continuously formed horizontally on the roll is observed. In the observation, a temperature of a thin strip alloy at each position (distance) from a roll portion immediately below the nozzle (a distance from the nozzle is zero) with an interval of 2.25 mm is observed using an infrared thermograph (observation positions are represented with numbers 1 to 8). FIG. 20 is a graph obtained by plotting temperatures of a quenched thin strip alloy at each position (distance) from a nozzle with an interval of 2.25 mm in Examples 2 and 4.

FIG. 21 is a graph showing a relation between a cooling time (elapsed time immediately after spraying) of the quenched thin strip alloy and a (cooling) temperature from the number of revolutions of a roll and the (cooling) temperature (from 1,450° C. to 1,100° C.) of the quenched thin strip alloy of FIG. 20. Incidentally, in FIG. 20, plotting is performed for only Examples 2 and 4, but by similarly plotting for other Examples, the temperature profiles shown in FIG. 21 can be obtained. That is, the temperature profile of Example 1 can be calculated to 1,450° C.→1,100° C./5.67×10$^{-5}$ sec (cooling rate: 6.2×10$^{6}$° C./sec). The temperature profile of Example 2 can be calculated to 1,450° C.→1,100° C./7.56×10$^{-5}$ sec (cooling rate: 4.6×10$^{6°}$ C./sec). The temperature profile of Example 3 can be calculated to 1,450° C.→1,100° C./1.62×10$^{-4}$ sec (cooling rate: 2.2×10$^{6°}$ C./sec). The temperature profile of Example 4 can be calculated to 1,450° C.→1,100° C./2.16×10$^{-4}$ sec (cooling rate: 1.6×10$^{6°}$ C./sec).

Figure 22A:
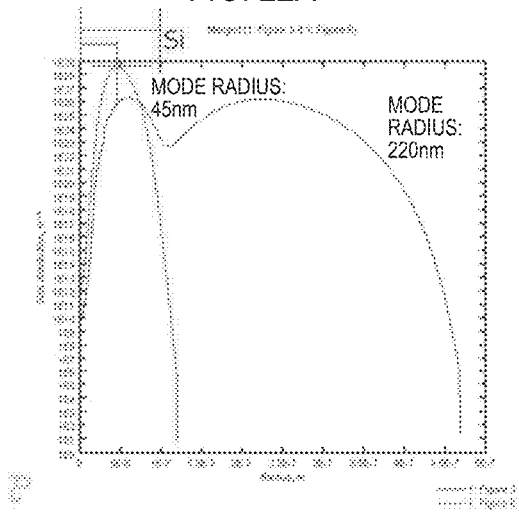
FIG. 22(a) is a graph showing a mode radius of a size of the independent first phase and a size of the Si phase (second phase) in the eutectic structure, obtained by the precipitation calculation under the calculation conditions of Example 1 described above, for the alloy composition of $Si_{65}Sn_5Ti_{30}$ of Example 1.
Figure 22B:
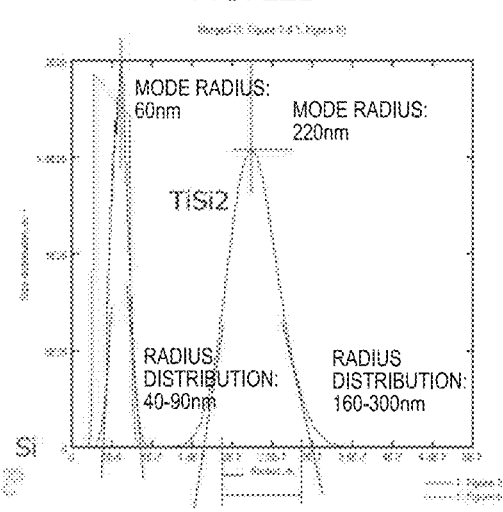
FIG. 22(b) is a graph in which radius distribution of the size of the independent first phase and the size of the Si phase (second phase) in the eutectic structure is obtained by magnifying the graph of FIG. 22(a).

FIG. 22(*a*) is a graph showing a mode radius of a size of the independent first phase and a size of the Si phase (second phase) in the eutectic structure, obtained by the precipitation calculation under the calculation conditions of Example 1 described above, for the alloy composition of $Si_{65}Sn_5Ti_{30}$ of Example 1. FIG. 22(*b*) is a graph in which radius distribution of the size of the independent first phase and the size of the Si phase (second phase) in the eutectic structure is obtained by magnifying the graph of FIG. 22(*a*). From the graph of FIG. 22(*a*), the mode radius of the size of the Si phase (second phase) constituting the eutectic structure is 45 nm. In addition, regarding the silicide phase, the graph is bimodal. A peak at a side of the small radius among peaks is a peak of a silicide phase (first phase) constituting the eutectic structure while taking into consideration that the peak appears at almost the same position as the mode radius of the Si phase and consideration of the observation results of FIGS. 3 to 9, and the mode radius of the size thereof is 60 nm. Further, a peak at a side of the large radius represents a size of the independent silicide phase (first phase), and the mode radius thereof is 220 nm. In addition, from the graph of FIG. 22(*b*), the radius distribution of the size of the Si phase (second phase) constituting the eutectic structure is 25 to 80 nm. Further, regarding the silicide phase, the radius distribution of the size of the silicide phase (first phase) constituting the eutectic structure is 40 to 90 nm, and the radius distribution of the size of the independent silicide phase (first phase) is 160 to 300 nm. Herein, the radius distribution is obtained by reading a place with a height of 5% with respect to the peak height.

Figure 23:
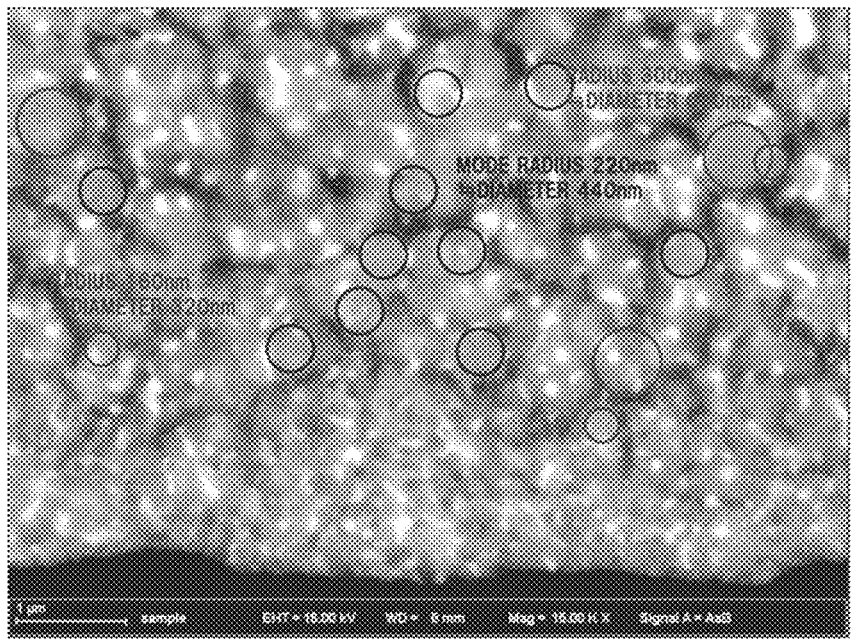
FIG. 23 is a view which illustrates a cross-sectional scanning electron microscope (SEM) image of a quenched thin strip alloy of $Si_{65}Sn_5Ti_{30}$ of Example 1.

FIG. 23 is a view which illustrates a cross-sectional scanning electron microscope (SEM) image of a quenched thin strip alloy of $Si_{65}Sn_5Ti_{30}$ of Example 1. Taking into consideration of the observation results of FIGS. 3 to 9 which have been already described, the gray part in FIG. 23 is a part of the independent silicide phase (first phase), the black part is a part of the eutectic structure, and the white part is a part of the Sn phase. In FIG. 23, intermediate circles (diameter: 440 nm) of a mode diameter based on the mode radius (220 nm) of the size of the independent first phase, as measured by the precipitation calculation under the calculation conditions of Example 1 described above, are applied to several independent first phases, which are shown therein. As a result, it was possible to confirm that these intermediate circles (diameter: 440 nm) of the mode diameter almost match the equivalent circular diameter (average value) of the intermediate size of the actual independent first phase. Similarly, maximum circles (diameter: 600 nm) and minimum circles (diameter: 320 nm) based on the radius distribution (160 to 300 nm) of the size of the independent first phase, as measured by the precipitation calculation under the calculation conditions of Example 1 described above, are applied to several independent first phases, which are shown in FIG. 23. As a result, it was possible to confirm that these maximum circles (diameter: 600 nm) and minimum circles (diameter: 320 nm) almost match the equivalent circular diameter (diameter distribution) of the large size and the small size of the actual independent first phases. In addition, an intermediate circle of a mode diameter based on a mode radius of a size of a Si phase (second phase) in a eutectic structure obtained from FIG. 22, and a maximum circle and a minimum circle based on a radius distribution can be applied to the HAADF-STEM Image view of Example 1, which can be obtained in the same manner as in FIG. 5(*b*), which can be illustrated in the drawing. As a result, it was possible to confirm that the intermediate circle of a mode diameter based on a mode radius of a size of a Si phase (second phase) in a eutectic structure, and the maximum circle and the minimum circle based on a radius distribution almost match the equivalent circular diameter (average value or diameter distribution) of the actual Si phase (second phase).

Figure 24A:
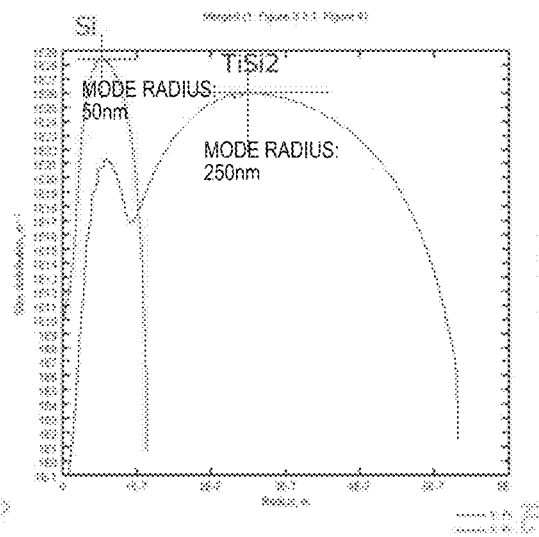
FIG. 24(a) is a graph showing a mode radius of a size of the independent first phase and a size of the Si phase (second phase) in the eutectic structure, obtained by the precipitation calculation under the calculation conditions of Example 2 described above, for the alloy composition of $Si_{60}Sn_{10}Ti_{30}$ of Example 2.
Figure 24B:
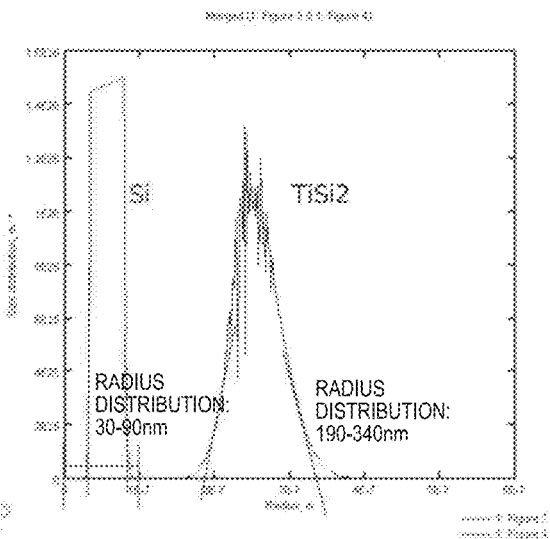
FIG. 24(b) is a graph in which radius distribution of the size of the independent first phase and the size of the Si phase (second phase) in the eutectic structure is obtained by magnifying the graph of FIG. 24(a).

FIG. 24(*a*) is a graph showing a mode radius of a size of the independent first phase and a size of the Si phase (second phase) in the eutectic structure, obtained by the precipitation calculation under the calculation conditions of Example 2 described above, for the alloy composition of $Si_{60}Sn_{10}Ti_{30}$ of Example 2. FIG. 24(*b*) is a graph in which radius distribution of the size of the independent first phase and the size of the Si phase (second phase) in the eutectic structure is obtained by magnifying the graph of FIG. 24(*a*). From the graph of FIG. 24(*a*), the mode radius of the size of the Si phase (second phase) constituting the eutectic structure is 50 nm. In addition, regarding the silicide phase, the graph is bimodal. A peak at a side of the small radius among peaks is a peak of a silicide phase (first phase) constituting the eutectic structure while taking into consideration that the peak appears at almost the same position as the mode radius of the Si phase and consideration of the observation results of FIGS. 3 to 9, and the mode radius of the size thereof is 50 nm. Further, a peak at a side of the large radius represents a size of the independent silicide phase (first phase), and the mode radius thereof is 250 nm. In addition, from the graph of FIG. 24(*b*), the radius distribution of the size of the Si phase (second phase) constituting the eutectic structure is 30 to 90 nm. Further, regarding the silicide phase, the radius distribution of the size of the silicide phase (first phase) constituting the eutectic structure is also almost 30 to 90 nm (not illustrated), and the radius distribution of the size of the independent silicide phase (first phase) is 190 to 340 nm. Herein, the radius distribution is obtained by reading a place with a height of 5% with respect to the peak height.

FIG. 25 is a view which illustrates a cross-sectional scanning electron microscope (SEM) image of a quenched thin strip alloy of $Si_{60}Sn_{10}Ti_{30}$ of Example 2. Taking into consideration of the observation results of FIGS. 3 to 9 which have been already described, the gray part in FIG. 25 is a part of the independent silicide phase (first phase), the black part is a part of the eutectic structure, and the white part is a part of the Sn phase. In FIG. 25, intermediate circles (diameter: 500 nm) of a mode diameter based on the mode radius (250 nm) of the size of the independent first phase, as measured by the precipitation calculation under the calculation conditions of Example 2 described above, are applied to several independent first phases, which are shown therein. As a result, it was possible to confirm that these intermediate circles (diameter: 500 nm) of the mode diameter almost match the equivalent circular diameter (average value) of the intermediate size of the actual independent first phase. Similarly, maximum circles (diameter: 680 nm) and minimum circles (diameter: 380 nm) based on the radius distribution (190 to 340 nm) of the size of the independent first phase, as measured by the precipitation calculation under the calculation conditions of Example 2 described above, are applied to several independent first phases, which are shown in FIG. 25. As a result, it was possible to confirm that these maximum circles (diameter: 680 nm) and minimum circles (diameter: 380 nm) almost match the equivalent circular diameter (diameter distribution) of the large size and the small size of the actual independent first phases. In addition, an intermediate circle of a mode diameter based on a mode radius of a size of a Si phase (second phase) in a eutectic structure obtained from FIG. 24, and a maximum circle and a minimum circle based on a radius distribution can be applied to the HAADF-STEM Image view of Example 2, which can be obtained in the same manner as in FIG. 5(b), which can be illustrated in the drawing. As a result, it was possible to confirm that the intermediate circle of a mode diameter based on a mode radius of a size of a Si phase (second phase) in a eutectic structure, and the maximum circle and the minimum circle based on a radius distribution almost match the equivalent circular diameter (average value or diameter distribution) of the actual Si phase (second phase).

FIG. 26(a) is a graph showing a mode radius of a size of the independent first phase and a size of the Si phase (second phase) in the eutectic structure, obtained by the precipitation calculation under the calculation conditions of Example 3 described above, for the alloy composition of $Si_{60}Sn_{10}Ti_{30}$ of Example 3. FIG. 26(b) is a graph in which radius distribution of the size of the independent first phase and the size of the Si phase (second phase) in the eutectic structure is obtained by magnifying the graph of FIG. 26(a). From the graph of FIG. 24(a), the mode radius of the size of the Si phase (second phase) constituting the eutectic structure is 75 nm. In addition, regarding the silicide phase, the graph is bimodal. A peak at a side of the small radius among peaks is a peak of a silicide phase (first phase) constituting the eutectic structure while taking into consideration that the peak appears at almost the same position as the mode radius of the Si phase and consideration of the observation results of FIGS. 3 to 9, and the mode radius of the size thereof is 75 nm. Further, a peak at a side of the large radius represents a size of the independent silicide phase (first phase), and the mode radius thereof is 370 nm. In addition, from the graph of FIG. 26(b), the radius distribution of the size of the Si phase (second phase) constituting the eutectic structure is 40 to 120 nm. Further, regarding the silicide phase, the radius distribution of the size of the silicide phase (first phase) constituting the eutectic structure is also almost 40 to 120 nm (not illustrated), and the radius distribution of the size of the independent silicide phase (first phase) is 250 to 510 nm. Herein, the radius distribution is obtained by reading a place with a height of 5% with respect to the peak height.

Figure 27:
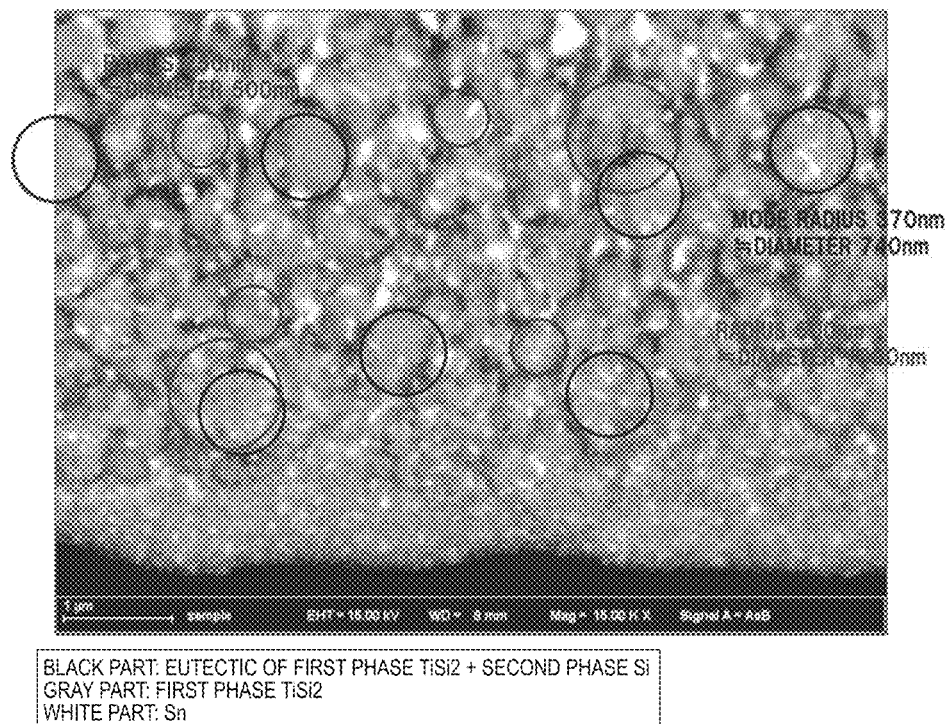
FIG. 27 is a view which illustrates a cross-sectional scanning electron microscope (SEM) image of a quenched thin strip alloy of $Si_{60}Sn_{10}Ti_{30}$ of Example 3.

FIG. 27 is a view which illustrates a cross-sectional scanning electron microscope (SEM) image of a quenched thin strip alloy of $Si_{60}Sn_{10}Ti_{30}$ of Example 3. Taking into consideration of the observation results of FIGS. 3 to 9 which have been already described, the gray part in FIG. 27 is a part of the independent silicide phase (first phase), the black part is a part of the eutectic structure, and the white part is a part of the Sn phase. In FIG. 27, intermediate circles (diameter: 740 nm) of a mode diameter based on the mode radius (370 nm) of the size of the independent first phase, as measured by the precipitation calculation under the calculation conditions of Example 2 described above, are applied to several independent first phases, which are shown therein. As a result, it was possible to confirm that these intermediate circles (diameter: 740 nm) of the mode diameter almost match the equivalent circular diameter (average value) of the intermediate size of the actual independent first phase. Similarly, maximum circles (diameter: 1020 nm) and minimum circles (diameter: 500 nm) based on the radius distribution (250 to 510 nm) of the size of the independent first phase, as measured by the precipitation calculation under the calculation conditions of Example 3 described above, are applied to several independent first phases, which are shown in FIG. 27. As a result, it was possible to confirm that these maximum circles (diameter: 1020 nm) and minimum circles (diameter: 500 nm) almost match the equivalent circular diameter (diameter distribution) of the large size and the small size of the actual independent first phases. In addition, an intermediate circle of a mode diameter based on a mode radius of a size of a Si phase (second phase) in a eutectic structure obtained from FIG. 26, and a maximum circle and a minimum circle based on a radius distribution can be applied to the HAADF-STEM Image view of Example 3, which can be obtained in the same manner as in FIG. 5(b), which can be illustrated in the drawing. As a result, it was possible to confirm that the intermediate circle of a mode diameter based on a mode radius of a size of a Si phase (second phase) in a eutectic structure, and the maximum circle and the minimum circle based on a radius distribution almost match the equivalent circular diameter (average value or diameter distribution) of the actual Si phase (second phase).

Figure 28A:
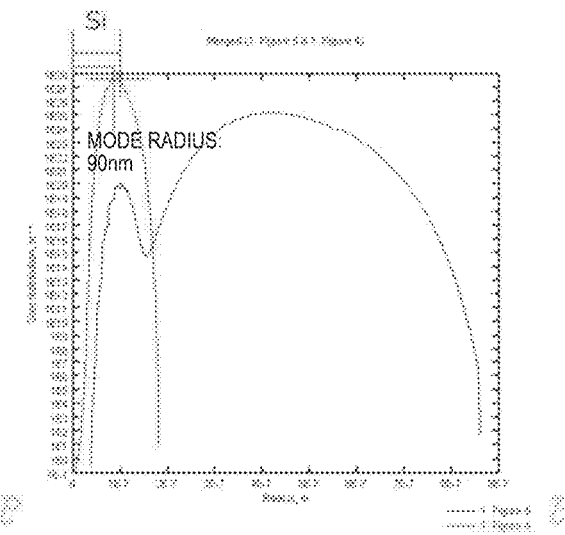
FIG. 28(a) is a graph showing a mode radius of a size of the independent first phase and a size of the Si phase (second phase) in the eutectic structure, obtained by the precipitation calculation under the calculation conditions of Example 4 described above, for the alloy composition of $Si_{60}Sn_{10}Ti_{30}$ of Example 4.
Figure 28B:
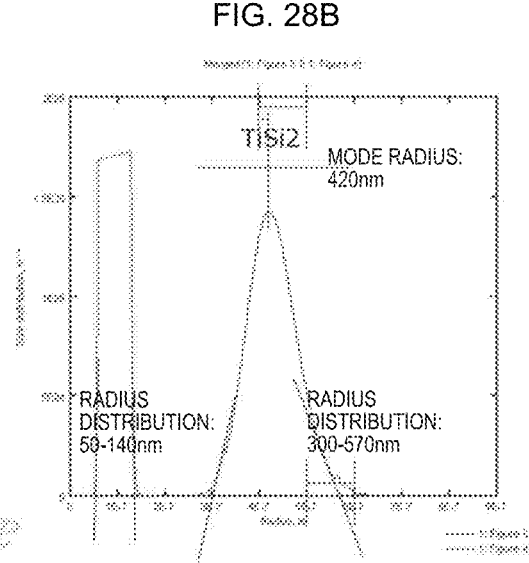
FIG. 28(b) is a graph in which radius distribution of the size of the independent first phase and the size of the Si phase (second phase) in the eutectic structure is obtained by magnifying the graph of FIG. 28(a).

FIG. 28(a) is a graph showing a mode radius of a size of the independent first phase and a size of the Si phase (second phase) in the eutectic structure, obtained by the precipitation calculation under the calculation conditions of Example 4 described above, for the alloy composition of $Si_{60}Sn_{10}Ti_{30}$ of Example 4. FIG. 28(b) is a graph in which radius distribution of the size of the independent first phase and the size of the Si phase (second phase) in the eutectic structure is obtained by magnifying the graph of FIG. 28(a). From the graph of FIG. 28(a), the mode radius of the size of the Si phase (second phase) constituting the eutectic structure is 90 nm. In addition, regarding the silicide phase, the graph is bimodal. A peak at a side of the small radius among peaks is a peak of a silicide phase (first phase) constituting the eutectic structure while taking into consideration that the peak appears at almost the same position as the mode radius of the Si phase and consideration of the observation results of FIGS. 3 to 9, and the mode radius of the size thereof is about 90 nm. Further, a peak at a side of the large radius represents a size of the independent silicide phase (first phase), and the mode radius thereof is 420 nm (see FIG. 28(b)). In addition, from the graph of FIG. 28(b), the radius distribution of the size of the Si phase (second phase) constituting the eutectic structure is 50 to 140 nm. Further, regarding the silicide phase, the radius distribution of the size of the silicide phase (first phase) constituting the eutectic structure is also almost 50 to 140 nm (not illustrated), and the radius distribution of the size of the independent silicide phase (first phase) is 300 to 570 nm. Herein, the radius distribution is obtained by reading a place with a height of 5% with respect to the peak height.

Figure 29:
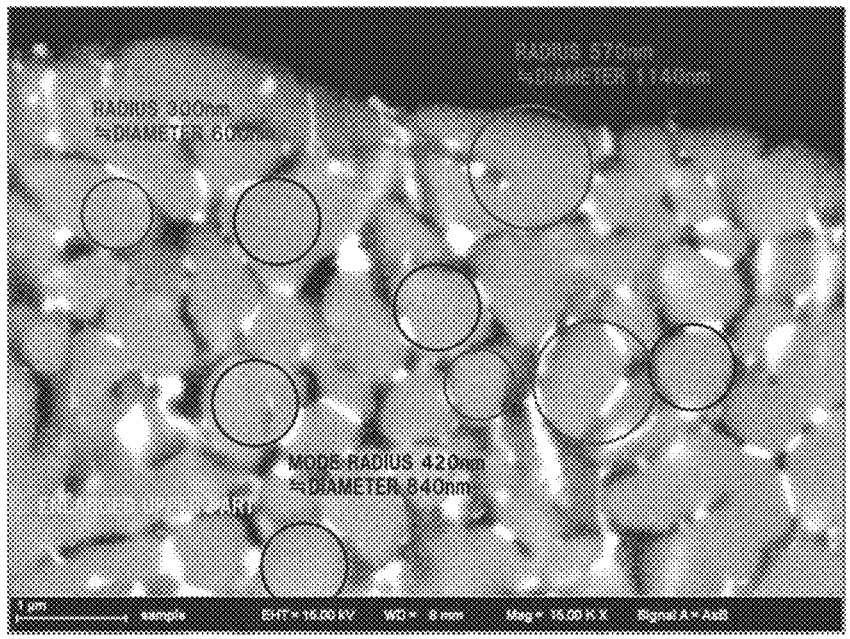
FIG. 29 is a view which illustrates a cross-sectional scanning electron microscope (SEM) image of a quenched thin strip alloy of $Si_{60}Sn_{10}Ti_{30}$ of Example 4.

FIG. 29 is a view which illustrates a cross-sectional scanning electron microscope (SEM) image of a quenched thin strip alloy of $Si_{60}Sn_{10}Ti_{30}$ of Example 4. Taking into consideration of the observation results of FIGS. 3 to 9 which have been already described, the gray part in FIG. 29 is a part of the independent silicide phase (first phase), the black part is a part of the eutectic structure, and the white part is a part of the Sn phase. In FIG. 29, intermediate circles (diameter: 840 nm) of a mode diameter based on the mode radius (420 nm) of the size of the independent first phase, as measured by the precipitation calculation under the calculation conditions of Example 4 described above, are applied to several independent first phases, which are shown therein. As a result, it was possible to confirm that these intermediate circles (diameter: 840 nm) of the mode diameter almost match the equivalent circular diameter (average value) of the intermediate size of the actual independent first phase. Similarly, maximum circles (diameter: 1040 nm) and minimum circles (diameter: 600 nm) based on the radius distribution (300 to 570 nm) of the size of the independent first phase, as measured by the precipitation calculation under the calculation conditions of Example 4 described above, are applied to several independent first phases, which are shown in FIG. 29. As a result, it was possible to confirm that these maximum circles (diameter: 1040 nm) and minimum circles (diameter: 600 nm) almost match the equivalent circular diameter (diameter distribution) of the large size and the small size of the actual independent first phases. In addition, an intermediate circle of a mode diameter based on a mode radius of a size of a Si phase (second phase) in a eutectic structure obtained from FIG. 28, and a maximum circle and a minimum circle based on a radius distribution can be applied to the HAADF-STEM Image view of Example 4, which can be obtained in the same manner as in FIG. 5(b), which can be illustrated in the drawing. As a result, it was possible to confirm that the intermediate circle of a mode diameter based on a mode radius of a size of a Si phase (second phase) in a eutectic structure, and the maximum circle and the minimum circle based on a radius distribution almost match the equivalent circular diameter (average value or diameter distribution) of the actual Si phase (second phase).

Figure 30A:
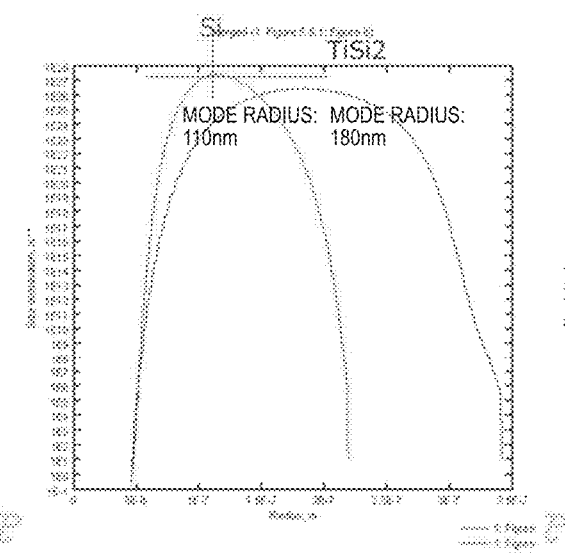
FIG. 30(a) is a graph showing a mode radius of a size of the silicide (first phase) and the Si phase (second phase) in the eutectic structure, obtained by the precipitation calculation under the calculation conditions of Comparative Example 1 described above, for the alloy composition of $Si_{60}Sn_{20}Ti_{20}$ of Comparative Example 1.
Figure 30B:
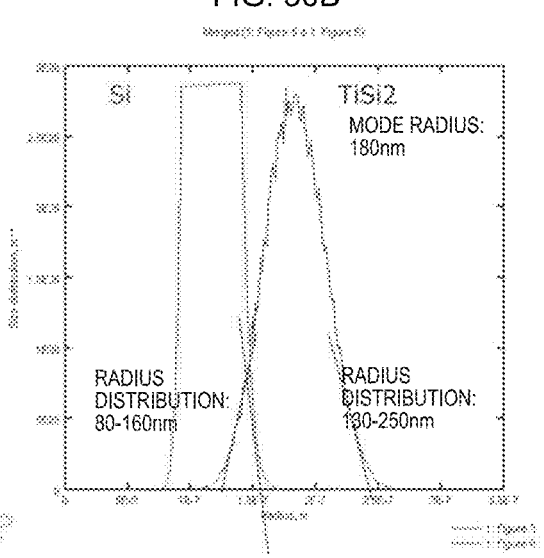
FIG. 30(b) is a graph in which radius distribution of the size of the silicide (first phase) and the Si phase (second phase) in the eutectic structure is obtained by magnifying the graph of FIG. 30(a).

FIG. 30(a) is a graph showing a mode radius of a size of the silicide (first phase) and the Si phase (second phase) in the eutectic structure, obtained by the precipitation calculation under the calculation conditions of Comparative Example 1 described above, for the alloy composition of $Si_{60}Sn_{20}Ti_{20}$ of Comparative Example 1. It is found that independent silicide (first phase) is not formed in the alloy composition of $Si_{60}Sn_{20}Ti_{20}$ of Comparative Example 1. This can also be confirmed by the same microstructure observation as in FIGS. 3 to 8 of Example 2 (not illustrated). FIG. 30(b) is a graph in which radius distribution of the size of the silicide (first phase) and the Si phase (second phase) in the eutectic structure is obtained by magnifying the graph of FIG. 30(a). From the graph of FIG. 30(a), the mode radius of the size of the Si phase (second phase) constituting the eutectic structure is 110 nm. In addition, regarding the silicide phase, the bimodal distribution as described above was not observed. Taking into consideration of the same observation results of the microstructure as in FIGS. 3 to 8 of Example 2, the peak is a peak of a silicide phase (first phase) constituting the eutectic structure, and the mode radius of the size thereof is 180 nm. In addition, from the graph of FIG. 30(b), the radius distribution of the size of the Si phase (second phase) constituting the eutectic structure is 80 to 160 nm. Further, the radius distribution of the size of the silicide phase (first phase) constituting the eutectic structure is 300 to 570 nm. Herein, the radius distribution is obtained by reading a place with a height of 5% with respect to the peak height.

From the above results, a number-based equivalent circular radius (average value) of the sizes of 100 independent first phases (silicide phases) as measured from the electron microscope photographs and the like of FIGS. 3 to 9 in the microstructure of the silicon-containing alloy of the present embodiment is 500 nm or less, preferably 450 nm or less, more preferably 400 nm or less, still more preferably 350 nm or less, and particularly preferably 240 nm or less. Incidentally, the lower limit of the equivalent circular radius (average value) of the sizes of the independent first phases (silicide phases) is not particularly limited, and is preferably 160 nm or more, more preferably 170 nm or more, still more preferably 180 nm or more, and particularly preferably 190 nm or more.

Further, a number-based equivalent circular radius (average value) of the sizes of 100 Si phases (second phases) in the eutectic structure as measured from the electron microscope photographs and the like of FIGS. 3 to 8 in the microstructure of the alloy is less than 110 nm, preferably 100 nm or less, more preferably 85 nm or less, still more preferably 70 nm or less, particularly preferably less than 50 nm, and of them, preferably 48 nm or less. Incidentally, the lower limit of the equivalent circular radius (average value) of the sizes of the Si phases (second phases) in the eutectic structure is not particularly limited, and is preferably 25 nm or more, more preferably 30 nm or more, still more preferably 35 nm or more, and particularly preferably 40 nm or more.

Further, a number-based equivalent circular radius (average value) of the sizes of 100 silicide phases (first phases) in the eutectic structure as measured from the electron microscope photographs and the like of FIGS. 3 to 9 in the microstructure of the alloy is almost the same size as the equivalent circular radius (average value) of the sizes of the Si phase (second phase) in the eutectic structure. That is, the number-based equivalent circular radius (average value) of the sizes of 100 silicide phases (first phases) in the eutectic structure as measured from the electron microscope photographs and the like of FIGS. 3 to 9 is less than 110 nm, preferably 100 nm or less, more preferably 85 nm or less, still more preferably 70 nm or less, and particularly preferably less than 50 nm, and of them, preferably 48 nm or less. Incidentally, the lower limit of the equivalent circular radius (average value) of the sizes of the silicide phases (first phases) in the eutectic structure is not particularly limited, and is preferably 25 nm or more, more preferably 30 nm or more, still more preferably 35 nm or more, and particularly preferably 40 nm or more.

From the above description, the size of the independent first phase and the size of the Si phase (second phase) in the eutectic structure (mode diameter or diameter distribution obtained by doubling mode radius or the radius distribution), as obtained by the precipitation calculation under the calculation conditions of Examples 1 to 4, almost match the actual size of the independent first phase of Examples 1 to 4 and the actual size of the Si phase (second phase) in the eutectic structure. This almost matches the number-based equivalent circular diameter (average value or diameter distribution) of 100 independent first phases or Si phases (second phases) in the eutectic structure as measured from the electron microscope photographs and the like of FIGS. 3 to 9, and it has been found that the mode radius or the radius distribution can be applied as a new index that is an alternative to these equivalent circular diameters, without any problem.

A particle diameter of the silicon-containing alloy constituting the negative electrode active material in the present embodiment is not particularly limiter, but an average particle diameter is preferably from 0.1 to 20 μm and more preferably from 0.2 to 10 μm.

(Method for Producing Negative Electrode Active Material)

A method for producing the negative electrode active material for an electric device according to the present embodiment is not particularly limited, and conventionally known knowledge can be appropriately referred to. In the present application, the silicon-containing alloy has a microstructure that the second phase forms a eutectic with the first phase and further enters a gap between a plurality of independent first phases. As a method of producing the negative electrode active material including such a silicon-containing alloy, a method of producing a quenched thin strip alloy by a liquid quenching roll solidification method (also simply referred to as a liquid quenching solidification method) as described below is provided. That is, according to another embodiment of the present invention, there is also provided a method of producing a negative electrode active material for an electric device including a silicon-containing alloy having a composition represented by Chemical Formula (I) above, which includes making a quenched thin strip by a liquid quenching solidification method using a parent alloy having the same composition as the silicon-containing alloy, and then subjecting the quenched thin strip to pulverization treatment so as to have the above-described average particle diameter, to obtain a negative electrode active material for an electric device formed of the silicon-containing alloy. As described above, when a negative electrode active material (silicon-containing alloy) is produced by the liquid quenching roll solidification method, it is possible to produce an alloy having the aforementioned microstructure. According to this, there is provided a production method which effectively contributes to improvement in cycle durability while a high capacity of the silicon-containing alloy active material is exhibited. Hereinafter, the production method according to the present embodiment will be described.

<Liquid Quenching Roll Solidification Method (Fabrication Process of Quenched Thin Strip (Ribbon) Alloy)>

First, a liquid quenching roll solidification method is carried out using a parent alloy having the same composition as a desired silicon-containing alloy. According to this, a quenched thin strip is produced.

Herein, in order to obtain a parent alloy, high-purity raw materials (single ingot, a wire, a plate, and the like) for each of silicon (Si), tin (Sn), and a transition metal (for example, titanium (Ti)) are provided. Subsequently, taking into consideration of the composition of a silicon-containing alloy (negative electrode active material) which is desired to be finally produced, a parent alloy in a form of an ingot or the like is produced by a known method such as an arc melting method.

Thereafter, a liquid quenching roll solidification method is carried out using the parent alloy obtained above. This process is a process of quenching and solidifying a molten material obtained by melting the parent alloy, and for example, can be carried out by a high-frequency induction melting-liquid quenching roll solidification method (twin-roll or single roll quenching method). According to this, a quenched thin strip (ribbon) alloy is obtained. Incidentally, the liquid quenching roll solidification method has been frequently used as a method for producing an amorphous alloy, and there are a variety of knowledge on the method itself. Incidentally, the liquid quenching roll solidification method can be carried out using a commercially available liquid quenching solidification apparatus (for example, liquid quenching solidification apparatus NEV-A05, manufactured by NISSIN GIKEN Corporation).

Specifically, a liquid quenching solidification apparatus NEV-A05, manufactured by NISSIN GIKEN Corporation, is used to place the parent alloy in a melting apparatus with a spraying nozzle (for example, a quartz nozzle) provided in a chamber which is purged with Ar and reduced to a gauge pressure, and then melt the parent alloy by an appropriate melting means (for example, high-frequency induction heating) to a predetermined temperature range. Thereafter, the melted parent alloy is sprayed on a roll made of a metal or ceramic (particularly, Cu having excellent thermal conductivity) at a predetermined spraying pressure and at a predetermined number of revolutions, to obtain a thin strip alloy (quenched thin strip (ribbon) alloy) continuously formed horizontally on the roll.

At this time, it is desirable to purge an atmosphere in the chamber with an inert gas (He gas, Ne gas, Ar gas, $N_2$ gas, or the like). After the chamber is purged with the inert gas, it is desirable to adjust a gauge pressure in the chamber so as to fall in the range of −0.03 to −0.07 MPa (0.03 to 0.05 MPa in terms of absolute pressure).

Further, a melting temperature of the parent alloy in the melting apparatus with a spraying nozzle (for example, a quartz nozzle) may be equal to or higher than a melting point of the alloy. In addition, as the melting means, a conventionally known melting means such as high-frequency induction heating can be used.

It is desirable to adjust a spraying pressure of the parent alloy from the nozzle of the melting apparatus with a spraying nozzle (for example, a quartz nozzle) so as to fall in the range of 0.03 to 0.09 MPa in terms of gauge pressure. The spraying pressure can be regulated by a conventionally known method. Further, it is desirable to adjust a pressure difference between the pressure in the chamber and the spraying pressure so as to fall in the range of 0.06 to 0.16 MPa.

It is desirable to adjust the number of revolutions and the circumferential velocity of the roll when the parent alloy is sprayed so as to fall in the range of 4,000 to 6,000 rpm (40 to 65 m/sec in terms of the circumferential velocity).

Further, a cooling rate of the thin strip alloy (quenched thin strip (ribbon) alloy) is preferably 1,600,000° C./sec or more, more preferably 2,000,000° C./sec or more, still more preferably 3,000,000° C./sec or more, and particularly preferably 5,000,000° C./sec or more. A method of determining the cooling rate is as described in FIGS. 19 to 21 as above. By adjusting the cooling rate within the above range, it is possible to fabricate a silicon-containing alloy having the microstructure of the present invention described above, which is excellent in view that the effects obtained by the alloy can be effectively exerted (see FIGS. 12 to 29).

Incidentally, titanium disilicide ($TiSi_2$) has two types of crystal structures, C49 structure and C54 structure. The C49 structure is a phase (metastable phase) having a high resistivity as of a resistivity of about 60 μΩ·cm, and is a structure of base-centered orthorhombic system. Meanwhile, the C54 structure is a phase (stable phase) having a low resistivity as of a resistivity of about 15 to 20 μΩ·cm, and is a structure of the face-centered orthorhombic system. Herein, as described with reference to FIG. 10, it has been found that a quenched thin strip obtained by using a liquid quenching solidification method has a microstructure in which a structure including a plurality of independent disilicides ($TiSi_2$) considered as a primary crystal structure and a eutectic structure of the silicide and the a-Si phase are mixed. Further, from the diffraction pattern (FIG. 10) obtained by fast Fourier transformation treatment of each part in the observation image (a plurality of independent primary crystal silicide phase s, eutectic a-Si phase, and eutectic silicide phase) and the chart (FIG. 11) obtained by the X-ray diffraction (XRD) measurement, it was confirmed that a crystal structure of the disilicide ($TiSi_2$) included in the quenched thin strip obtained by the liquid quenching solidification method has a C49 structure as a main component and a C54 structure as a subcomponent. The disilicide (TiSi$_2$) of C49 structure has a lower hardness than the disilicide (TiSi$_2$) of C54 structure. Accordingly, when a negative electrode active material (silicon-containing alloy) is produced by pulverization treatment using the quenched thin strip, it is possible to obtain negative electrode active material particles having a desired size without performing the pulverization treatment for a long time. Furthermore, as described in FIGS. 10 and 11, by having the C49 structure as a main component and the C54 structure as a subcomponent, the effects of the present invention can be effectively exerted. As described above, also from the viewpoint that properties of the silicide phase having the C49 structure (main component) and the C54 structure (subcomponent) included in the quenched thin strip obtained by the liquid quenching solidification method can be effectively used, the production method according to the present embodiment can be said to be advantageous. As described above, since the C54 structure (subcomponent) shows lower resistivity (higher electron conductivity) than the C49 structure, it can be said that the whole negative electrode active material has more preferable performance.

In the present embodiment, by adjusting a cooling rate, a spraying pressure, and the like in the liquid quenching roll solidification method so as to fall within the ranges defined above, it is possible to fabricate a silicon-containing alloy (quenched thin strip (ribbon) alloy) having the desired microstructure described above.

(Pulverization Process of Quenched Thin Strip (Ribbon) Alloy)

Thereafter, a pulverization treatment is performed. For example, pulverization treatment is carried out at a predetermined number of revolutions for a predetermined time by putting appropriate pulverization balls (for example, pulverization balls made of zirconia) and a quenched thin strip (ribbon) alloy into an appropriate pulverization pot (for example, a pulverization pot made of zirconia) using an appropriate pulverization apparatus (for example, planetary ball mill device P-6 manufactured by Fritsch, Germany, or the like). Prior to the pulverization treatment, the quenched thin strip (ribbon) alloy may be coarsely pulverized with an appropriate pulverizer to have such a size that the alloy is easily put into the pulverization apparatus.

As pulverization treatment conditions, the number of revolutions of the pulverizer (milling apparatus) is not limited so long as that it does not impair an alloy microstructure formed by the liquid quenching roll solidification method, and is desirably adjusted within the range of less than 500 rpm, preferably 100 to 480 rpm, and more preferably 300 to 450 rpm. A pulverization time is not limited so long as that it does not impair an alloy microstructure formed by the liquid quenching roll solidification method, and is desirably adjusted within the range of shorter than 12 hours, preferably 0.5 to 10 hours, and more preferably 0.5 to 3 hours.

The pulverization treatment is usually conducted in a dry atmosphere, but a particle size distribution after the pulverization treatment has a wide width from a small size to a large size in some cases. For this reason, it is preferable to conduct pulverization treatment and classification treatment in combination one or more times, in order to adjust a particle size.

The predetermined alloy to be essentially contained in the negative electrode active material layer has been described above, but the negative electrode active material layer may contain another negative electrode active material. Examples of the negative electrode active material other than the predetermined alloy may include carbon such as natural graphite, artificial graphite, carbon black, activated carbon, carbon fiber, coke, soft carbon, and hard carbon, a pure metal such as Si or Sn, and an alloy-based active material having a composition ratio which deviates from the predetermined composition ratio described above, or a metal oxide such as TiO, Ti$_2$O$_3$, or TiO$_2$, or SiO$_2$, SiO, or SnO$_2$, a composite oxide (a composite nitride) of lithium and a transition metal such as Li$_{4/3}$Ti$_{5/3}$O$_4$ or Li$_7$MnN, Li—Pb alloy, Li—Al alloy, or Li. However, from the viewpoint of sufficiently exerting the effects by using the predetermined alloy as the negative electrode active material, a content of the predetermined alloy in 100% by mass of the total amount of the negative electrode active material is preferably from 50 to 100% by mass, more preferably from 80 to 100% by mass, still more preferably from 90 to 100% by mass, particularly preferably from 95 to 100% by mass, and most preferably 100% by mass.

Subsequently, the negative electrode active material layer 13 contains a binder.

(Binder)

The binder is added for the purpose of binding active materials with each other or an active material with a current collector, to maintain an electrode structure. The kind of the binder to be used in the negative electrode active material layer is also not particularly limited, and those described above as the binder to be used in the positive electrode active material layer can be similarly used. Hence, the detailed description thereon will be omitted here.

Incidentally, an amount of the binder contained in the negative electrode active material layer is not particularly limited as long as an active material can be bound, but it is preferably from 0.5 to 20% by mass and more preferably from 1 to 15% by mass, with respect to the negative electrode active material layer.

(Requirements Common to Positive Electrode and Negative Electrode Active Material Layers 15 and 13)

The requirements common to the positive electrode and negative electrode active material layers 15 and 13 will be described below.

The positive electrode active material layer 15 and the negative electrode active material layer 13 contain an electric conductive auxiliary, an electrolyte salt (lithium salt), an ion conductive polymer, and the like if necessary. In particular, the negative electrode active material layer 13 essentially contains an electric conductive auxiliary as well.

(Electric Conductive Auxiliary)

The electric conductive auxiliary is an additive to be incorporated in order to improve electric conductivity of the positive electrode active material layer or the negative electrode active material layer. Examples of the electric conductive auxiliary may include carbon materials such as carbon black such as acetylene black, graphite, and vapor-grown carbon fiber. An electronic network which can contribute to improvement of output characteristics of a battery can be effectively formed in an interior of an active material layer when the active material layer contains an electric conductive auxiliary.

A content of the electric conductive auxiliary to be incorporated in the active material layer is 1% by mass or more, more preferably 3% by mass or more, and still more preferably 5% by mass or more, with respect to a total amount of the active material layer. In addition, a content of the electric conductive auxiliary to be incorporated in the active material layer is preferably 15% by mass or less, more preferably 10% by mass or less, still more preferably 7% by mass or less, with respect to a total amount of the active material layer. Electron conductivity of the active material itself is low, and electrode resistance can be decreased by the amount of the electric conductive auxiliary, and the following effects can be exerted by regulating a blending ratio (content) of the electric conductive auxiliary in the active material layer so as to fall in the above range. That is, it is possible to ensure sufficient electron conductivity without hindering any electrode reaction, to suppress decrease in energy density due to decrease in electrode density, and thus to attain improvement in energy density due to improved electrode density.

In addition, an electric conductive binder having functions of both an electric conductive auxiliary and a binder may be used instead of the electric conductive auxiliary and binder, or may be concurrently used with one or both of the electric conductive auxiliary and the binder. As the electric conductive binder, commercially available TAB-2 (manufactured by Hohsen Corp.) can be used.

(Electrolyte Salt (Lithium Salt))

Examples of the electrolyte salt (lithium salt) may include $Li(C_2F_5SO_2)_2N$, $LiPF_6$, $LiBF_4$, $LiClO_4$, $LiAsF_6$, and $LiCF_3SO_3$.

(Ion Conductive Polymer)

Examples of the ion conductive polymer may include a polyethylene oxide (PEO)-based polymer and a polypropylene oxide (PPO)-based polymer.

A blending ratio of a component contained in the positive electrode active material layer and the negative electrode active material layer is not particularly limited. The blending ratio can be adjusted by appropriately referring to known knowledge on nonaqueous solvent secondary batteries.

A thickness of each active material layer (an active material layer on one side of a current collector) is also not particularly limited, and conventionally known knowledge on batteries can be appropriately referred to. As an example, a thickness of each active material layer is usually about from 1 to 500 µm and preferably from 2 to 100 µm, in consideration of intended use (output-oriented, energy-oriented, or the like) of a battery and ion conductivity.

<Current Collector>

The current collectors 11 and 12 are composed of an electric conductive material. A size of the current collector is determined according to the application of the battery. For example, a current collector having a large area is used when the current collector is used in a large battery requiring a high-energy density.

A thickness of the current collector is also not particularly limited. The thickness of the current collector is usually about from 1 to 100 µm.

A shape of the current collector is also not particularly limited. In a stacked type battery 10 illustrated in FIG. 1, a mesh shape (expanded grid or the like) or the like can be used as well as a current collector foil.

Incidentally, it is desirable to use a current collecting foil in the case of directly forming a thin alloy film of a negative electrode active material on a negative electrode current collector 11 by a sputtering method or the like.

A material constituting the current collector is not particularly limited. For example, a metal, or a resin having a conductive filler added to a conductive polymer material or a nonconductive polymer material can be employed.

Specifically, examples of the metal may include aluminum, nickel, iron, stainless steel, titanium, and copper. In addition to these, a clad material of nickel with aluminum, a clad material of copper with aluminum, a plated material of a combination of these metals, or the like can be preferably used. In addition, it may be a foil having aluminum coated on a metal surface. Among them, aluminum, stainless steel, copper, and nickel are preferable from the viewpoints of electron conductivity, operating potential of battery, adhesion of a negative electrode active material to a current collector by sputtering, and the like.

Examples of the conductive polymer material may include polyaniline, polypyrrole, polythiophene, polyacetylene, polyparaphenylene, polyphenylenevinylene, polyacrylonitrile, and polyoxadiazole. Since such a conductive polymer material exhibits sufficient electric conductivity even without adding a conductive filler thereto, it is advantageous from the viewpoint of easy production process or decrease in weight of a current collector.

Examples of the nonconductive polymer material may include polyethylene (PE; high density polyethylene (HDPE), low density polyethylene (LDPE), and the like), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), or polystyrene (PS). Such nonconductive polymer materials can exhibit excellent electric potential resistance or solvent resistance.

A conductive filler may be added to the conductive polymer material or nonconductive polymer material described above, if necessary. A conductive filler is necessarily essential in order to impart electric conductivity to a resin, particularly when the resin to be a base material of the current collector is composed only of a nonconductive polymer.

The electric conductive filler can be used without being particularly limited as long as it is a substance exhibiting electric conductivity. Examples of a material exhibiting excellent electric conductivity, electric potential resistance, or lithium ion shielding property may include metal and conductive carbon. The metal is not particularly limited, but it is preferable to contain at least one metal selected from the group consisting of Ni, Ti, Al, Cu, Pt, Fe, Cr, Sn, Zn, In, Sb, and K or an alloy or metal oxide containing the metal. In addition, the conductive carbon is not particularly limited. It is preferably one that contains at least one member selected from the group consisting of acetylene black, vulcan, black pearl, carbon nanofiber, Ketjen black, carbon nanotube, carbon nanohorn, carbon nanoballoon, and fullerene.

An amount of the conductive filler added is not particularly limited as long as sufficient electric conductivity can be imparted to a current collector, and it is generally about from 5 to 35% by mass.

<Electrolyte Layer>

As an electrolyte constituting the electrolyte layer 17, a liquid electrolyte or a polymer electrolyte can be used.

The liquid electrolyte has a form in which a lithium salt (electrolyte salt) is dissolved in an organic solvent. Examples of the organic solvent may include carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC).

In addition, as the lithium salt, it is possible to employ a compound that can be added to an active material layer of an electrode, such as $Li(CF_3SO_2)_2N$, $Li(C_2F_5S_{02})_2N$, $LiPF_6$, $LiBF_4$, $LiAsF_6$, $LiTaF_6$, $LiClO_4$, or $LiCF_3SO_3$.

Meanwhile, the polymer electrolyte is classified into a gel electrolyte containing an electrolytic solution and an intrinsic polymer electrolyte which contains no electrolytic solution.

The gel electrolyte has a configuration in which the liquid electrolyte (electrolytic solution) is injected into a matrix polymer composed of an ion conductive polymer. Use of a gel polymer electrolyte as the electrolyte is advantageous from the viewpoint that fluidity of the electrolyte is eliminated and ionic conduction between the respective layers is easily shielded.

Examples of the ion conductive polymer to be used as the matrix polymer may include polyethylene oxide (PEO), polypropylene oxide (PPO), and a copolymer thereof. Such a polyalkylene oxide-based polymer can readily dissolve an electrolyte salt such as a lithium salt.

A proportion of the liquid electrolyte (electrolytic solution) in the gel electrolyte is not particularly limited, but it is preferably set to about several percent by mass to 98% by mass from the viewpoint of ionic conductivity and the like. In the present embodiment, effects can be attained particularly for a gel electrolyte containing a large amount of electrolytic solution, namely, having a proportion of the electrolytic solution of 70% by mass or more.

Incidentally, a separator may be used in an electrolyte layer when the electrolyte layer is composed of a liquid electrolyte, a gel electrolyte, or an intrinsic polymer electrolyte. Examples of the specific form of the separator (including a nonwoven fabric) may include a microporous membrane, a porous flat plate, or a nonwoven fabric formed of a polyolefin such as polyethylene or polypropylene.

The intrinsic polymer electrolyte has a configuration in which a supporting salt (lithium salt) is dissolved in the matrix polymer described above, and it does not contain an organic solvent as a plasticizer. Hence, liquid leakage from a battery is not concerned and reliability of the battery can be improved, when the electrolyte layer is composed of the intrinsic polymer electrolyte.

The matrix polymer of the gel electrolyte or the intrinsic polymer electrolyte can exert excellent mechanical strength by forming a crosslinked structure. In order to form a crosslinked structure, a polymerizable polymer (for example, PEO or PPO) for forming a polymer electrolyte may be subjected to polymerization treatment such as heat polymerization, ultraviolet polymerization, radiation polymerization, and electron beam polymerization using a proper polymerization initiator.

<Current Collecting Plate and Lead>

A current collecting plate may be used for the purpose of taking out electric current to an outside of a battery. The current collecting plate is electrically connected to a current collector and a lead, and brought out to an outside of a laminate sheet as a battery outer packaging material.

A material constituting the current collecting plate is not particularly limited and a known highly electrically conductive material which has been conventionally used as a current collecting plate for lithium ion secondary battery can be used. As the material constituting the current collecting plate, for example, metal materials such as aluminum, copper, titanium, nickel, stainless steel (SUS), and any alloy thereof are preferable, and aluminum, copper, and the like are more preferable from the viewpoint of light weight, corrosion resistance, and high electric conductivity. Incidentally, the same material or different materials may be used in the positive electrode current collecting plate and the negative electrode current collecting plate.

A positive terminal lead and a negative terminal lead may be used if necessary. As a material for the positive electrode terminal lead and the negative electrode terminal lead, a known terminal lead that has been used in a lithium ion secondary battery can be used. Incidentally, it is preferable that a portion to be brought out from a battery outer packaging material 29 be covered with a heat-shrinkable tube or the like exhibiting heat resistance and insulation property, so as not to affect a product (for example, automotive parts and especially electronic devices) by coming in contact with a peripheral device, wire, and the like to cause a short circuit.

<Battery Outer Packaging Material>

As the battery outer packaging material 29, it is possible to use a bag-shaped case formed of a laminate film containing aluminum which can wrap a power generating element, as well as a known metal can case. As the laminate film, for example, a laminate film having a three-layered structure formed by laminating PP, aluminum, and nylon in this order, or the like can be used, but the laminate film is not limited thereto. A laminate film is preferable from the viewpoint of having a high output and cooling performance and being able to be suitably utilized in a battery for large device for EV and HEV.

Incidentally, a lithium ion secondary battery can be produced by a conventionally known production method.

<Appearance of Lithium Ion Secondary Battery>

Figure 2:
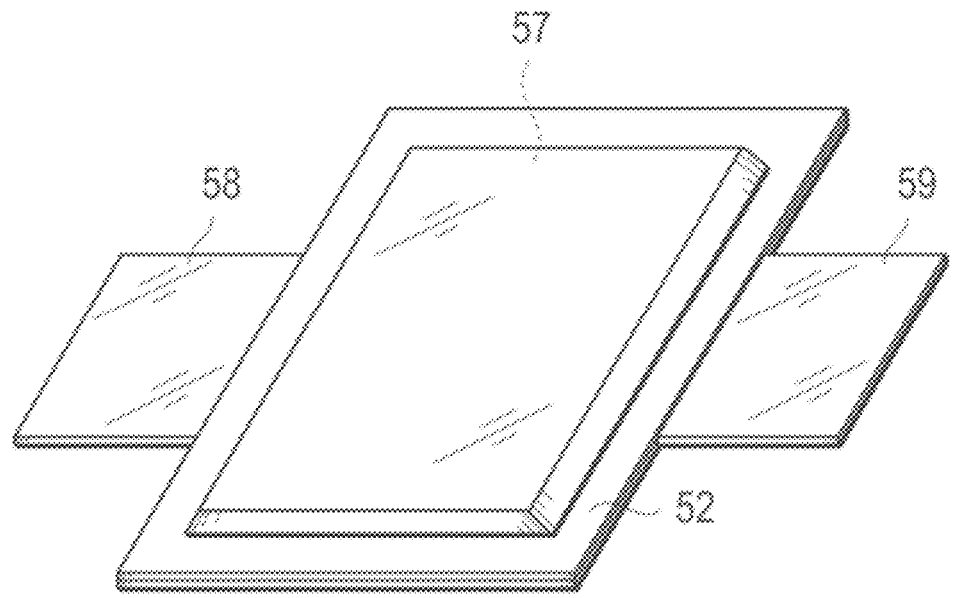
FIG. 2 is a perspective view which schematically illustrates an appearance of a stacked type flat lithium ion secondary battery as a representative embodiment of an electric device according to the present invention.

FIG. 2 is a perspective view which illustrates appearance of a stacked type flat lithium ion secondary battery.

As illustrated in FIG. 2, a stacked type flat lithium ion secondary battery 50 has a rectangular flat shape, and a positive electrode current collecting plate 59 and a negative electrode current collecting plate 58 for taking out electric power are pulled out from both side portions thereof. A power generating element 57 is wrapped in a battery outer packaging material 52 of the lithium ion secondary battery 50, the periphery of the battery outer packaging material 52 is heat-sealed, and the power generating element 57 is hermetically sealed in a state in which the positive electrode current collecting plate 59 and the negative electrode current collecting plate 58 are pulled out. Here, the power generating element 57 corresponds to the power generating element 21 of the lithium ion secondary battery (stacked type battery) 10 illustrated in FIG. 1. The power generating element 57 is formed by stacking a plurality of single battery layers (single cells) 19 composed of the positive electrode (positive electrode active material layer) 13, the electrolyte layer 17, and the negative electrode (negative electrode active material layer) 15.

Incidentally, the lithium ion secondary battery is not limited to a stacked type flat one (laminate cell). For a wound type lithium ion battery, it is not particularly limited, and a lithium ion secondary battery may be one having a cylindrical shape (coin cell), one having a prismatic shape (square cell), one obtained by deforming the one having a cylindrical shape to have a rectangular flat shape, or a cylindrical cell. In one having a cylindrical or prismatic shape, a laminate film or a conventional cylindrical can (metal can) may be used as an outer packaging material thereof, and the outer packaging material is not particularly limited. Preferably, a power generating element is packaged in an aluminum laminate film. By this form, a weight can be decreased.

In addition, bringing out of the positive electrode current collecting plate 59 and the negative electrode current collecting plate 58 illustrated in FIG. 2 is not also particularly limited. The positive electrode current collecting plate 59 and the negative electrode current collecting plate 58 may be pulled out from the same side, or each of the positive electrode current collecting plate 59 and the negative electrode current collecting plate 58 may be divided into a plurality of pieces and taken out from each side, and the bringing out is not limited to that illustrated in FIG. 2. In addition, in a wound type lithium ion battery, terminals may be formed by utilizing, for example, a cylindrical can (metal can) instead of a current collecting plate.

As described above, the negative electrode and the lithium ion secondary battery which are formed by using the negative electrode active material for lithium ion secondary battery of the present embodiment can be suitably utilized as a large capacity power source for electric vehicles, hybrid electric vehicles, fuel cell vehicles, hybrid fuel cell vehicles, and the like. That is, they can be suitably utilized in a vehicle driving power source and an auxiliary power source which are demanded to have a high-volume energy density and a high-volume output density.

Incidentally, in the above embodiment, a lithium ion battery has been exemplified as an electric device, but the present invention is not limited thereto, and the negative electrode active material can also be applied to other types of secondary batteries and even to primary batteries. In addition, it can be applied not only to batteries but also to capacitors.

EXAMPLES

The present invention will be described in more detail with reference to the following Examples. However, the technical scope of the present invention is not limited to only the following Examples.

Example 1

[Production of Silicon-Containing Alloy]

A silicon-containing alloy was produced using $Si_{65}Sn_5Ti_{30}$ as an alloy seed by a liquid quenching solidification method. Detailed description will be described below. Specifically, a high-purity metal Si ingot (5N), a high-purity Ti wire (3N), and a high-purity Sn plate (3N) were used to produce an ingot alloy of the Si alloy (Si: 65% by mass, Sn: 5% by mass, Ti: 30% by mass) by using an arc melting method. The ingot alloy was coarsely pulverized until a diameter became about 2 mm such that the ingot alloy was easily put in a quartz nozzle.

Subsequently, a thin strip alloy (quenched thin strip (ribbon)) alloy was fabricated as a silicon-containing alloy using the coarsely pulverized ingot alloy powder as a parent alloy by a liquid quenching solidification method. Specifically, a liquid quenching solidification apparatus NEV-A05 type manufactured by NISSIN GIKEN Corporation was used, and a parent alloy of $Si_{65}Sn_5Ti_{30}$ was put into a quartz nozzle provided in a chamber which was purged with Ar and reduced to a gauge pressure of −0.03 MPa and then melted by high-frequency induction heating. Thereafter, the melted parent alloy was sprayed on a Cu roll at a spraying pressure of 0.03 MPa and at the number of revolutions of 4,000 rpm (circumferential velocity: 41.9 m/sec), to fabricate a thin strip alloy (quenched thin strip alloy). Incidentally, a cooling rate of the alloy in the liquid quenching solidification method was 6,200,000° C./sec and a thickness of the obtained thin strip alloy (quenched thin strip alloy) was 15 μm.

Thereafter, the obtained thin strip alloy (quenched thin strip alloy) was subjected to pulverization treatment. Specifically, the thin strip alloy (quenched thin strip alloy) was coarsely pulverized to have a diameter of about 2 mm so as to be easily put in a ball mill device. Subsequently, by using a planetary ball mill device P-6 manufactured by Fritsch, Germany, pulverization balls made of zirconia and the coarsely pulverized thin strip alloy (quenched thin strip alloy) powder were put into a pulverization pot made of zirconia and the pulverization treatment was carried out at 400 rpm for 1 hour, to obtain a silicon-containing alloy (negative electrode active material). Incidentally, an average particle diameter of the obtained silicon-containing alloy (negative electrode active material) powder was D50=7 μm (D90=20 μm).

[Fabrication of Negative Electrode]

Mixed were 80 parts by mass of the silicon-containing alloy ($Si_{65}Sn_5Ti_{30}$) thus produced as the negative electrode active material, 5 parts by mass of acetylene black as an electric conductive auxiliary, and 15 parts by mass of polyamide-imide as a binder, and the mixture thus obtained was dispersed in N-methylpyrrolidone, to obtain a negative electrode slurry. Subsequently, the negative electrode slurry thus obtained was uniformly coated on both sides of a negative electrode current collector formed of a copper foil such that a thickness of each of the negative electrode active material layer was 30 μm, and dried in a vacuum for 24 hours, thereby obtaining a negative electrode.

[Fabrication of Lithium Ion Secondary Battery (Coin Cell)]

The negative electrode thus fabricated and the counter electrode Li were allowed to face each other, and a separator (polyolefin, film thickness: 20 μm) was disposed therebetween. Subsequently, the stacked body of the negative electrode, the separator, and the counter electrode Li was disposed on the bottom side of a coin cell (CR2032, material: stainless steel (SUS316)). Furthermore, a gasket was fitted to maintain insulation between the positive electrode and the negative electrode, the following electrolytic solution was injected by using a syringe, a spring and a spacer were stacked thereon, the upper side of the coin cell was superimposed thereon, and caulking was conducted to hermetically seal the coin cell, thereby obtaining a lithium ion secondary battery (coin cell).

As the electrolytic solution, a solution which was prepared by dissolving lithium hexafluorophosphate ($LiPF_6$) as a lithium salt in an organic solvent prepared by mixing ethylene carbonate (EC) and diethyl carbonate (DEC) at a proportion of EC:DEC=1:2 (volume ratio) at a concentration of 1 mol/L was used.

Example 2

A negative electrode active material, a negative electrode, and a lithium ion secondary battery (coin cell) were fabricated by the same method as in Example 1 described above, except that the alloy seed was changed to $Si_{60}Sn_{10}Ti_{30}$ and the spraying pressure in the liquid quenching solidification method was changed to 0.05 MPa. Incidentally, an average particle diameter of the obtained silicon-containing alloy (negative electrode active material) powder was D50=7 μm (D90=20 μm). In addition, a cooling rate of the alloy in the liquid quenching solidification method was 4,600,000° C./sec, and a thickness of the obtained thin strip alloy (quenched thin strip alloy) was 20 μm.

Example 3

A negative electrode active material, a negative electrode, and a lithium ion secondary battery (coin cell) were fabricated by the same method as in Example 1 described above, except that the alloy seed was changed to $Si_{60}Sn_{10}Ti_{30}$, a chamber pressure in the liquid quenching solidification method was changed to −0.02 MPa, and a spraying pressure in the liquid quenching solidification method was changed to 0.01 MPa. Incidentally, an average particle diameter of the obtained silicon-containing alloy (negative electrode active material) powder was D50=8 μm (D90=25 μm). In addition, a cooling rate of the alloy in the liquid quenching solidification method was 2,200,000° C./sec, and a thickness of the obtained thin strip alloy (quenched thin strip alloy) was 27 μm.

Example 4

A negative electrode active material, a negative electrode, and a lithium ion secondary battery (coin cell) were fabricated by the same method as in Example 1 described above except, that the alloy seed was changed to $Si_{60}Sn_{10}Ti_{30}$, a chamber pressure in the liquid quenching solidification method was changed to −0.01 MPa, and a spraying pressure in the liquid quenching solidification method was changed to 0.01 MPa. Incidentally, an average particle diameter of the obtained silicon-containing alloy (negative electrode active material) powder was D50=9 μm (D90=28 μm). In addition, a cooling rate of the alloy in the liquid quenching solidification method was 1,600,000° C./sec, and a thickness of the obtained thin strip alloy (quenched thin strip alloy) was 35 μm.

Comparative Example 1

A negative electrode active material, a negative electrode, and a lithium ion secondary battery (coin cell) were fabricated by the same method as in Example 1 described above except, that the alloy type was changed to $Si_{60}Sn_{20}Ti_{20}$. Incidentally, an average particle diameter of the obtained silicon-containing alloy (negative electrode active material) powder was D50=7.2 μm (D90=20 μm). In addition, a cooling rate of the alloy in the liquid quenching solidification method was 4,600,000° C./sec, and a thickness of the obtained thin strip alloy (quenched thin strip alloy) was 20 μm.

[Analysis of Textural Structure of Negative Electrode Active Material]

The textural structure (microstructure) of the negative electrode active material (silicon-containing alloy) fabricated in Example 2 was analyzed. Details thereof are as described above using FIGS. 3 to 11. It was possible to confirm from the microstructure of the alloy of Example 2 that the microstructure has a first phase (silicide phase) having a silicide of a Ti element that is a transition metal as a main component and a second phase (a-Si phase) partially containing tin (Sn) and having amorphous or low crystalline Si as a main component, and has partially a plurality of independent first phases and partially a eutectic structure of the first phase and the second phase. Further, it was possible to confirm that the Sn phase in which Sn crystallizes out to a boundary portion of the first phase and the second phase is formed. In addition, it was possible to confirm that the size of the independent first phase in the microstructure of the alloy is larger than the size of the eutectic structure of the first phase and the second phase. Furthermore, it was possible to confirm that the independent silicide phase and the silicide phase in the eutectic structure are a single crystal phase, the crystal structures of (silicide) of these silicide phases are mainly C49 structure and further have C54 structure, and the Si phase (second phase) in the eutectic structure is an amorphous phase having amorphous or low crystalline Si (a-Si). That is, it was possible to confirm that the Si phase (second phase) in the eutectic structure is amorphized to have amorphous or low crystalline Si (a-Si).

Incidentally, the same results as in FIGS. 3 to 11 are obtained also in other Examples 1 and 3 to 4. That is, it is also possible to confirm from the microstructure of the alloys of Examples 1 and 3 to 4 that the microstructure has a first phase (silicide phase) having a silicide of a Ti element that is a transition metal as a main component and a second phase (a-Si phase) partially containing tin (Sn) and having amorphous or low crystalline Si as a main component, and has partially a plurality of independent first phases and partially a eutectic structure of the first phase and the second phase (not illustrated in the drawings). Further, it was possible to confirm that the Sn phase in which Sn crystallizes out to a boundary portion of the first phase and the second phase is formed (not illustrated in the drawings). In addition, it was possible to confirm that the size of the independent first phase in the microstructure of the alloy is larger than the size of the eutectic structure of the first phase and the second phase (not illustrated in the drawings). Furthermore, it was possible to confirm that the independent silicide phase and the silicide phase in the eutectic structure are a single crystal phase, the crystal structures of (silicide) of these silicide phases are mainly C49 structure and further have C54 structure, and the Si phase (second phase) in the eutectic structure is an amorphous phase having amorphous or low crystalline Si (a-Si) (not illustrated in the drawings). That is, it was possible to confirm that the Si phase (second phase) in the eutectic structure is amorphized to have amorphous or low crystalline Si (a-Si).

Further, the size of the independent first phase and the size of the Si phase (second phase) in the eutectic structure in the microstructure of the negative electrode active material (silicon-containing alloy) fabricated in each of Examples 1 to 4 and Comparative Example 1 are as described above using FIGS. 12 to 30. Specifically, the results of the mode radius and radius distribution of the size of the independent first phase and the size of the Si phase (second phase) in the eutectic structure, obtained by the precipitation calculation under the calculation conditions of Examples 1 to 4 and Comparative Example 1 of the alloy compositions of Examples 1 to 4 and Comparative Example 1, are presented in the following Table 1.

[Evaluation of Cycle Durability]

The cycle durability was evaluated for each lithium ion secondary battery (coin cell) fabricated in each of Examples 1 to 4 and Comparative Example 1 under the following charge and discharge test conditions.

(Charge and Discharge Test Conditions)
1) Charge and discharge tester: HJ 0501 SMSA (manufactured by HOKUTO DENKO CORP.)
2) Charge and discharge conditions
   [Charge process] 0.3 C, 2 V→10 mV (constant current and constant voltage mode)
   [Discharge process] 0.3 C, 10 mV→2 V (constant current mode)
3) Thermostatic chamber: PFU-3K (manufactured by ESPEC CORP.)
4) Evaluation temperature: 300 K (27° C.)

The evaluation cell was charged from 2 V to 10 mV at 0.1 mA in a constant current and constant voltage mode in a thermostatic chamber set at the above evaluation temperature by using a charge and discharge tester in the charge process (referred to as the process of intercalating Li into the evaluation electrode). Thereafter, the evaluation cell was discharged from 10 mV to 2 V at 0.3 C in a constant current mode in the discharge process (referred to as the process of deintercalating Li from the evaluation electrode). The charge and discharge cycle described above was taken as one cycle, and charge and discharge test was conducted from the initial cycle (1st cycle) to the 50th cycle under the same charge and discharge conditions. Thereafter, the results of the proportion (discharge capacity retention rate [%]) of the discharge capacity in the 50th cycle to the discharge capacity in the 1st cycle are presented in the following Table 1.

plurality of independent first phases. Accordingly, when the size (mode radius) of a plurality of independent first phases is decreased, the size of the eutectic structure entering the gap therebetween is also decreased. As a result, the size (mode radius) of the second phase (Si phase) in the eutectic structure is also reduced. Consequently, by decreasing (miniaturizing) the size (mode radius) of the Si phase which expands and contracts in the course of charge and discharge,

TABLE 1

| | Composition of silicon-containing alloy (active material) | Chamber pressure in liquid quenching solidification method (MPa) | Spraying pressure in liquid quenching solidification method (MPa) | Thickness of quenched thin strip alloy (μm) | Cooling rate (° C./sec) | Independent first phase (silicide phase) | | Second phase in eutectic structure (Si phase) | | Discharge capacity retention rate (%) (after 50 cycles) |
|---|---|---|---|---|---|---|---|---|---|---|
| | | | | | | Mode radius (nm) | Radius distribution (nm) | Mode radius (nm) | Radius distribution (nm) | |
| Example 1 | $Si_{65}Sn_5Ti_{30}$ | −0.03 | 0.03 | 15 | 6.2E+6 | 220 | 160 to 300 | 45 | 25 to 80 | 89 |
| Example 2 | $Si_{60}Sn_{10}Ti_{30}$ | −0.03 | 0.05 | 20 | 4.6E+6 | 250 | 190 to 340 | 50 | 30 to 90 | 84 |
| Example 3 | $Si_{60}Sn_{10}Ti_{30}$ | −0.02 | 0.01 | 27 | 2.2E+6 | 370 | 250 to 510 | 75 | 40 to 120 | 63 |
| Example 4 | $Si_{60}Sn_{10}Ti_{30}$ | −0.01 | 0.01 | 35 | 1.6E+6 | 420 | 300 to 570 | 90 | 50 to 140 | 59 |
| Comparative Example 1 | $Si_{60}Sn_{20}Ti_{20}$ | −0.03 | 0.05 | 20 | 4.6E+6 | — | — | 110 | 80 to 160 | 34 |

It is noted from the results in Table 1 above that the lithium ion batteries using the negative electrode active materials of Examples 1 to 4 can maintain a discharge capacity retention rate after the 50th cycle at a high value, demonstrating that they show excellent cycle durability. In addition, in Examples 1 to 4 using the Si alloy negative electrode, as compared to a negative electrode active material using a carbon material, capacity is higher (since this is well-known (see background arts) without illustrating a comparative example using a carbon material, the comparative example is omitted). Such high capacity and high cycle durability can be realized by a ternary alloy composition represented by Si—Sn-M (M is one or two or more transition metal elements) of the Si-containing alloy constituting the negative electrode active material. Further, the high capacity and high cycle durability can be attained by the microstructure which has the first phase having silicide as a main component and a second phase partially containing Sn and having amorphous or low crystalline Si as a main component, and has partially a plurality of independent first phases and partially a eutectic structure of the first phase and the second phase. On the other hand, it is found that the lithium ion battery using the negative electrode active material of Comparative Example 1 cannot obtain sufficient cycle durability. The reason for this is that no independent first phases are formed in the negative electrode active material of Comparative Example 1 as noted in Table 1. Accordingly, it is considered that the expansion cannot be further suppressed by a plurality of independent first phases (they do not exist), and thus the expansion cannot be suppressed by two step suppression, although it is possible to suppress expansion of the second phase (Si phase) in the eutectic structure in the course of charge and discharge to some extent by the eutectic first phase.

Further, it can be confirmed from Table 1 that by the comparison in Examples 1 to 4, as the mode radius of each of a plurality of independent first phases and the second phase (Si phase) in the eutectic structure is decreased, the discharge capacity retention rate after the 50th cycle is increased. That is, in Examples 1 to 4, the microstructure has a configuration in which the second phase forms a eutectic with the first phase and further enters a gap between a plurality of independent first phases. Accordingly, when the size (mode radius) of a plurality of independent first phases is decreased, the size of the eutectic structure entering the gap therebetween is also decreased. As a result, the size (mode radius) of the second phase (Si phase) in the eutectic structure is also reduced. Consequently, by decreasing (miniaturizing) the size (mode radius) of the Si phase which expands and contracts in the course of charge and discharge, the degree of expansion of each miniaturized Si phase can be relatively decreased. That is, the expansion pressure when each miniaturized Si phase expands (stress or load compressing silicide in the periphery) can be decreased. Accordingly, expansion of the second phase (Si phase) (reduced expansion pressure; reduced stress or load compressing silicide in the periphery) can be easily suppressed by the eutectic first phase. Further, expansion of the Si phase with decreased size in the eutectic structure formed in the gap between a plurality of independent first phases with decreased size can be more easily suppressed by the independent first phases surrounding the gap. Therefore, the phase transition between an amorphous state and a crystalline state (crystallization to $Li_{15}Si_4$) at the time of alloying Si with Li during the charging can be even further suppressed. As a result, expansion and contraction of the silicon-containing alloy constituting the negative electrode active material in the course of charge and discharge of an electric device can be reduced as the mode radii of a plurality of independent first phases and the second phase (Si phase) in the eutectic structure is decreased, and the second phase (a-Si phase) can also be allowed to uniformly react when the second phase forms a eutectic with the first phase (silicide phase) formed of silicide having electric conductivity. As a result, cycle durability can be even further improved while an electric device using the negative electrode active material has high capacity.

REFERENCE SIGNS LIST 10 and 50 Lithium ion secondary battery (Stacked type battery),
11 Negative electrode current collector,
12 Positive electrode current collector,
13 Negative electrode active material layer,
15 Positive electrode active material layer,
17 Electrolyte layer,
19 Single battery layer,
21 and 57 Power generating element,
25 and 58 Negative electrode current collecting plate,
27 and 59 Positive electrode current collecting plate,
29 and 52 Battery outer packaging material (Laminate film).

The invention claimed is:

1. A negative electrode active material for an electric device, which comprises:
   a silicon-containing alloy having a composition represented by the following Chemical Formula (1):

$$Si_xSn_yTi_zA_a \quad (I)$$

wherein A represents an unavoidable impurity, x, y, z, and a represent a percent by mass, and 60≤x≤73, 2≤y≤15, 25≤z≤35, and 0≤a<0.5 and x+y+z+a=100),
   wherein the silicon-containing alloy has a microstructure which has a first phase having a silicide of a transition metal (silicide) as a main component and a second phase partially containing Sn and having amorphous Si as a main component, at least a part of said Sn being solid-solved in Si, and
   wherein the microstructure has partially a plurality of independent first phases and partially a eutectic structure of the first phase and the second phase.

2. The negative electrode active material for an electric device according to claim 1, wherein in the microstructure, a size of the independent first phase is larger than a size of the eutectic structure of the first phase and the second phase.

3. The negative electrode active material for an electric device according to claim 1, wherein in the microstructure, a size of the independent first phase is a mode radius of 500 nm or less, and a size of a Si phase (second phase) in the eutectic structure of the first phase and the second phase is a mode radius of less than 110 nm.

4. The negative electrode active material for an electric device according to claim 1, wherein in the microstructure, a size of the independent first phase is a mode radius of 450 nm or less, and a size of a Si phase (second phase) in the eutectic structure of the first phase and the second phase is a mode radius of 100 nm or less.

5. The negative electrode active material for an electric device according to claim 1, wherein in the microstructure, a size of the independent first phase is a mode radius of 400 nm or less, and a size of a Si phase (second phase) in the eutectic structure of the first phase and the second phase is a mode radius of 85 nm or less.

6. The negative electrode active material for an electric device according to claim 1, wherein in the microstructure, a size of the independent first phase is a mode radius of 350 nm or less, and a size of a Si phase (second phase) in the eutectic structure of the first phase and the second phase is a mode radius of 70 nm or less.

7. The negative electrode active material for an electric device according to claim 1, wherein in the microstructure, a size of the independent first phase is a mode radius of 240 nm or less, and a size of a Si phase (second phase) in the eutectic structure of the first phase and the second phase is a mode radius of less than 50 nm.

8. The negative electrode active material for an electric device according to claim 1, wherein in the microstructure, the silicide of the transition metal of the first phase is titanium silicide (TiSi$_2$), and the Si phase (second phase) is amorphous.

9. The negative electrode active material for an electric device according to claim 1, wherein the second phase is amorphized more than the first phase.

10. A negative electrode for an electric device comprising the negative electrode active material for an electric device set forth in claim 1.

11. An electric device comprising the negative electrode for an electric device set forth in claim 10.

12. The negative electrode active material for an electric device according to claim 1, wherein titanium disilicide (TiSi$_2$) has two types of crystal structures, C49 structure and C54 structure.

13. The negative electrode active material for an electric device according to claim 1, wherein 60≤x≤70, 2≤y≤10, and 27≤z≤33.

14. A method of producing a negative electrode active material for an electric device which comprises a Si-containing alloy having a composition represented by the following Chemical Formula (1):

$$Si_xSn_yTi_zA_a \quad (I)$$

wherein A represents an unavoidable impurity, x, y, z, and a represent a percent by mass, and 60≤x≤73, 2≤y≤15, 25≤z≤35, and 0≤a<0.5 and x+y+z+a=100), and has a microstructure which has a first phase having a silicide of a transition metal (silicide) as a main component and a second phase partially containing Sn and having amorphous Si as a main component, at least a part of said Sn being solid-solved in Si, and has partially a plurality of independent first phases and partially a eutectic structure of the first phase and the second phase, the method comprising:
    making a quenched thin strip at a cooling rate of 1,600,000° C./sec or more by a liquid quenching solidification method using a parent alloy having the same composition as the silicon-containing alloy to obtain a negative electrode active material for an electric device comprising the silicon-containing alloy.

* * * * *